July 29, 1941.  K. F. GALLIMORE  2,251,015
MACHINE TOOL
Filed Feb. 26, 1940   25 Sheets-Sheet 2

Inventor
Keith F. Gallimore
BY
Parker, Carlson, Pitzner & Hubbard
Attorneys.

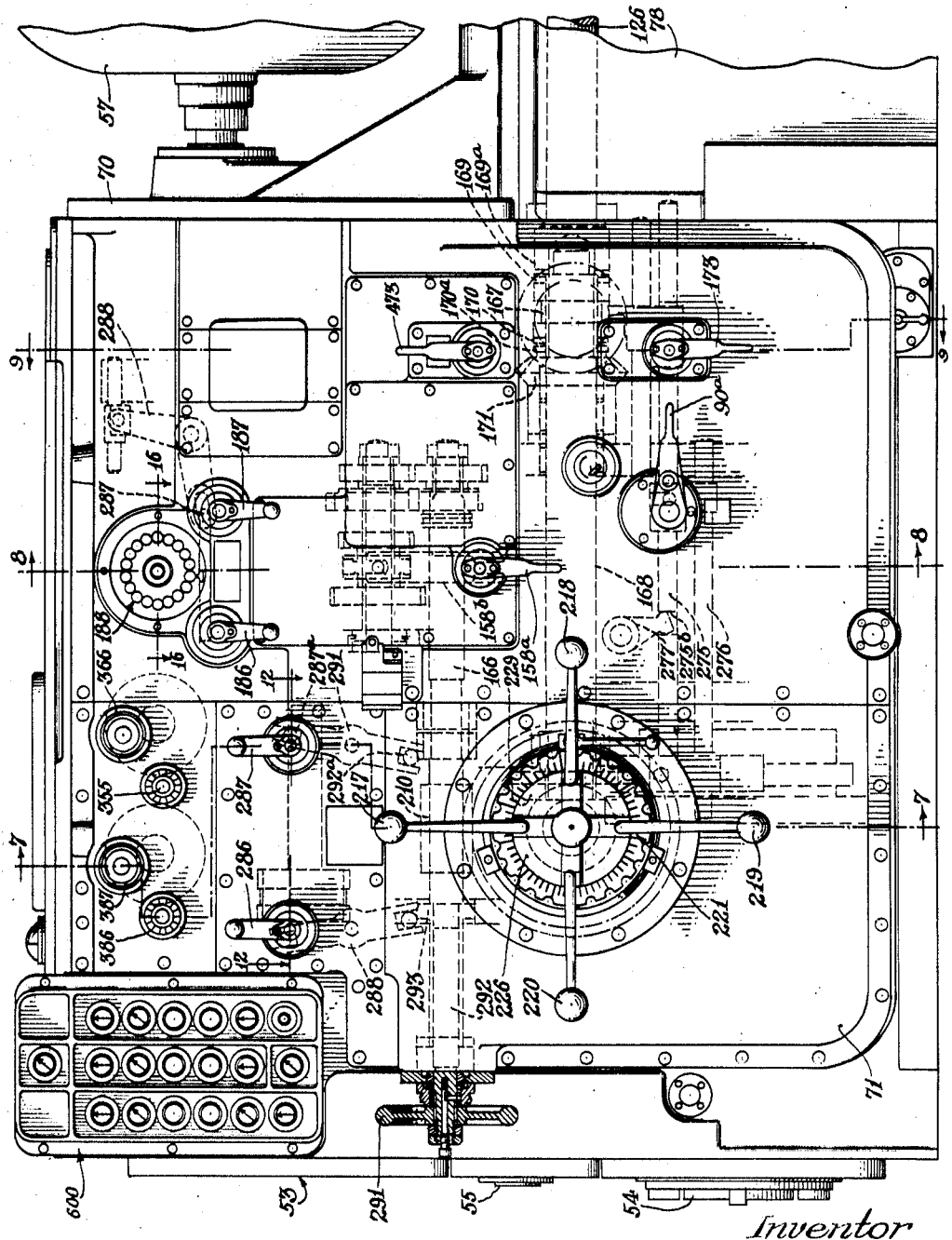

July 29, 1941.　　　K. F. GALLIMORE　　　2,251,015
MACHINE TOOL
Filed Feb. 26, 1940　　　25 Sheets-Sheet 4
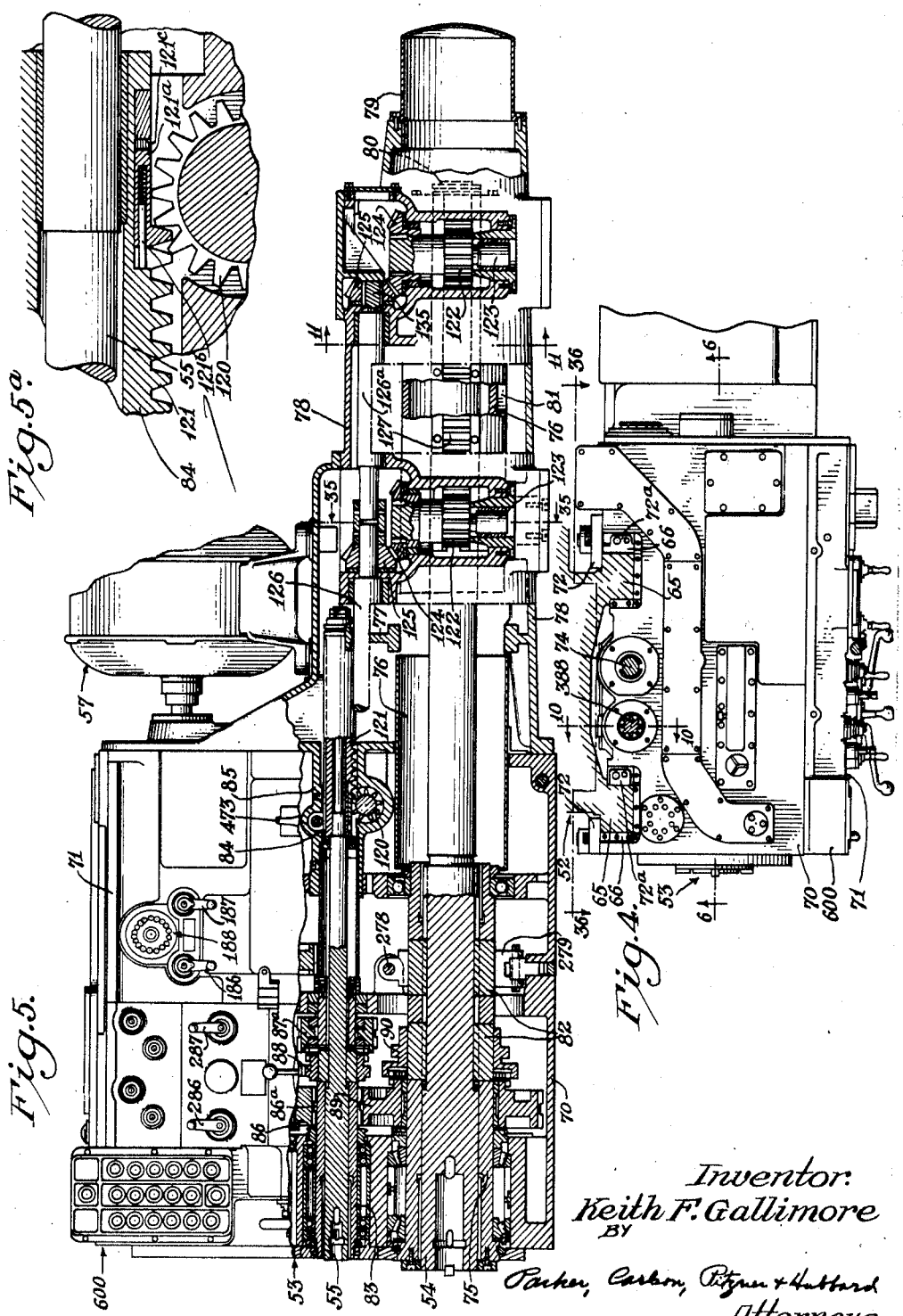

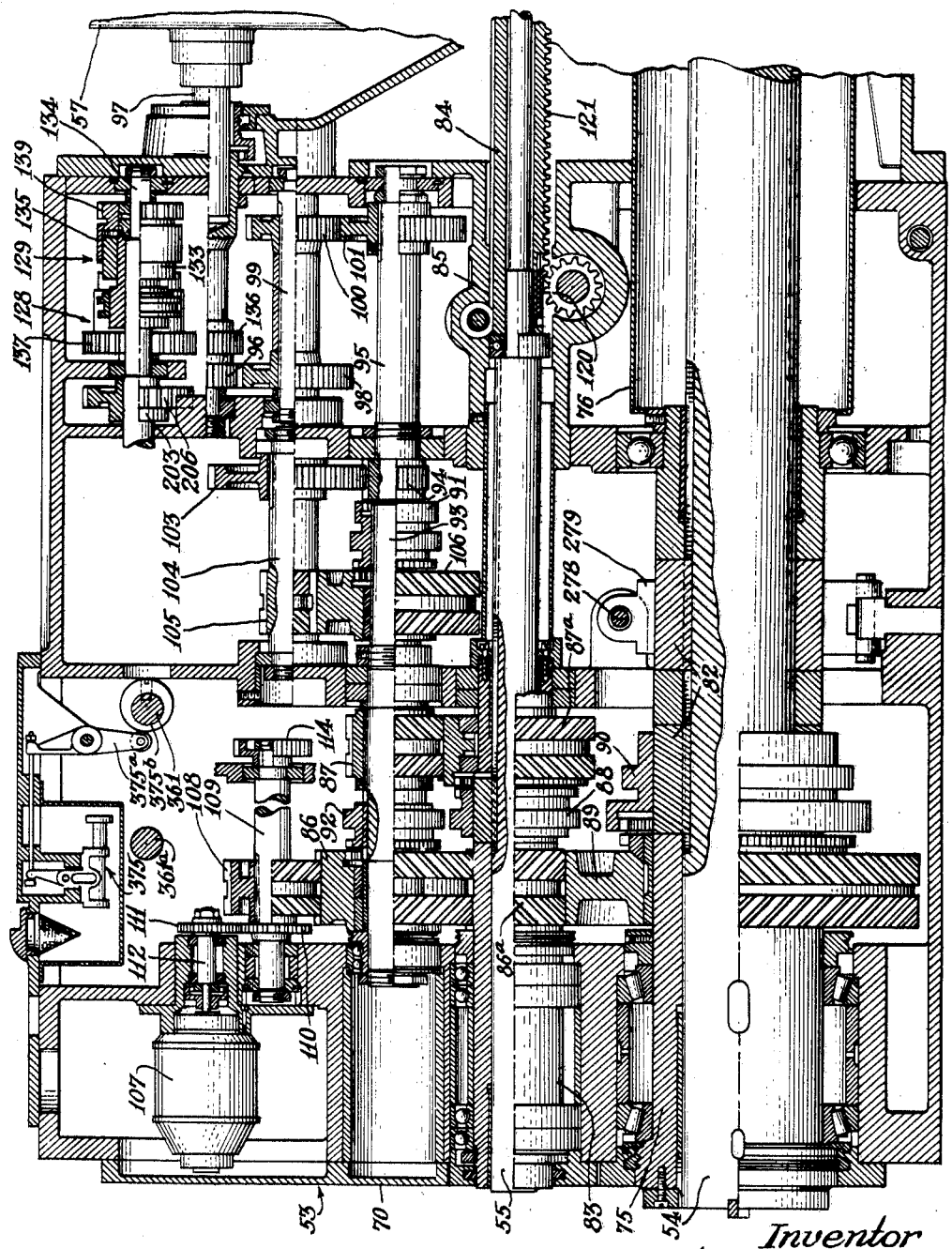

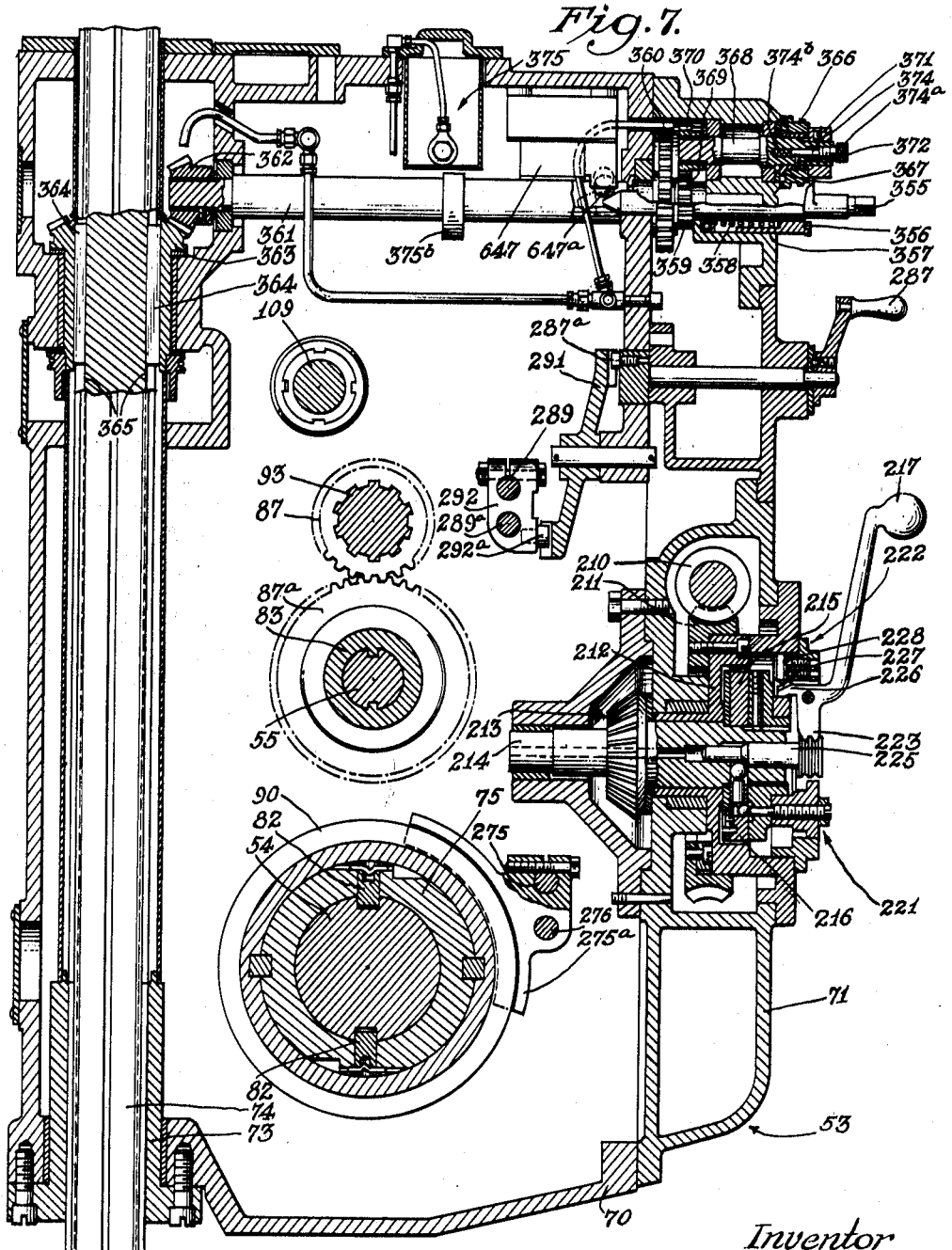

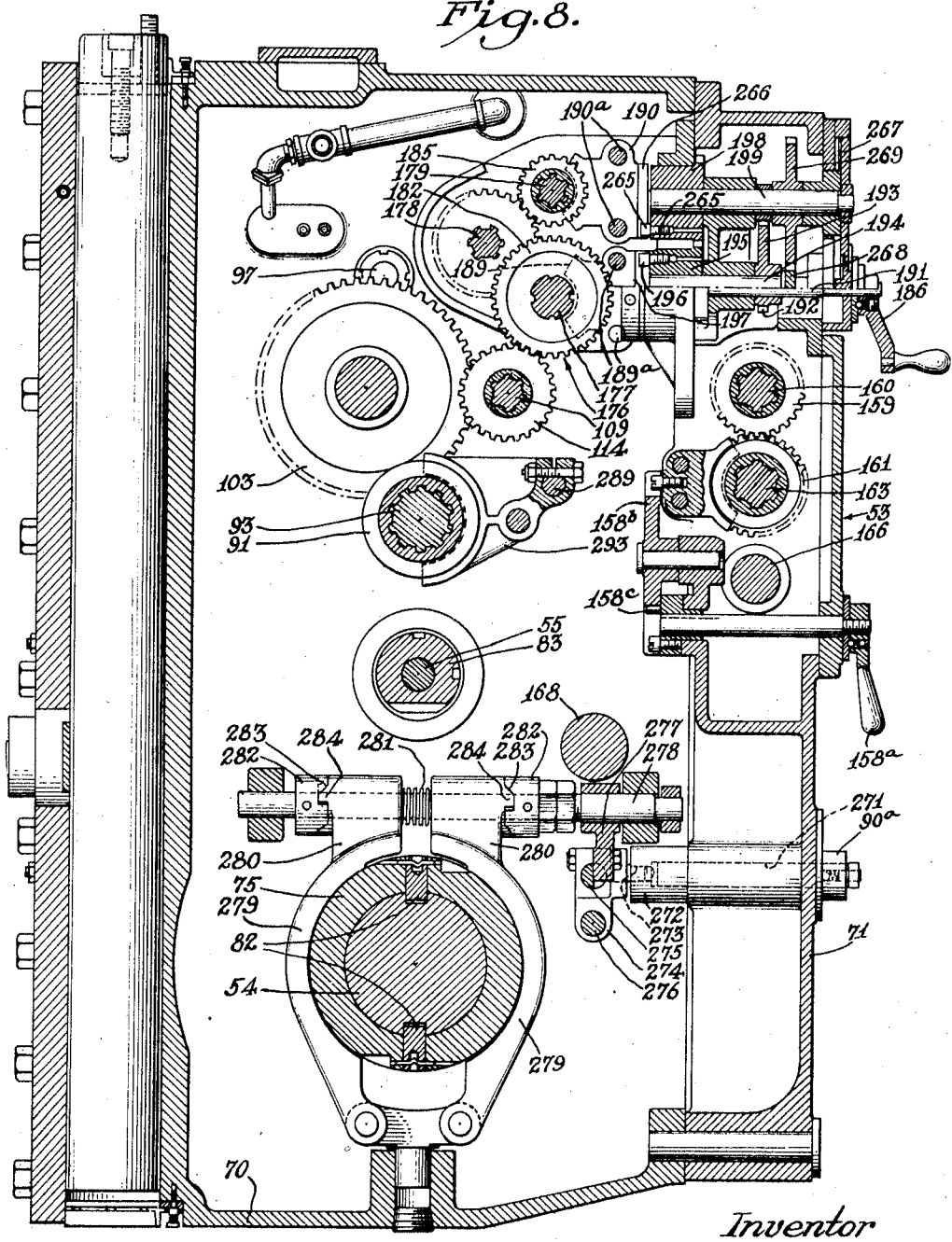

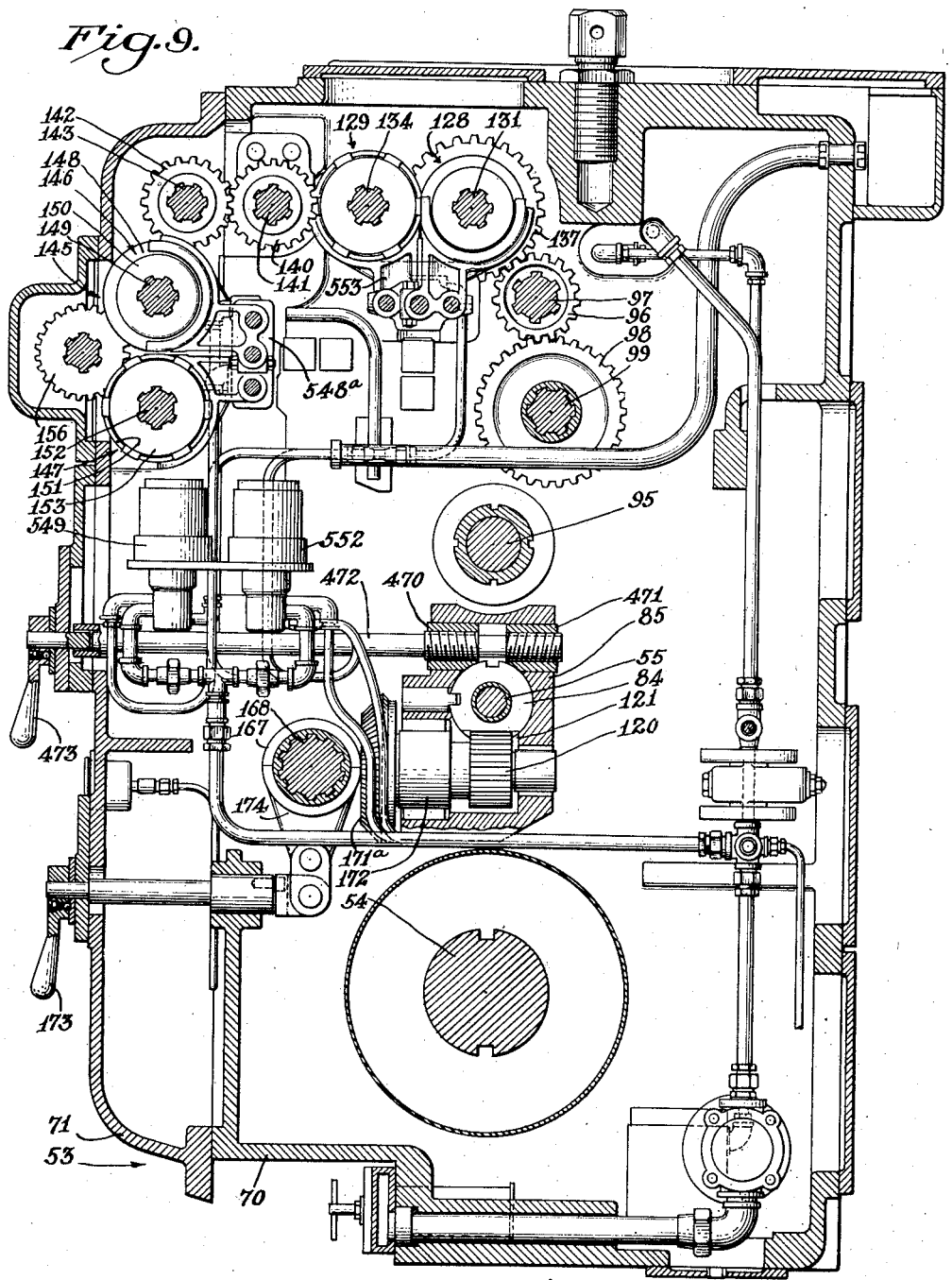

July 29, 1941.  K. F. GALLIMORE  2,251,015
MACHINE TOOL
Filed Feb. 26, 1940  25 Sheets-Sheet 9

Inventor
Keith F. Gallimore
BY
Parker, Carlson, Pitzner & Hubbard
Attorneys.

July 29, 1941. K. F. GALLIMORE 2,251,015
MACHINE TOOL
Filed Feb. 26, 1940 25 Sheets-Sheet 11
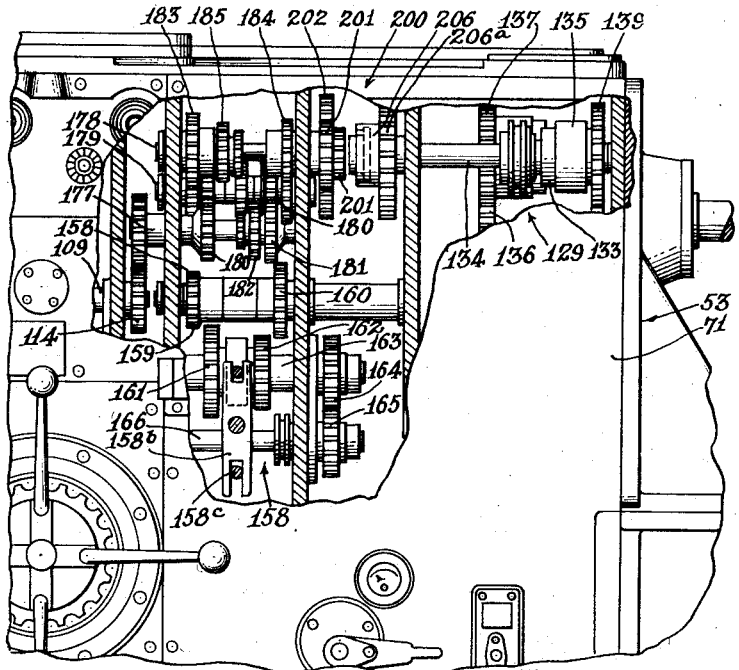
Fig.14.
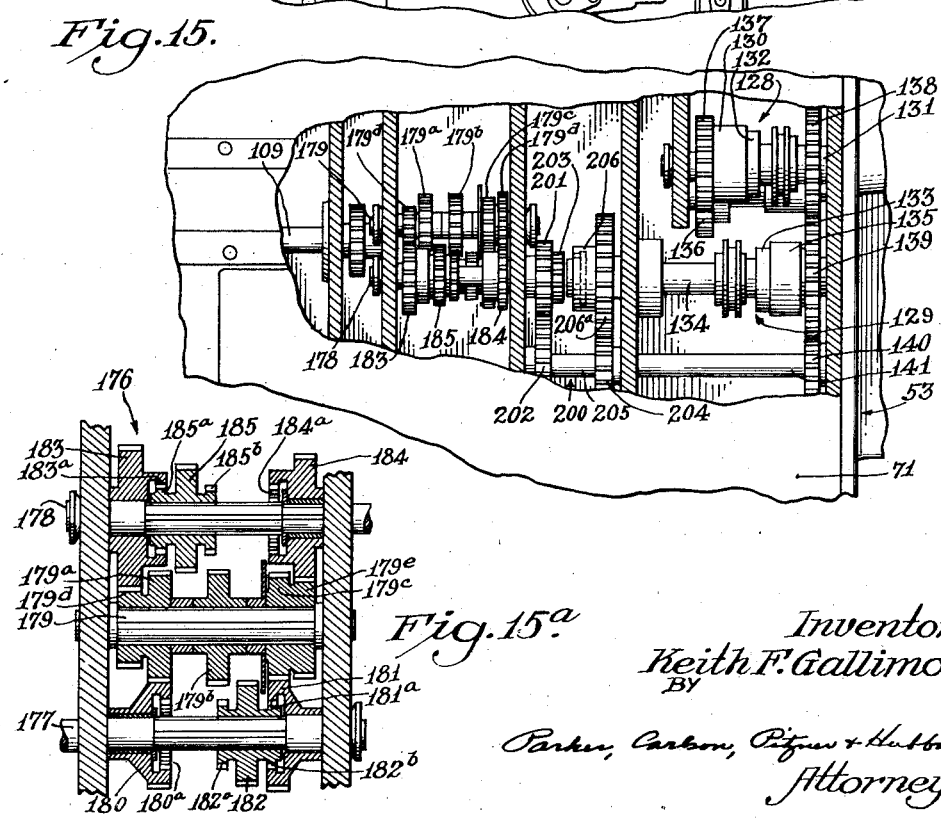
Fig.15.
Fig.15a.
Inventor
Keith F. Gallimore
BY
Parker, Carlson, Pitzner & Hubbard
Attorneys.

Inventor
Keith F. Gallimore
BY
Parker, Carlson, Pitzner & Hubbard
Attorneys.

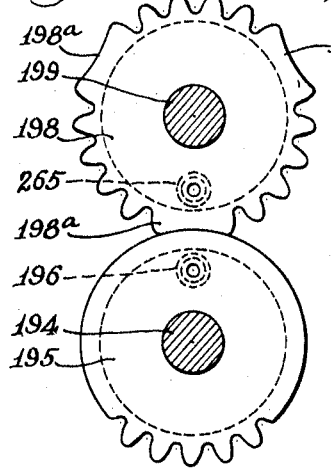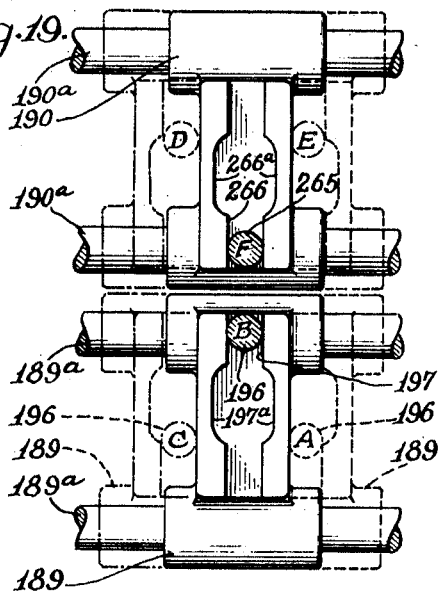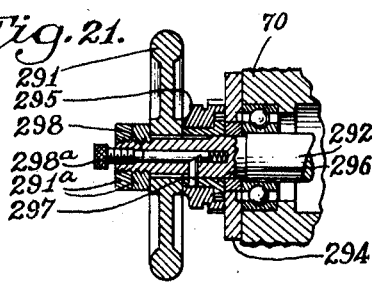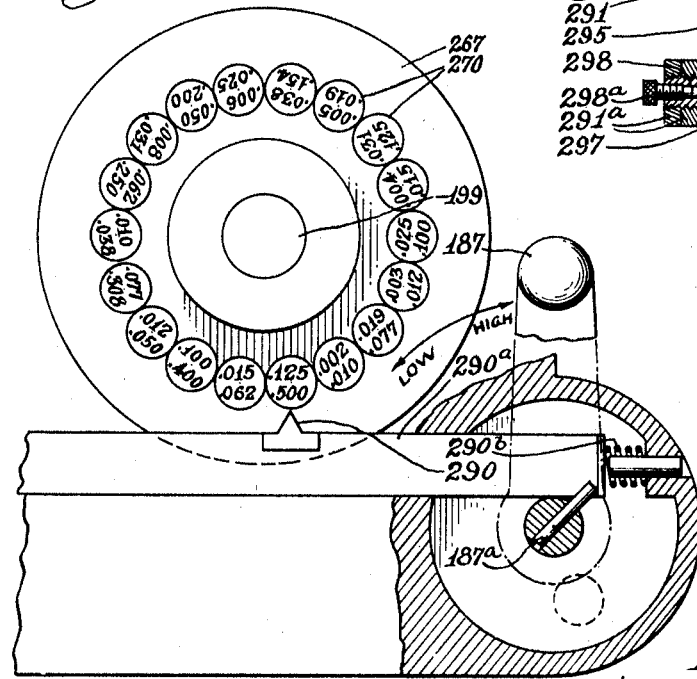

July 29, 1941.   K. F. GALLIMORE   2,251,015
MACHINE TOOL
Filed Feb. 26, 1940   25 Sheets-Sheet 14

Inventor
Keith F. Gallimore
BY
Parker, Carlson, Pitzner & Hubbard
Attorneys.

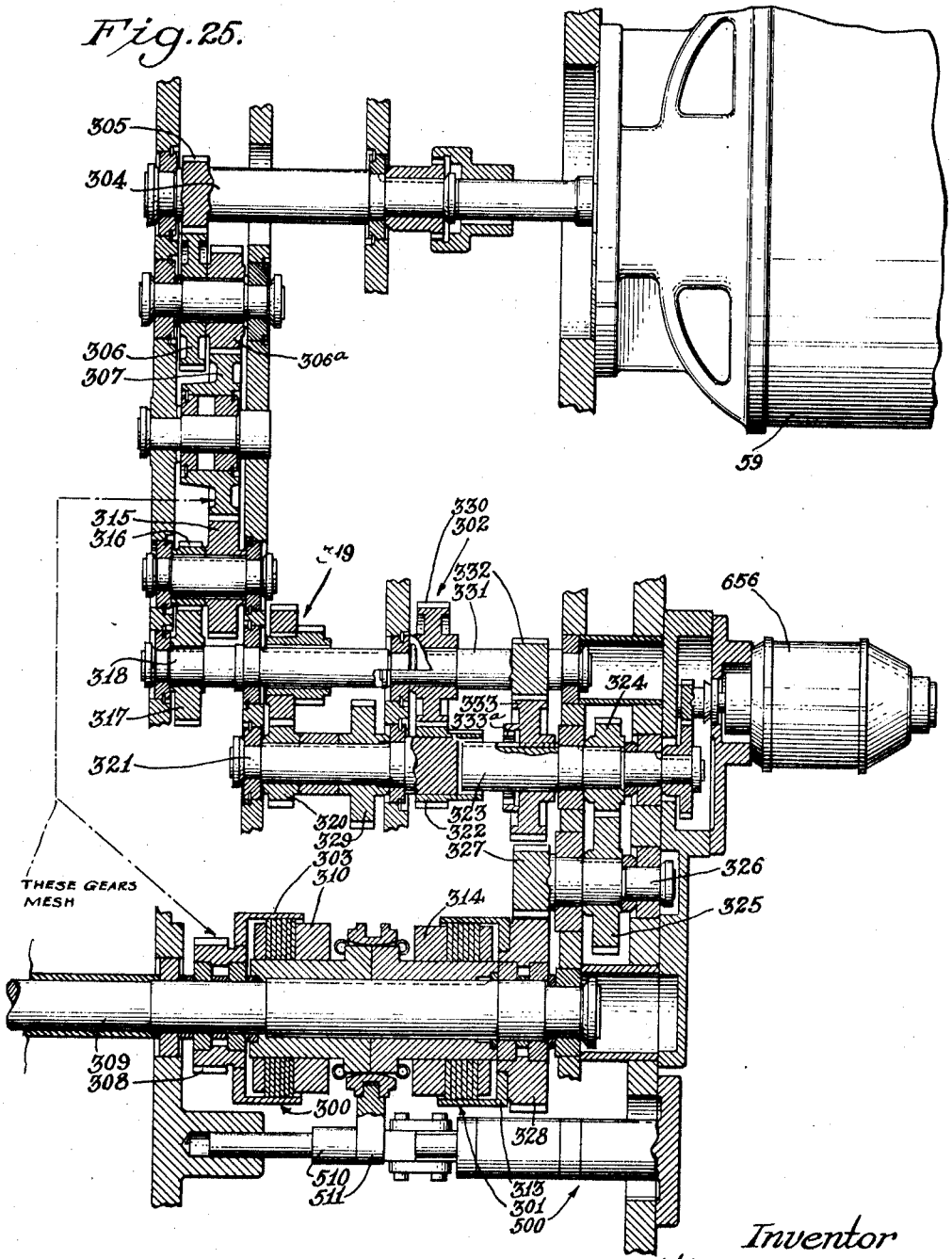

July 29, 1941.  K. F. GALLIMORE  2,251,015
MACHINE TOOL
Filed Feb. 26, 1940    25 Sheets-Sheet 16
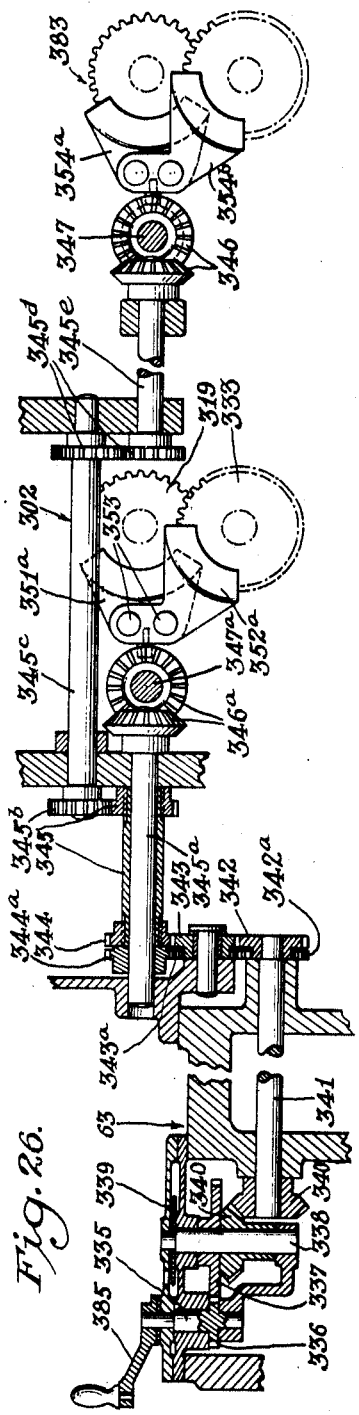
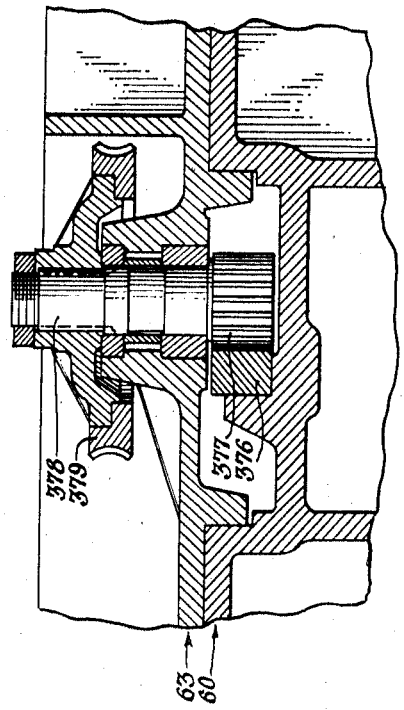
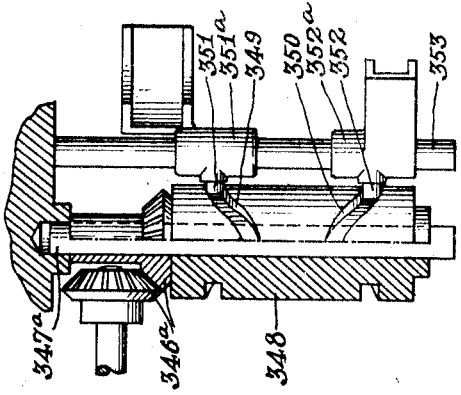
Inventor
Keith F. Gallimore
BY
Parker, Carlson, Pigner & Hubbard
Attorneys.

July 29, 1941.  K. F. GALLIMORE  2,251,015
MACHINE TOOL
Filed Feb. 26, 1940   25 Sheets-Sheet 17

Inventor
Keith F. Gallimore
BY
Parker, Carlson, Pitzner & Hubbard
Attorneys.

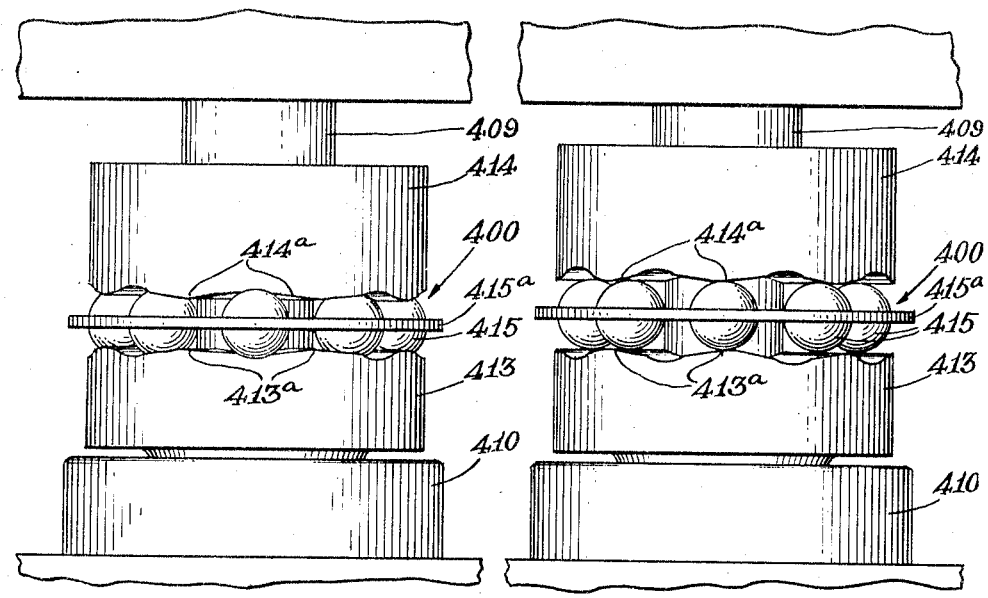

Inventor
Keith F. Gallimore
BY
Parker, Carlson, Pitzner & Hubbard
Attorneys.

July 29, 1941.  K. F. GALLIMORE  2,251,015
MACHINE TOOL
Filed Feb. 26, 1940     25 Sheets-Sheet 20
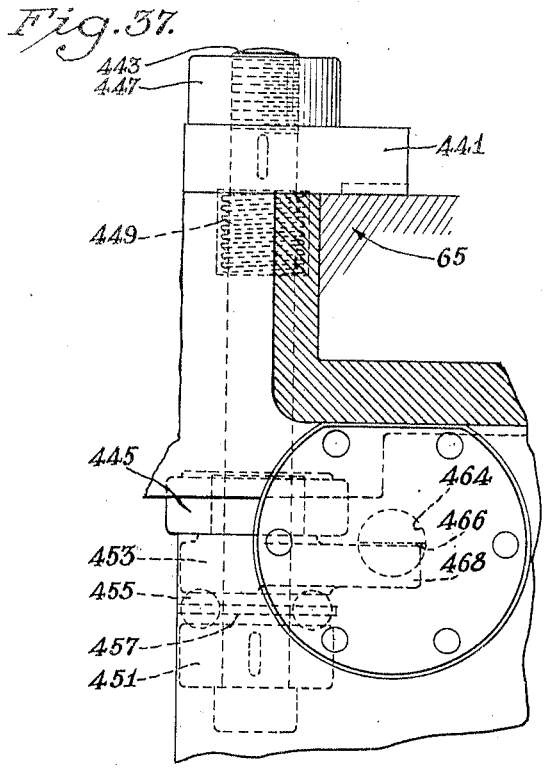
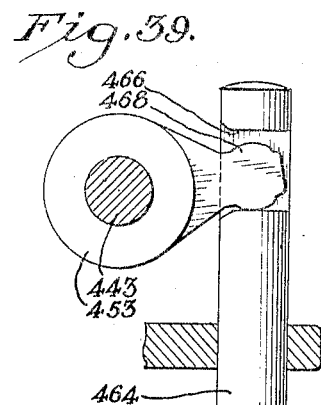
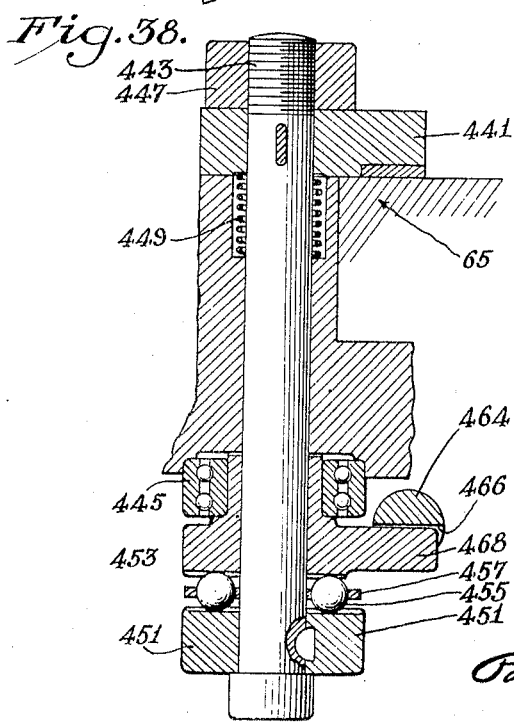
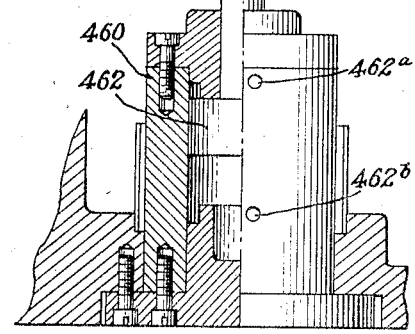
Inventor
Keith F. Gallimore
BY
Parker, Carlson, Pitzner & Hubbard
Attorneys.

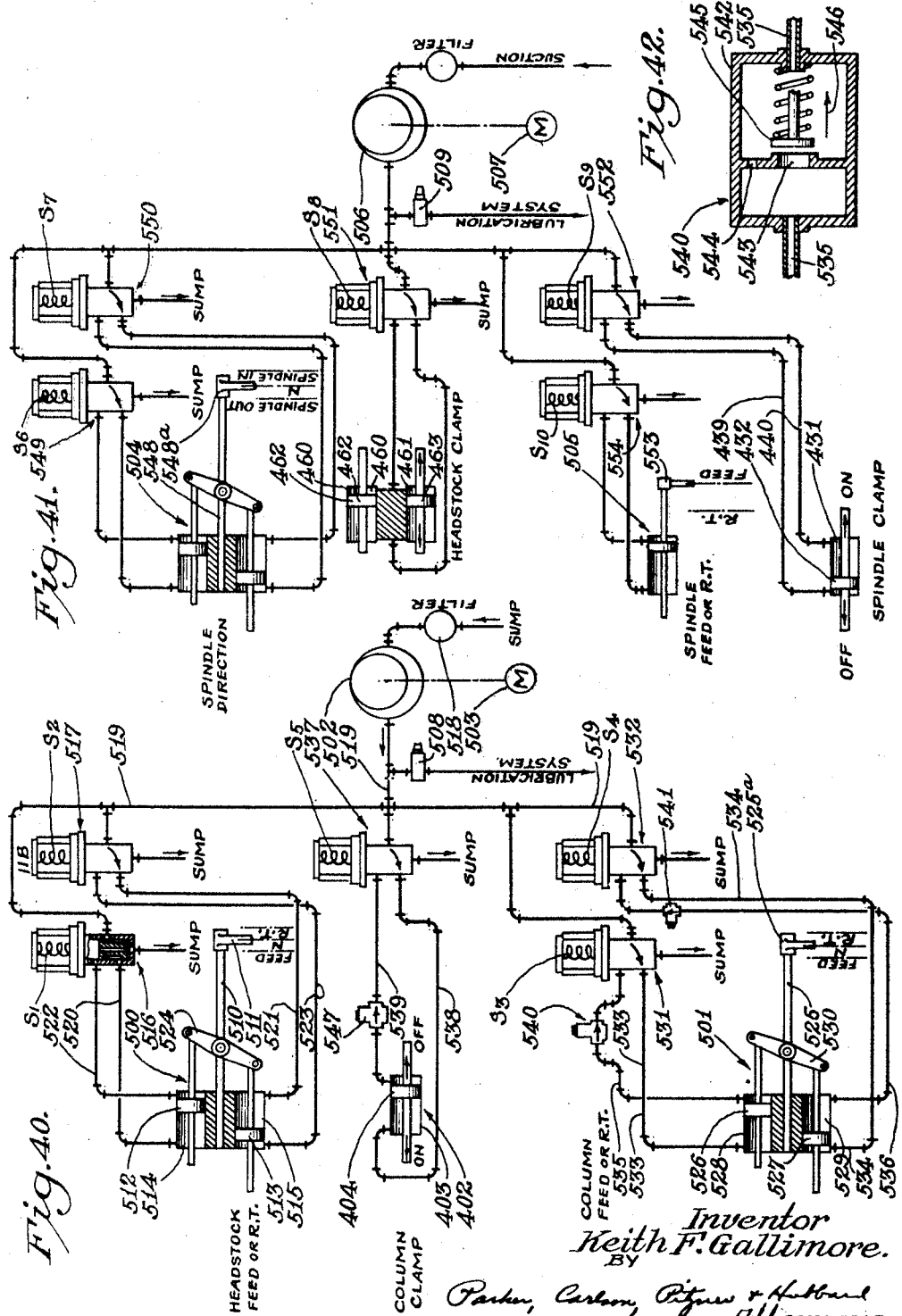

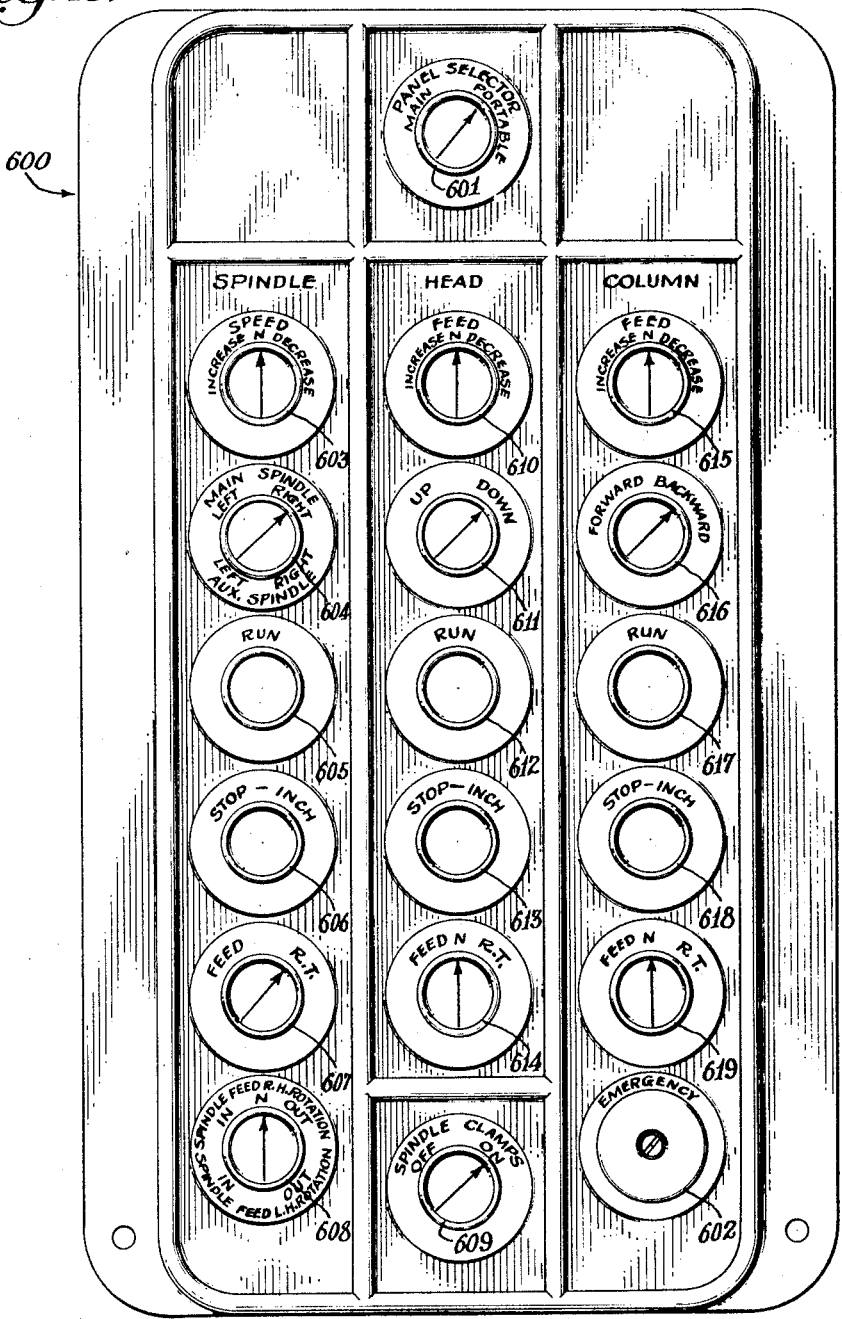

July 29, 1941. K. F. GALLIMORE 2,251,015
MACHINE TOOL
Filed Feb. 26, 1940 25 Sheets-Sheet 23

Inventor
Keith F. Gallimore
BY Parker, Carlson, Pitzner & Hubbard
Attorneys.

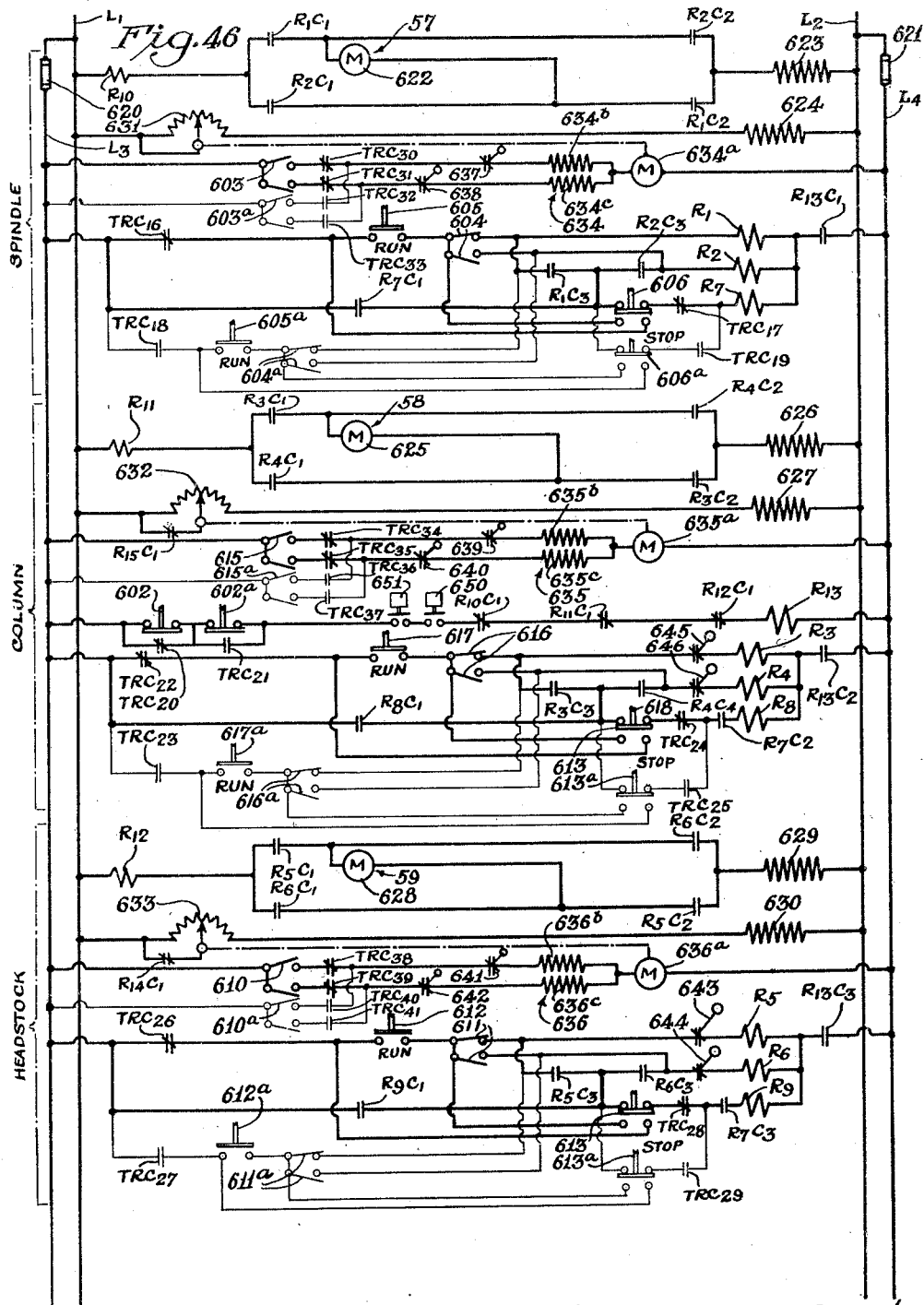

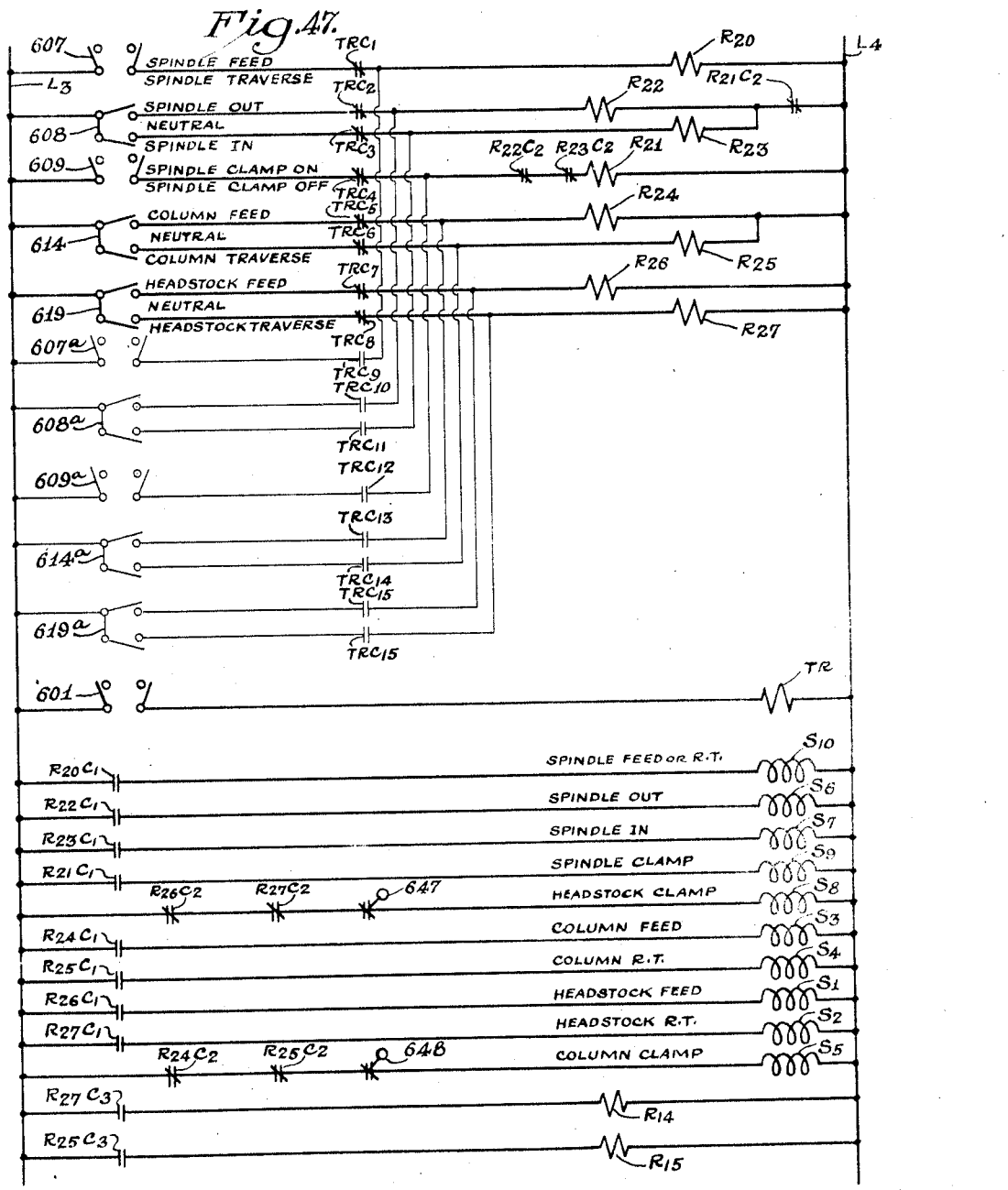

Patented July 29, 1941

2,251,015

UNITED STATES PATENT OFFICE 2,251,015

MACHINE TOOL

Keith F. Gallimore, Fond du Lac, Wis., assignor to Giddings & Lewis Machine Tool Co., Fond du Lac, Wis., a corporation of Wisconsin Application February 26, 1940, Serial No. 320,853

49 Claims. (Cl. 29—26)

The present invention relates to machine tools and finds particular utility as applied to machines of a type commonly known as horizontal boring, drilling, and milling machines. For purposes of orientation in the art the exemplary machine herein described may be considered as an improvement on that disclosed in my prior Patent No. 1,858,491, issued May 17, 1932.

One general object of the present invention is to provide a machine of the type indicated which affords a great flexibility of drive and feed speeds for the various elements and by virtue of which the versatility of the machine, or, in other words, the number of machining operations which can be performed, is increased.

Another object is to provide a machine having an extreme flexibility of control, as regards speed, direction, etc. of the feeds and drives for various elements, but in which the control operations can, nevertheless, be carried out largely by simple finger operated selector and push button switches with only a few supplemental hand levers so that fatigue in operating even a large machine is reduced to a minimum.

Another object is to provide a machine of the type indicated embodying a movable machine tool element such as a headstock together with a novel control system so organized that it may be manipulated from the moving element in order that the operator can ride the latter and keep in close touch with the work while still retaining full control of the machine.

Still another object is to provide a machine tool embodying a novel actuating arrangement for a clutch mechanism therein such that it can be readily controlled from, for example, a remote point on or about the machine.

A further object is to provide in a machine tool an improved and simplified form of rotary drive and axial feed mechanism for a tool spindle, operable by a single motor as a source of power.

The invention also resides in a novel clamp controlling and actuating arrangement as well as in an improved interlocking system therefor.

Further objects and advantages of the invention will become apparent as the following description proceeds, taken in connection with the accompanying drawings in which:

Fig. 3 is an enlarged front elevation of the main body of the headstock.

Fig. 4 is a plan view of the headstock.

Fig. 5 is a front elevation of the headstock with a portion of the casing broken away to show the arrangement of the tool spindles.

Fig. 5ᵃ is an enlarged detail sectional view of the safety teeth of the auxiliary spindle feed mechanism.

Fig. 6 is a longitudinal vertical sectional view of of the headstock taken along the lines 6—6 in Fig. 4.

Figs. 7, 8 and 9 are vertical transverse sectional views of the headstock taken along the lines 7—7, 8—8 and 9—9, respectively, in Fig. 3.

Figure 10:
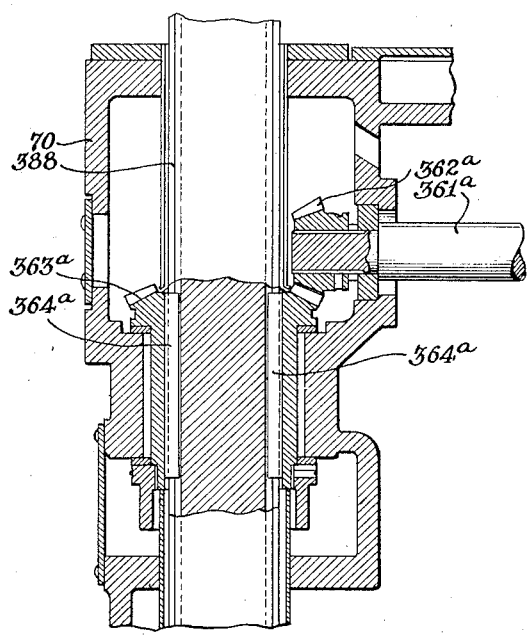

Fig. 10 is a detail vertical sectional view along the line 10—10 in Fig. 4.

Figure 11:
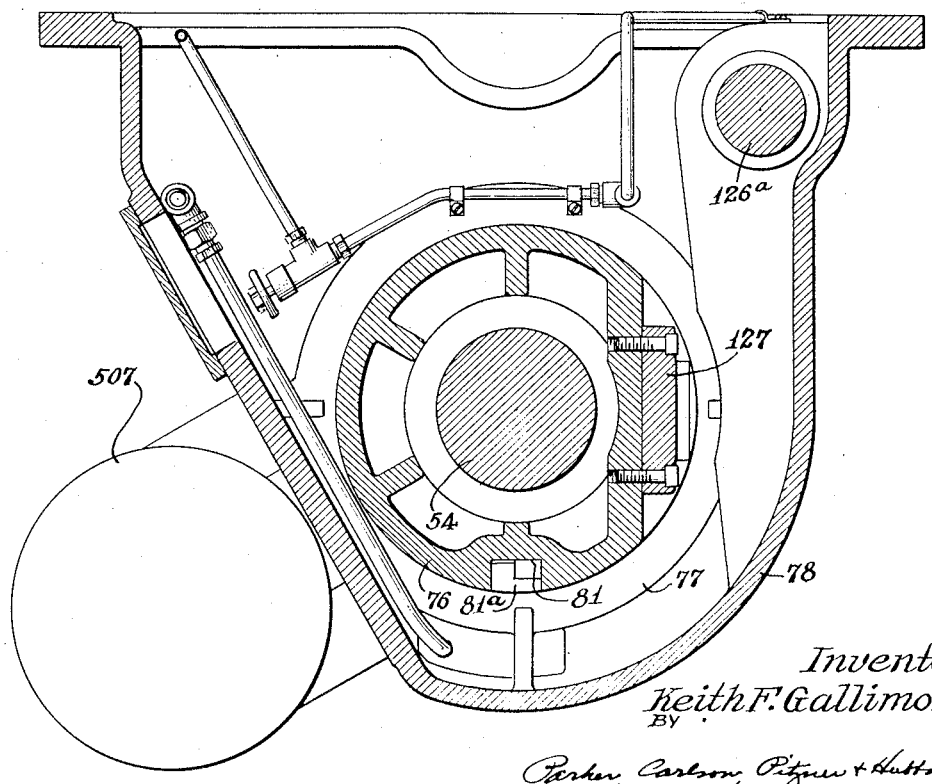

Fig. 11 is a transverse sectional view through the ram housing extension on the headstock, taken along the line 11—11 in Fig. 5.

Figure 12:
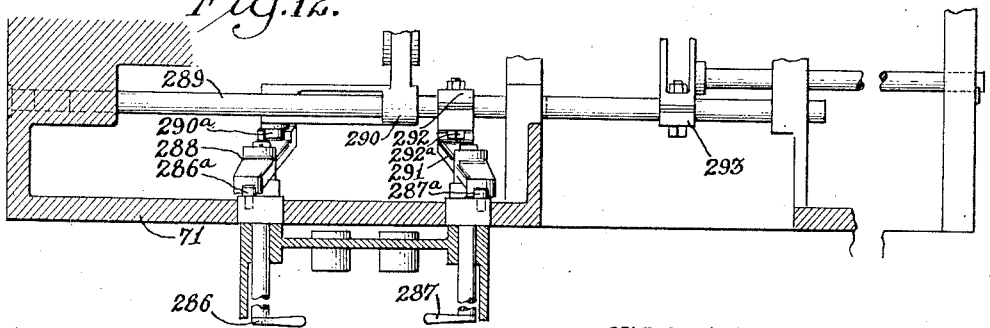

Fig. 12 is a plan view of the shifter mechanism for the clutches in the spindle drive mechanism, partially in section along the line 12—12 in Fig. 3.

Figure 13:
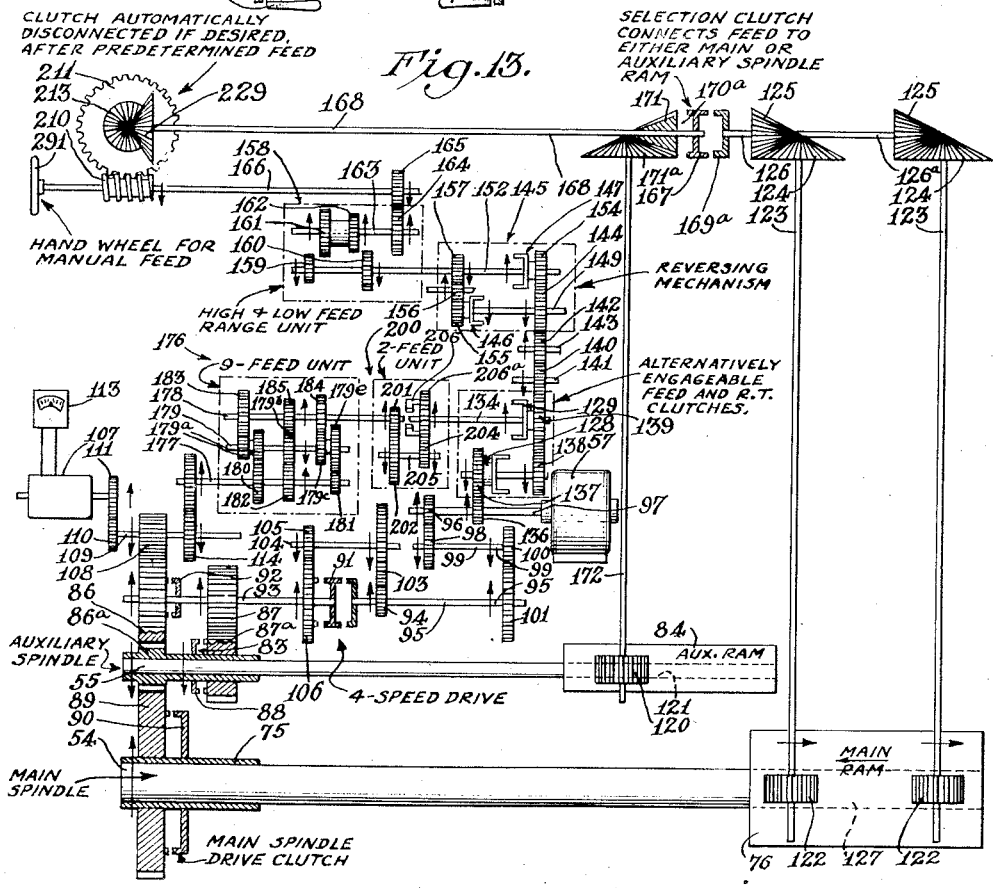

Fig. 13 is a diagrammatic layout of the combined spindle feed and drive mechanisms in the headstock.

Fig. 14 is an enlarged front elevation of the upper right hand portion of the headstock with a portion of the cover broken away to show the internal arrangement of the gearing.

Fig. 15 is a plan view of the gearing shown in Fig. 14.

Fig. 15ᵃ is a development of a nine-feed unit included in the gearings of Figs. 14 and 15.

Figure 16:
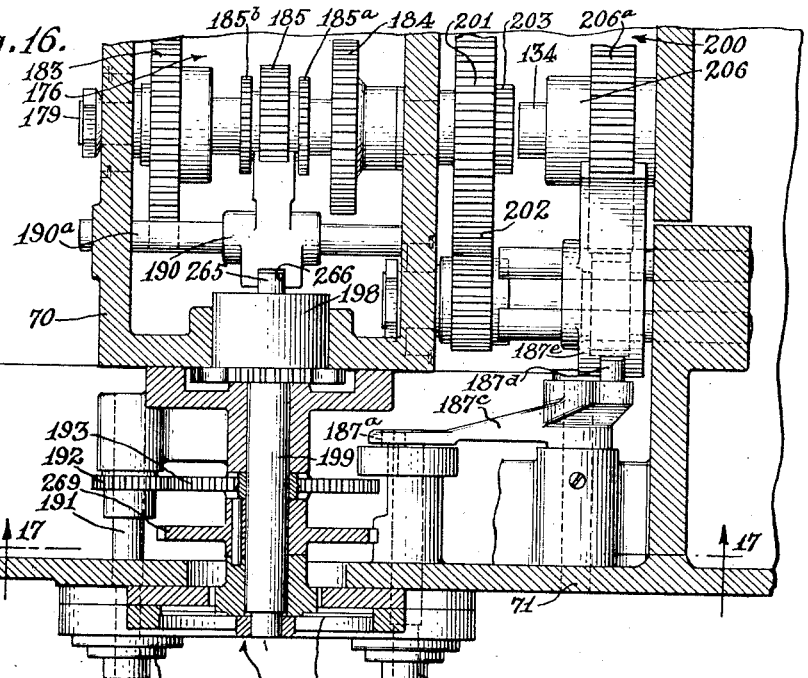

Fig. 16 is a plan view of the shifter mechanism for the nine and two-feed units shown in Figs. 14 and 15, the supporting structure being sectioned along the line 16—16 in Fig. 3.

Figure 17:
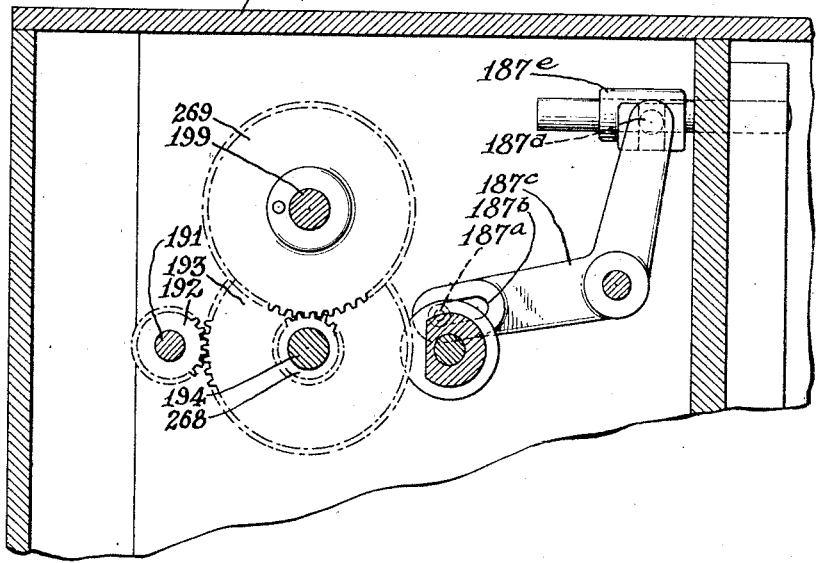

Fig. 17 is a vertical sectional view of the actuator mechanism of Fig. 16 taken along the line 17—17 in the latter figure.

Fig. 18 is a front face view of the intermittent gears included in the nine-feed shifter mechanism of Fig. 16.

Fig. 19 is a front face view of the shifter shoes cooperating with the intermittent gears of Fig. 18.

Fig. 20 is a detail view of the indicator mechanism associated with the combined nine and two-feed shifter mechanism of Fig. 16.

Fig. 21 is an enlarged vertical sectional view of the hand wheel for the manual feed mechanism of the spindles.

Figure 22:
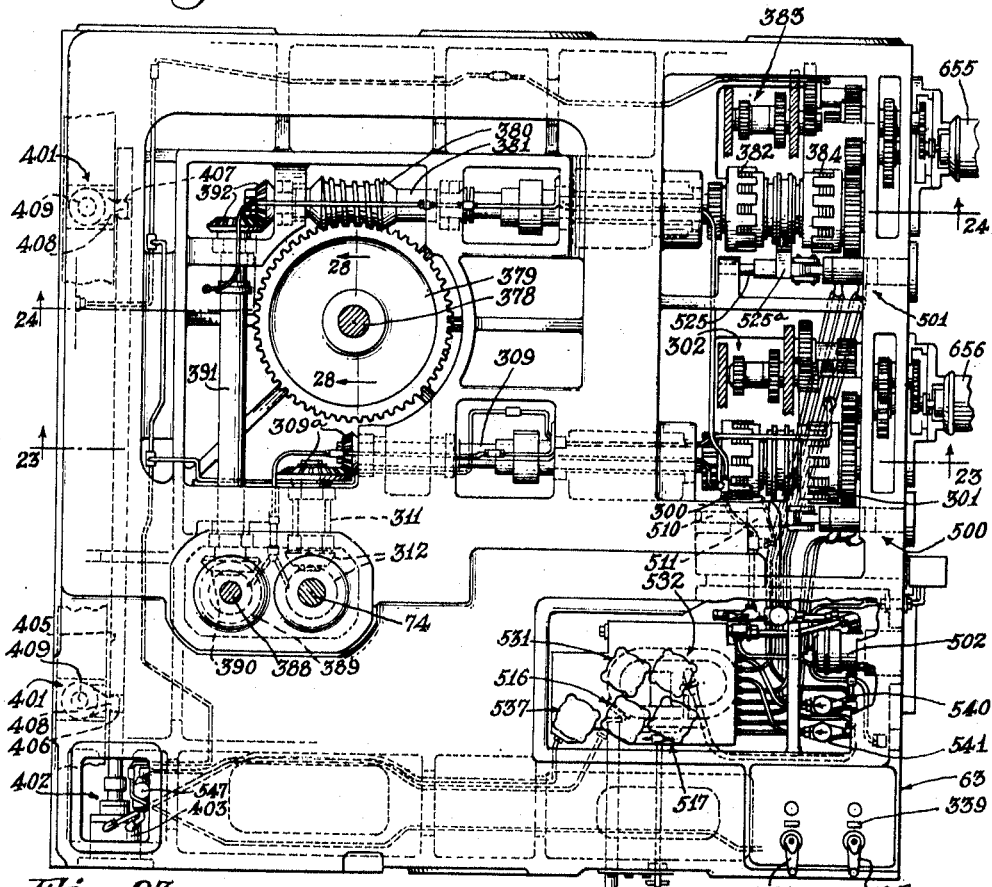

Fig. 22 is a plan view of the column base.

Figure 23:
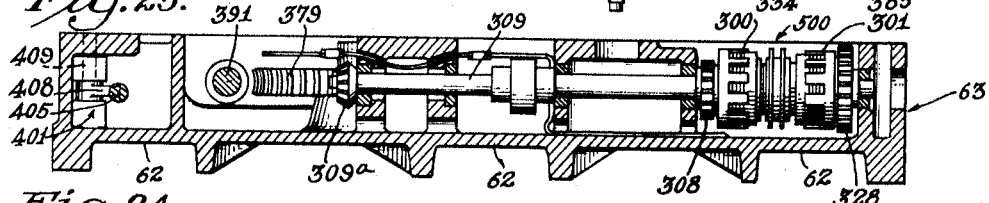
Figure 24:
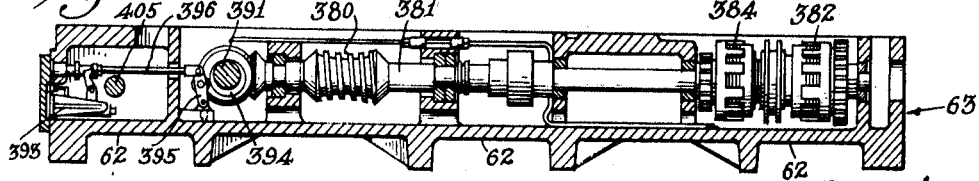

Figs. 23 and 24 are transverse sectional views of the column base casting taken along the lines 23—23 and 24—24, respectively, in Fig. 22.

Fig. 25 is a development of the gear connections for the headstock power feed.

Fig. 26 is a development of the actuator mechanism for the feed-change units in the column and headstock feeds.

Fig. 27 is a bottom plan view, partially in section, of a portion of the shifter mechanism of Fig. 26.

Fig. 28 is an enlarged detail sectional view along the line 28—28 in Fig. 22.

Figure 29:
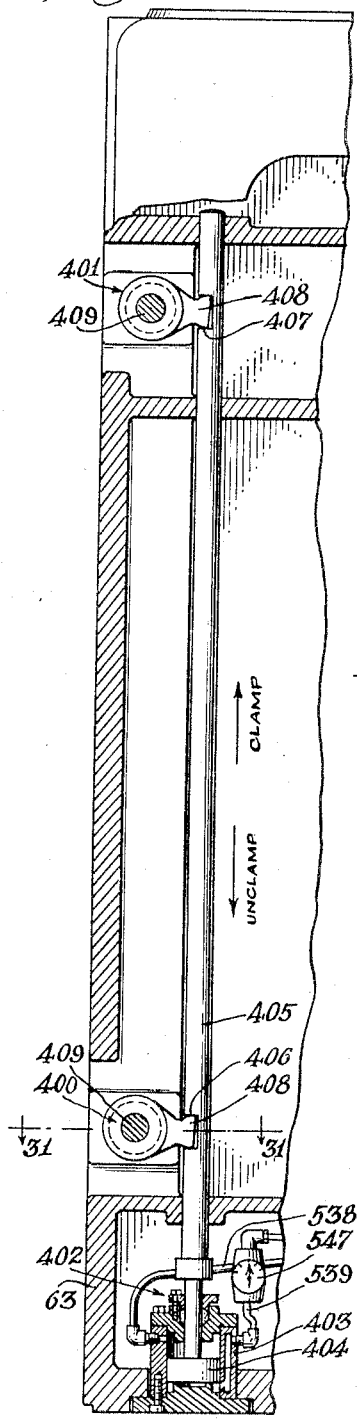

Fig. 29 is an enlarged plan view partially in section of the left hand portion of the column base of Fig. 22 showing the column clamping mechanism.

Figure 30:
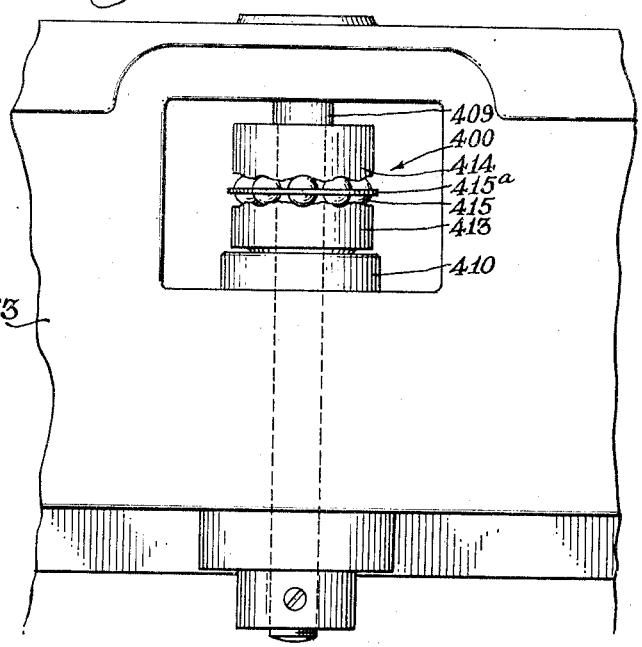

Fig. 30 is an enlarged elevation of one of the column clamp mechanisms.

Figure 31:
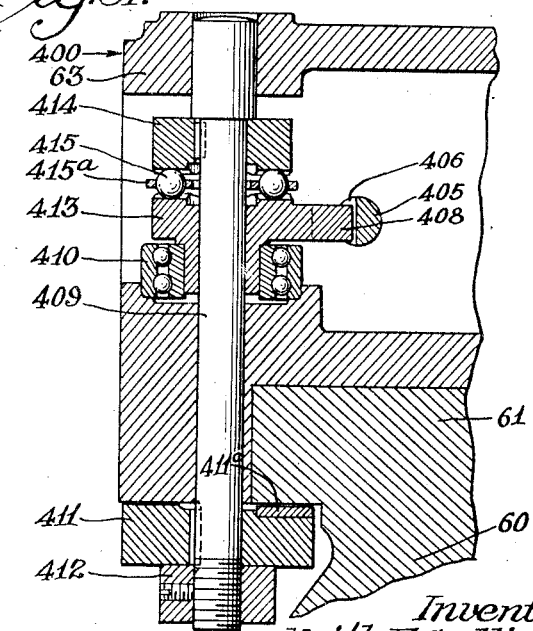

Fig. 31 is an enlarged vertical sectional view along the lines 31—31 in Fig. 29.

Figs. 32 and 33 are enlarged side elevation stop motion views of one of the column clamp mechanisms showing the same respectively in released and clamped positions.

Fig. 34 is a rear view partially in section of the ram housing extension on the headstock showing the clamping mechanism for the main spindle ram.

Figure 35:
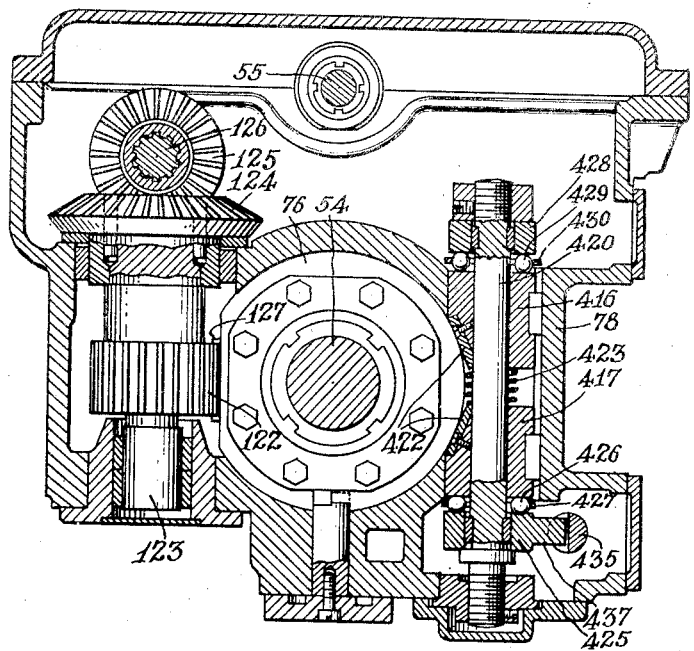

Fig. 35 is a transverse sectional view through the ram extension on the headstock along the line 35—35 in Fig. 5.

Figure 36:
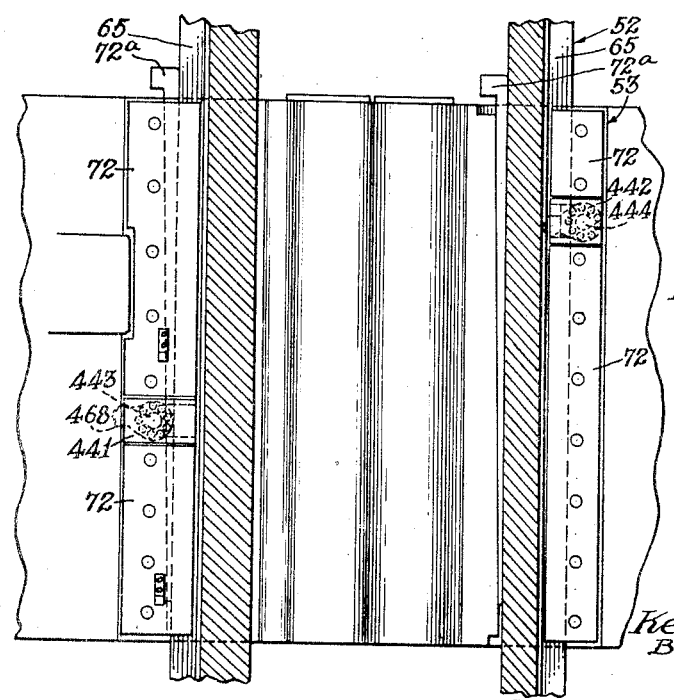

Fig. 36 is a vertical section along 36—36 in Fig. 4 showing the rear face of the main body of the headstock and the location of the headstock clamps.

Fig. 37 is an end elevation of one of the headstock clamping mechanisms.

Fig. 38 is a vertical sectional view of the clamping mechanisms of Fig. 37.

Fig. 39 is a side elevation, partially in section, of the hydraulic actuator for the clamping mechanism of Fig. 37.

Fig. 40 is a schematic layout of the hydraulic system in the column base.

Fig. 41 is a schematic layout of the hydraulic system in the headstock.

Fig. 42 is a diagrammatic sectional view of one of the cycle valves included in the system of Fig. 40.

Fig. 43 is an enlarged front elevation of the electrical control panel mounted on the headstock.

Figure 44:
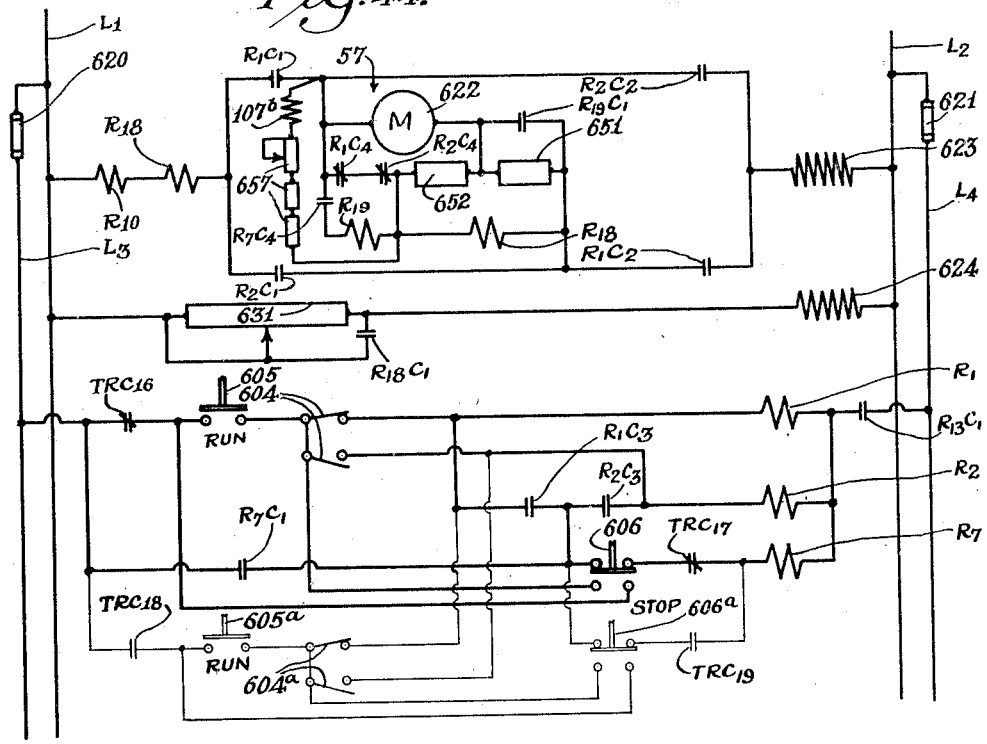

Fig. 44 is a wiring diagram of the spindle motor control circuits.

Figure 45:
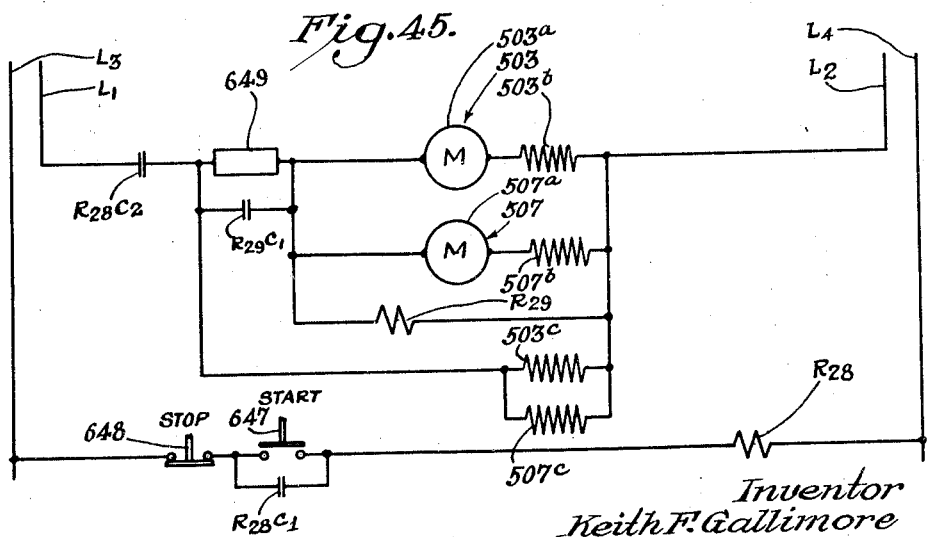

Fig. 45 is a wiring diagram of the pump motor control circuits.

Fig. 46 is a simplified wiring diagram of the control circuits for the spindle, column and headstock motors.

Fig. 47 is a wiring diagram of the control circuits for the various valve controlling solenoids of the hydraulic circuits of Figs. 40 and 41.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention, as expressed in the appended claims.

For the purposes of exemplification, the invention has been shown and described herein as embodied in a horizontal boring, drilling and milling machine. The particular machine chosen for illustration is of very large size and various features of the invention make possible the effectual and accurate control of such a large machine without fatigue on the part of the operator and despite the large distances through which its various movable elements are displaced while in operation.

General organization of machine

Referring more particularly to the drawings, the machine constituting the exemplary embodiment of the invention comprises a main base or bed 50 (Figs. 1 and 2) anchored to the floor and having T-slots 51 in its top surface to which a work piece (not shown) may be secured. Rising at the right hand end of the bed is a vertical column 52 carrying a head stock 53 having main and auxiliary tool spindles 54 and 55 adapted to be projected horizontally over the bed 50 into operative relation with the work piece. At the opposite end of the bed is a tailstock 56 which may be of any suitable well known form.

Means is provided for rotatably driving the spindles 54 and 55 including, as a prime mover, an electric driving motor 57 carried on the rear of the headstock 53. As will hereinafter appear in greater detail, variations in speed of spindle rotation may be accomplished both by varying the speed of the motor 57 and by varying the ratios of the gear connections between the motor and the spindles.

Three dimensional relative feeding motions between the spindles 54, 55 and a work piece on the bed 50 are, in the present instance, accomplished by, first, axial feeding of the spindles 54 and 55 in a horizontal direction, second, horizontal traversing of the column 52 in a direction transverse to the spindle axes, and third, vertical traversing of the headstock 53 on the column 52. In the case of the feeds for the column 52 and headstock 53, separate electric driving motors 58 and 59, fixed to the base of the column, are provided. The axial spindle feed is, however, effected by means of the spindle driving motor 57. By utilizing one motor to accomplish both feeding and driving of the spindles not only is the number of motors required minimized but in addition a duplication of controls is obviated and automatic maintenance of a preselected ratio of feed and drive speeds is insured.

To support the column 52 for its horizontal traversing motion, a platform or runway 60 is rigidly anchored at the right hand end (Fig. 1) of the bed 50. Three horizontal guides 61 on the top surface of the platform are received in complemental guideways 62 in a generally rectangular base 63 of the column 52. Gib plates 64 underlie the laterally projecting edges of the platform 60 so that the column is guided for rectilinear movement longitudinally of the platform.

The headstock 53 is in turn vertically traversable on the column 52. To this end a pair of spaced vertical guides 65 are provided on the front face of the column and received within complemental guideways 66 on the rear face of the headstock.

Figure 1:
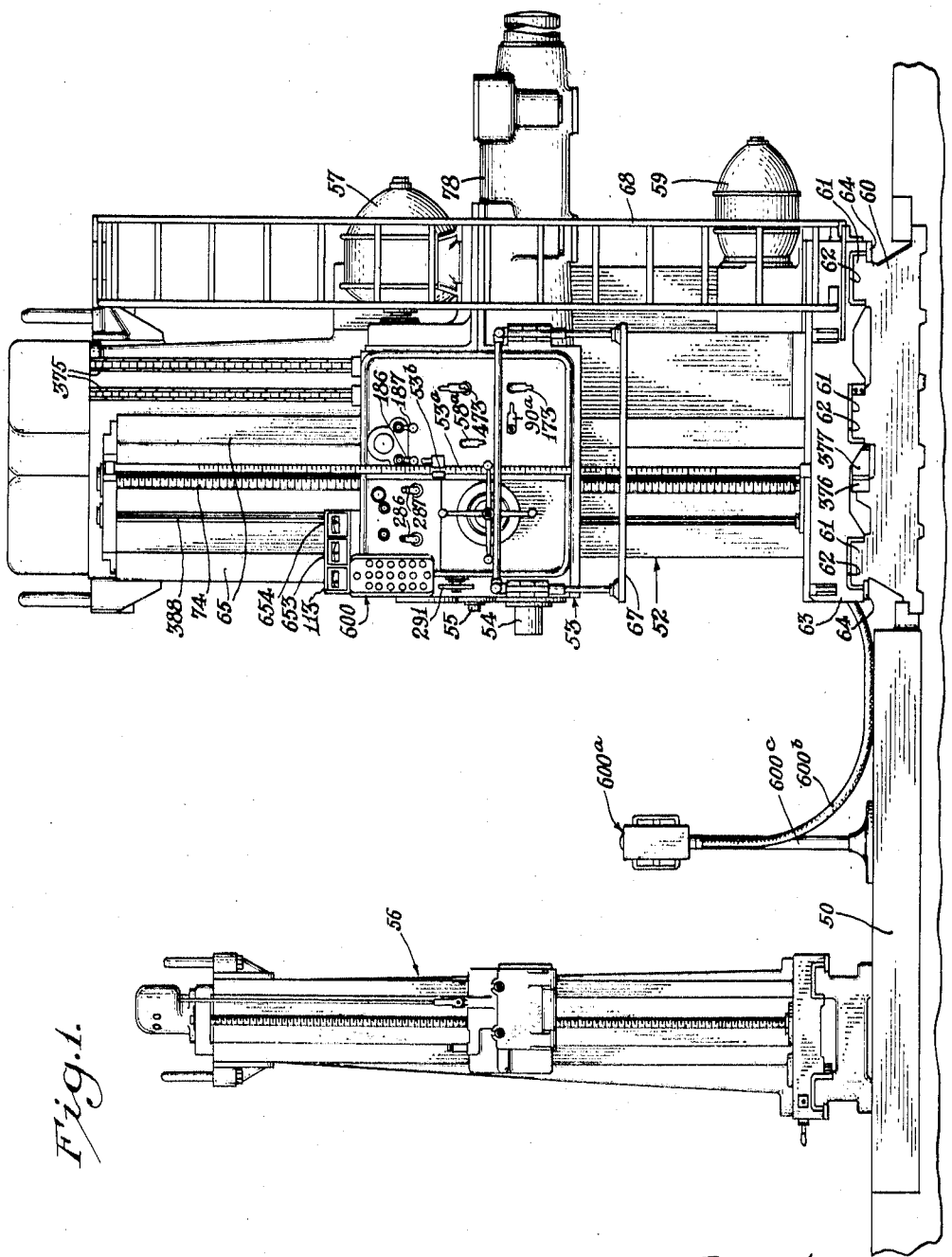
Figure 1 is a front elevational view of a machine tool embodying the features of my invention.

To achieve maximum efficiency in operation of the machine, despite its size and consequent necessary wide separation of its several elements, a unified set of controls is mounted on the headstock 53 (Fig. 1). A platform 67, reached by a ladder 68 on the side of the column 52, is suspended at the outer side of the headstock 53 so that the operator can ride the headstock, thus keeping in close touch with the work at all times while retaining full control of the machine through the medium of the control devices provided on the headstock.

With the foregoing as a general outline, the various units will now be described in detail.

Headstock

The headstock 53 comprises (Figs. 3, 4 and 5) a casing 70 of generally rectangular form with suitable interior reenforcing webs and closed at the front by a removable cover 71. The parallel spaced guideways 66 heretofore noted are fashioned on the rear face of this casing 70 (Fig. 4). Removably secured to the casing 70 and overlapping the rear faces of the ways 65 are two fixed outer gib or clamp plates 72. These plates 72 are interrupted intermediate their ends (see Fig. 36) to make room for clamping shoes, hereinafter described, for clamping the headstock 53 rigidly in position on the guides 65. Tapered gibs 72ᵃ are also provided.

The vertical power feed for the headstock 53 comprises a nut 73 rigidly mounted at the rear of the casing 70 (Fig. 7) and a vertical feed screw 74 (see also Fig. 4) threaded in the nut and extending through the casing to the top of the column 52 (Fig. 1) where it is rotatably anchored. The lower end of the screw 74 is adapted for connection to the headstock feed motor 59.

The main spindle 54 and the auxiliary spindle 55 are mounted in parallel superimposed relation in the headstock casing 70 and project through the left end wall (Fig. 5), the projecting end of each spindle being provided with the usual tapered socket for the reception of a cutting tool (not shown).

In the illustrative construction (Fig. 5) the left end of the main spindle 54 extends through and is splined longitudinally in a sleeve 75 by spline keys 82, the sleeve being suitably journaled in the casing 70. The right end of the spindle 54 extends freely through a ram 76 slidably disposed in bearings 77 formed in an elongated casing extension 78 projecting from the right end of the headstock casing 70. A cup shaped shell 79 removably secured to the end of the casing extension 78 closes the latter. The ram 76 is splined against rotation by a key 81ᵃ received in a longitudinal groove 81 in its lower side (Fig. 11). Preferably the outer end of the spindle is mounted in and secured against endwise movement by ball bearings 80 in the right end of the ram 76.

Similarly the auxiliary spindle 55 (Fig. 5) also extends through and is longitudinally splined in a sleeve 83 at its left end, this sleeve being suitably journaled in the headstock casing 70. The inner or right end of the auxiliary spindle is reduced in size and extends freely through and is journaled in an elongated guide sleeve 84 which constitutes a feed ram. The latter is slidably mounted in a fixed elongated bearing 85 in the casing 70 and is splined against rotation.

Vertical displacement of the headstock 53 along its path of travel is shown at all times by a stationary vertical scale 53ᵃ (Fig. 1) cooperating with an index pointer 53ᵇ fixed to the headstock.

Spindle drives

Both the main and auxiliary spindles 54 and 55 are driven, i. e. rotated, by the single spindle motor 57. In the case of the auxiliary spindle, power is applied to its driving sleeve 83 (Figs. 6 and 13) through one or the other of a pair of gears 86 and 87. These gears are, respectively, in mesh with a complemental set of gear teeth 86ᵃ fashioned in the sleeve 83 and with a gear 87ᵃ. The gear 86 is loosely journaled on an intermediate driving shaft 93 while the gear 87ᵃ is loosely journaled on the sleeve. To render one or the other of the gears 86 and 87 operative to drive the clutch members 92 and 88 are alternatively engaged. The clutch member 92 is splined on the shaft 93 and is axially slidable to couple the gear 86 to this shaft. Alternatively, the gear 87ᵃ is coupled to the spindle sleeve 83 by the axially slidable clutch member 88 splined on the sleeve, the meshing gear 87 being fast on the shaft 93.

In the case of the main spindle 54, power is applied to its sleeve 75 through a bull gear 89 loosely journaled on the sleeve 75 and arranged to be coupled to it by an axially slidable clutch member 90 splined on the sleeve (Fig. 5). The bull gear 89 meshes with the gear teeth 86ᵃ, the arrangement being such that the auxiliary spindle 55 is always in operation when the main spindle 54 is rotating although the latter may be rendered operative at will through the medium of the clutch member 90.

The main spindle disconnection clutch 90 is operated by a handle 90ᵃ on the front of the headstock (Fig. 3), and means is also provided for utilizing this handle to set a brake on the spindle sleeve 75 to stop the main spindle rotation whenever its drive is disconnected by the clutch 90. For this purpose the handle 90ᵃ is fixed to a shaft 271 (Fig. 8) journaled in the headstock casing cover 71 for 180° rotation. On the inner end of this shaft is mounted a collar 272 from the end of which an eccentrically located crank pin 273 projects. This crank pin is received in a slot in a shifter shoe 274, which is clamped on a horizontal rod 275 and is guided for sliding movement on a second horizontal rod 276. The axially shiftable rod 275 has fixed to it a shifter shoe 275ᵃ (Fig. 7) engaged with the clutch member 90 and consequently, axial movement of the rod 275 resulting from oscillation of the handle 90ᵃ shifts the clutch member 90 into and out of engaged position. Additionally, the rod 275 has a notch 275ᵇ therein (Fig. 3) in which is received the nose of a crank 277 (Figs. 3 and 8) fixed on a transverse brake shaft 278. Beneath this brake shaft is mounted a pair of pivoted brake shoes 279 embracing opposite sides of the main spindle sleeve 75 (see also Fig. 5) and having integral collars 280 on their upper ends slidable on the brake shaft 278. A compression spring 281 normally urges the brake shoes away from each other into released position. Stop collars 282 pinned to the shaft 278 limit the outward movement of the brake shoes.

To cause the brake shoes 279 to swing inward toward each other into gripping engagement with sleeve 75 cam teeth 283 and 284 are provided on the opposed faces of the stop collars 282 and brake shoe collars 280, respectively. When the shaft 278 is oscillated in one direction the cam teeth ride up on each other setting the brake, and upon oscillation of the shaft in the opposite direction the brake is released. By operating the brake and spindle clutch 90 by the single handle 90ᵃ, as described, setting of the brake with release of the clutch and vice versa is insured.

For selective spindle drive speeds a speed-change unit is provided in the headstock 53 between the drive motor 57 and the spindles. In addition to the plural speed ranges, four in number in the present instance, obtainable through the medium of the speed-change mechanism, further variations in spindle speed may be accomplished by varying the speed of the electric motor 57.

The speed-change mechanism includes, in addition to the clutch members 88 and 92 heretofore noted, a third axially shiftable clutch sleeve 91 having end clutch elements on its opposite faces and splined on the intermediate shaft 93 (Fig. 6). In the first or high speed setting of the speed-change mechanism this latter clutch sleeve 91 is engaged with a pinion 94 fixed on a shaft 95, thereby coupling the latter with the shaft 93, the clutch member 92 being engaged with the gear 86, while the clutch member 88 is disengaged. A pinion 96 fast on the motor shaft 97 and meshing with a gear 98 on an idler shaft 99, drives the shaft 95 through the medium of gears 100 and 101, fast respectively on the shafts 99 and 95. The shaft 95 being coupled with the shaft 93 through the clutch sleeve 91, which is engaged with the pinion 94, rotates the shaft 93 thereby driving the gear 86, which is coupled to the latter shaft by the engaged clutch 92. Since the gear 86 meshes with the complemental gear teeth 86ª on the auxiliary spindle sleeve 83 a drive to the latter is completed. The main spindle sleeve 75 is, of course, driven by the bull gear 89, meshing with the teeth 86ª on the auxiliary spindle 83, whenever the main spindle clutch 90 is engaged, this latter being true for all settings of the speed-change mechanism.

For the second or next lower setting of the speed-change mechanism the coupling 91 is retained in engagement with the pinion 94 but the clutch 92 is disengaged from the gear 86 while the clutch 88 is engaged with the gear 87ª. In this way a driving connection is completed from the motor shaft 97 to the auxiliary spindle sleeve 83 (through 97—96—98—99—100—101—95—91—93—87—87ª—88—83).

For the third and fourth settings of the speed-change mechanism the clutch 91 is disengaged from the pinion 94 and engaged with a gear 106 to couple the latter to the shaft 93. In such case the drive is completed through a back gear 103 meshing with the pinion 94 and carried by a back shaft 104. This back shaft also carries a pinion 105 meshing with the gear 106 which is now coupled to the shaft 93. For the third speed setting, the clutch 92 is again engaged with the gear 86 and the clutch 88 disengaged from the gear 87 so that a drive connection from the motor shaft 97 to the spindle sleeve 83 is completed (through 97—96—98—99—100—101—95—94—103—104—105—106—91—93—92—86—86ª—83). Similarly, in the fourth or slowest speed setting the clutch 92 is disengaged and the clutch 88 engaged so as to complete an alternative drive connection from the motor shaft to the spindle sleeve (through 97—96—98—99—100—101—95—94—103—104—105—106—91—93—87—87ª—88—83).

Hand levers 286 and 287 on the front of the headstock (Fig. 3) serve to operate the clutches or couplings 88, 91 and 92 of the speed-change unit, described above, for obtaining different drive speeds. In particular, the lever 286 operates the clutches 88 and 92 while the lever 287 operates the clutch 91. For this purpose the lever 286 is connected (Fig. 12) through a suitable eccentric crank pin 286ª and an oscillatable lever 288 (see also Fig. 3) with a shifter 290 guided for movement along a pair of rods 289 and 289ª (see also Fig. 7). A pin 290ª on the shifter engages the lower end of the lever 288. This shifter 290 surrounds the collars of the clutches 88 and 92 both of these clutches being moved simultaneously by the one shifter. The other hand lever 287 is connected by a crank pin 287ª with a centrally pivoted lever 291 which is slotted at its lower end to receive a pin 292ª on a shifter 292. This shifter is clamped to the upper rod 289 and is slidably guided on the lower rod 289ª, the upper rod 289 extending to the right and having clamped to it a shifter shoe 293 which embraces the axially shiftable clutch element 91 (see Fig. 8).

To afford a continuous visual indication of spindle speeds a tachometer generator 107 is arranged to be driven from the intermediate gear 86 of the speed-change mechanism (Fig. 6) through the medium of a gear 108 fixed on a shaft 109 and meshing with the gear 86 as well as a second gear 110 fast on the shaft 109 and meshing with a pinion 111 on the generator shaft 112. The generator 107 supplies current to a suitable tachometer 113 (Fig. 1) mounted on the headstock 53 and calibrated in terms of spindle R. P. M. In connection with the tachometer drive it should be noted that the gear 86 from which the drive is derived is always in mesh with the teeth 86ª on the spindle sleeve 83, and hence always rotates in unison with it, whether or not the clutch 92 is engaged. As is hereinafter explained in greater detail, the axial feeds for the spindles 54, 55 are also derived from the gear 86 (see Fig. 13). For this latter purpose a gear 114 is fixed on the shaft 109, which is driven by the gear 86 through the medium of the gear 108 (Fig. 6). In this way any change in speed of spindle rotation automatically insures a commensurate change in speed of axial feed in the event that the spindles are being fed at the moment.

*Spindle feed*

Provision has been made in the present machine for feeding either of the spindles 54, 55 axially by means of the motor 57 at either a rapid traverse rate or at a selectively variable slower feed rate and also for feeding the same by hand. In the case of the auxiliary spindle 55, power is applied to it for feeding it axially by means of a pinion 120 (Figs. 5 and 9), journaled within the headstock beneath the tail end of the spindle, and meshing with a rack 121 fixed on the lower side of the ram sleeve 84. Similarly, power is applied to the main spindle ram 76 for feeding it axially by means of a pair of pinions 122 fixed on vertical stub shafts 123 which are suitably journaled in the casing extension 78, at longitudinally spaced intervals along the ram 76. Such a double pinion drive for a spindle ram is described and claimed in my prior Patent No. 2,002,480 issued May 21, 1935 and consequently need not be described in detail here. In brief, the stub shafts 123 carry bevel gears 124 at their upper ends meshing with bevel gears 125 on axially alined and rigidly coupled shafts 126 and 126ª extending along the upper side of the ram 76. The feed pinions 122 mesh with a rack 127 bolted on the outer side of the ram 76 (see Figs. 5 and 11), at least one pinion being in mesh with the rack at all times throughout the range of axial movement of the ram.

To prevent over-travel of the spindles, yieldably mounted teeth are provided at the opposite ends of the respective racks 121 and 127. This particular structural feature constitutes per se no part of the present invention, being described and claimed in my prior Patent No. 2,002,480 noted above, and accordingly need not be described in detail here. For present purposes it is sufficient to note that in the case of the rack 121, for example (see Fig. 5a), a slide 121a is mounted at the end of the rack and has on it a tooth matching those of the rack. A spring pressed plunger 121b yieldably urges the slide outward against a fixed shoulder 121c to a position in which the tooth on the slide forms a continuation of those on the rack. When one of the pinions 122 rolls onto the slide tooth at the end of the rack the spring pressed plunger yields (moving to the left as viewed in Fig. 5a) and the pinion simply clicks over the displaced slide tooth, further motion of the same being arrested. Upon rotation of the pinion in the opposite direction (clockwise as viewed in Fig. 5a) the slide 121a is pressed against the rigid shoulder 121c so that the drive from the pinion is effective. A similar safety tooth is provided at each end of the racks 121 and 127.

Means is provided for connecting the spindles 54, 55 alternatively for power feed and if desired for power feed through a preselected distance at the end of which the feed is automatically discontinued. In brief, a first clutch is provided for connecting alternatively either the main or auxiliary spindle drive pinions, heretofore described, to an intermediate drive shaft, and a second clutch mechanism is provided for connecting this intermediate drive shaft in driven relation with a power source either indefinitely or for a predetermined distance of feed at the end of which the clutch is automatically disengaged to stop the feed. To complete the outline of the general arrangement of parts (see Fig. 13) it should be noted that, alternative to the power feed, a hand feed is also provided for either of the spindles.

The first clutch referred to in the outline above embodies a clutch sleeve 167 (Fig. 3) splined for axial sliding movement on a horizontal drive shaft 168 in the lower portion of the headstock, which shaft is axially alined with the main spindle feed shaft 126. The clutch sleeve 167 is shiftable axially from its neutral position shown, to the right to engage its end clutch element 169 with an opposed end clutch element 169a on the shaft 126, or to the left to engage its other end clutch element 170 with an opposed end clutch element 170a on a bevel gear 171, which is loosely journaled on the shaft 168. The auxiliary spindle feed pinion 120 is driven from the bevel gear 171 through a meshing bevel gear 171a (Figs. 9 and 13) fast on a stub shaft 172 on which the pinion 120 is also fixed. The main spindle feed pinions 122 are, on the other hand, driven from the shaft 126 as heretofore described. Accordingly, the clutch sleeve 167 serves to connect selectively either the main or auxiliary spindle for feed from the intermediate drive shaft 168 or to disconnect both spindles when the clutch is in neutral. Actuation of this selector clutch is accomplished by an oscillatable handle 173 on the front of the headstock and connected to the clutch sleeve by a shifter shoe 174 (see Fig. 3 as well as Fig. 9).

The second clutch mechanism referred to generally above serves to connect the intermediate drive shaft 168 to a source of power, and may be conditioned, if desired, to release and thereby stop the spindle feed after a preselected length of feed. This clutch mechanism is of substantially the same form as a corresponding device illustrated in my prior Patent No. 1,858,491, referred to above (see Fig. 30 of such patent) and, consequently, simply a brief identification of the principal elements will suffice for present purposes.

The power supply connection for the clutch in question terminates (Fig. 7) in a worm 210 meshing with a worm wheel 211, rigid with a disk shaped driving element 212 of the clutch. At the outlet end of the clutch is a bevel gear 213 fixed on a shaft 214 on which the clutch driver 212 is loosely journaled. Rotatable with this shaft 214 is a drum 215 having in it a plurality of radially movable blocks 216 which have teeth in their outer ends engageable with a coacting interiorly located annulus of teeth on the driver 212. The driven blocks 216 are yieldably urged inward in a direction radial of the shaft 214 so that the clutch is normally disengaged.

To manipulate the clutch, four quadrant handles 217, 218, 219 and 220 are provided (Figs. 3 and 7). These handles are pivoted on a circular dial plate 221 fixed on the forward end of the drum 215 and rotatable within a dial ring 222, the dial plate having on it a pointer movable along the scale on the ring to register the length of feed during engagement of the clutch. On the inner ends of each of the quadrant handles is a toothed sector 223 meshing with an annular rack 224 in the end of a plunger 225, which is axially slidable in a longitudinal bore in the shaft 214. Upon pulling outward one of the quadrant handles the plunger 225 is thrust inward and causes the driven blocks 216 to be moved outward into engagement with the clutch driver 212 (through the medium of a suitable connection between plunger and blocks described in detail in my prior patent noted above).

To provide means for automatically opening the clutch after a preselected feed, one of the toothed sectors 223 (Fig. 7) is formed with a rearwardly extending cam arm 226 having a knock-out cam 227 on its end. Coacting with this cam is a stop pin 228 on the dial ring 221. In operation, the dial ring 221 is rotatably adjusted to a position corresponding to the length of feed desired, thus spacing the pin 228 a predetermined distance, circumferentially of the dial ring, from the cam 227. The handle 217 is then actuated to close the clutch. At the end of the feed, the cam 227 rides onto the inner rounded end of the pin 228 and swings the toothed sector 223 to open the clutch.

At the power outlet end of the clutch the bevel gear 213 meshes with a bevel gear 229 fixed on the intermediate shaft 168. The clutch described thus serves to establish a connection between the worm 210 (driven in a manner hereinafter described) to the shaft 168 (see layout in Fig. 13). This connection may be maintained at will or, if desired, automatically interrupted after a selected length of feed.

To recapitulate, the spindles 54, 55 are alternatively connected for axial feed by the selector clutch sleeve 167 manipulated by the operating handle 173. Additionally, the power feeds for both of the spindles are derived through the clutch 212 which may be conditioned to open automatically after a predetermined feed. Next to be considered are the alternatively available rapid traverse and slow feed range power drives for feeding the one of the spindles selected by the clutch 167.

To condition the mechanism alternatively for either rapid traverse or relatively slow feeding of the spindles 54, 55 by power, alternatively engageable rapid traverse and feed clutches 128 and 129, respectively, are provided (Figs. 6, 9, 13, 14 and 15). Both of these clutches are of the multiple disk friction type and are provided with a hydraulic actuator, as will hereinafter appear. The rapid traverse clutch 128 includes a driving member 130 (Fig. 15) loose on a shaft 131, as well as a cooperating driven member 132 splined to this shaft and axially movable on it. Similarly, the feed clutch 129 includes a driving member 133 axially shiftable along a shaft 134 and splined to it as well as a driven member 135 which is loosely journaled on this shaft.

In order to feed the spindles 54, 55 at a rapid traverse rate, the rapid traverse clutch 128 is engaged. This completes a driving connection (Figs. 6, 9 and 13) from the motor shaft 97 to the clutch driving member 130 through a pinion 136, fast on the motor shaft and meshing with a gear 137 formed integrally with the clutch driver 130. Thence, the drive continues through the clutch 128, shaft 131, a gear 138 fast on the latter shaft and meshing with a gear 139 integral with the feed clutch driven member 135, to an idler gear 140 fixed on an idler shaft 141 (see also Fig. 15). It will be noted here that whether the drive be completed through the rapid traverse clutch 128 or feed clutch 129, that it eventually comes to the idler gear 140, the necessary changes in speed from that of the motor shaft being made in the train prior to the idler 140. Thereafter the drive continues from the idler 140 to a second idler 142 fixed on a shaft 143 and meshing with a gear 144 of a reversing mechanism designated generally by the numeral 145.

The reversing mechanism 145 (Figs. 9 and 13) includes two alternatively engageable multi-disk friction clutches 146 and 147, which are hydraulically actuated in a manner hereinafter described. The clutch 146 embodies a driver 148 and driven member 150 on a shaft 149, the two clutch elements being connectable at will by the usual clutch friction plates. Similarly, the clutch 147 includes a driver 151 and a cooperating driven member 153 on a shaft 152, the clutch elements again being connected by suitable friction clutch plates. When the clutch 147 is engaged, the drive (Fig. 13) is direct from the gear 144 to the shaft 152 through a gear 154 fixed to the clutch driven member 153 and meshing with the gear 144. Alternatively, when the other clutch 146 is engaged, the shaft 152 is driven in the opposite direction from the gear 144 through the clutch 146, a gear 155 fixed on the clutch driven member 150, an idler gear 156 (see also Fig. 9) and a gear 157 fixed on the shaft 152. It will thus be seen that the reversing mechanism 145 serves to effect a reversal of spindle feed independent of the direction of motor rotation so that the spindles 54, 55 can be fed in either direction irrespective of the direction of spindle rotation.

Between the reversing mechanism 145 and the terminus of the feed mechanism is interposed a feed-change mechanism, designated generally by the numeral 158 (Figs. 13 and 14) by means of which either a high or low range of spindle feeds may be selected. In this two-feed mechanism 158 large and small gears 159 and 160 are fixed to the shaft 152 and arranged to be engaged alternatively by corresponding gears 161 and 162 in a gear cluster splined for axial movement on a shaft 163. This latter shaft is in turn connected through gears 164, 165 with a shaft 166 which carries the worm 210 in the power inlet to the clutch 212 heretofore described. The gears 164, 165 are pick-off gears which can be changed if necessary to produce speeds not obtainable through the regular feed change gearing. The connections through the worm and worm gear 210 and 211, etc. (Fig. 13), to the selected spindle feed pinions have been heretofore described.

To manipulate the two-feed gearing 158, a hand lever 158ª (see Figs. 3, 8 and 14) is provided on the front of the headstock, this lever is connected through a suitable crank pin 158ᶜ to a centrally pivoted shifter lever 158ᵇ engaging the gear cluster 161—162, and shifts it axially upon oscillation of the handle 158ª, to condition the gearing for either its high or low feed setting.

In the event that the machine is conditioned for feeding the spindles 54, 55 at a relatively slow feed rate rather than at a rapid traverse rate (by engagement of the feed clutch 129 and disengagement of the rapid traverse clutch 128 as previously noted), the feed connections to the spindles again include the reversing mechanism 145 and the two-feed mechanism 158 just as in the case of a rapid traverse feed (see Fig. 13). The connections differ, however, in that instead of being connected to the motor 57 through the rapid traverse clutch 128 substantially directly to the idler 140, the connection is now established through a nine-feed box 176 and a series connected two-feed unit 200. In particular, power is supplied from the gear 114 (heretofore noted in connection with a spindle drive mechanism, Fig. 6) to the initial drive shaft 177 of the nine-feed box 176 (Figs. 13 and 14).

The nine-feed unit 176 (Figs. 13, 14, 15 and 15ª) comprises, in addition to the power inlet shaft 177, a power outlet shaft 178 and an intermediate shaft 179, these three shafts being parallel. The power inlet shaft 177 has two gears 180 and 181 freely rotatable on it, these gears being formed on their adjacent end faces with internal gear clutch elements 180ª and 181ª, respectively, engageable alternatively by complemental external clutch elements 182ª, 182ᵇ on the faces of a central gear clutch sleeve 182 slidably splined on the shaft 177. Rigid with the intermediate shaft 179 are three gears 179ª, 179ᵇ and 179ᶜ. The end gears 179ª and 179ᶜ are constantly in mesh with the lower gears 180 and 181, and the intermediate gear 179ᵇ is adapted to mesh with the lower gear 182 when the latter is in its intermediate position.

Formed integral with the two end gears 179ª and 179ᶜ on the intermediate shaft are two gears 179ᵈ and 179ᵉ, respectively. Meshing constantly with these latter gears are two end gears 183 and 184, which are freely rotatable on the power outlet shaft 178. These latter end gears are alternatively coupled to the power outlet shaft by a central gear clutch sleeve 185, meshing when in its intermediate position, with the central gear 179ᵇ on the intermediate shaft. This clutch sleeve 185 has on its opposite end faces clutch elements 185ª and 185ᵇ engageable respectively with complemental internal clutch elements 183ª and 184ª on the end gears 183 and 184. It will be evident that by selective manipulation of the clutch sleeves 182 and 185, the shaft 178 may be driven from the shaft 177 selectively at nine different feed speeds.

The power take-off shaft 178 of the nine-feed box 176 is in turn connected through a two-feed box 200 with the feed clutch shaft 134 (Figs. 13 and 15). By utilizing the series connected nine and two-feed boxes 176 and 200, a selection of eighteen feed speeds is afforded. In the two-feed box 200 (Fig. 14 and 15) an axially shiftable internally toothed clutch sleeve 206, having a gear 206ª integral with it, is splined on the shaft 134 and arranged to be positioned either with the gear 206ª meshing with a back gear 204 (as shown in Figs. 14 and 15), or alternatively with the gears 206ª, 204 out of mesh and the clutch sleeve 206 engaged with an opposed clutch member 203 fixed on the shaft 178. When the gear 206ª is in mesh with the back gear 204 the drive from the shaft 178 to the shaft 134 is completed through a pinion 201 fast on the shaft 178, gear 202, a pinion 204 fast on a back shaft 205 to which the gear 202 is fixed, and the meshing gear 206ª splined on the shaft 134. Alternatively, when the clutch sleeve 206 is engaged with the clutch member 203 the shafts 178 and 134 are directly coupled.

The series connected nine and two-faced units described above are manipulated jointly by a manual actuator mechanism in order to obtain eighteen different feed speeds for the spindles 54, 55. This actuator mechanism has been shown herein as illustrative of one form which may be used and per se constitutes no part of my present invention but is described and claimed in the copending application of Garner H. Schurger, Serial No. 320,805, filed February 26, 1940. Consequently, simply a general description will suffice for present purposes. In brief a rotatable handle or crank 186 on the front of the headstock (Fig. 3) serves to shift the clutch sleeves 182 and 185 of the nine-feed gearing and a second handle or crank 187 shifts the clutch sleeve 206 of the two-faced gearing, the two manual operating handles noted being interconnected to a common dial mechanism designated generally as 188.

In the actuator for the nine-feed unit (Figs. 8, 16, and 17) a shoe 189, slidable on horizontal guide rods 189ª, engages the clutch sleeve 182 while a second shoe 190, slidable on rods 190ª engages the upper clutch sleeve 185. To actuate these shifter shoes 189, 190 in timed relation by the hand crank 186, the latter is fixed on a shaft 191 having fast on it a pinion 192 meshing with a gear 193 fixed on a shaft 194. Fast on the inner end of this latter shaft is a mutilated pinion 195 (see also Fig. 18) of an intermittent gearing and having an eccentric crank pin 196 projecting from its end face and received in a transverse slot 197 in the opposed face of the shifter shoe 189 (see also Fig. 19). During a revolution of the pin 196 about the axis of the shaft 194 it occupies three successive positions designated as A, B and C in Fig. 19, so that the correspondingly moved shifter shoe 189 actuates the clutch sleeve 182 to its three positions. The ratio of the pinion 192 to the gear 193 is one to three so that one full revolution of the hand crank 186 is required to move the clutch sleeve 182 to each successive position. Clearance recesses 197ª at the sides of the groove 197 prevent over-travel to the right and left.

To actuate the other or upper clutch sleeve 185 in timed relation with the first, a second pinion 198 in the intermittent gearing (see also Fig. 18) is loosely journaled on a shaft 199 and meshed with the mutilated pinion 195. The pinion 195 has teeth extending over a sector substantially 120 degrees while the pinion 198 has three corresponding sectors of teeth separated rounded projections 198ª slidably engageable with the untoothed portion of the periphery of the pinion 195 so that these pinions are intermittently engaged with a dwell while projections 198ª ride on the untoothed portion of the pinion 195. For each full revolution of the driving pinion 195 the pinion 198 thus turns one-third of a revolution. On the end face of the driven pinion 198 is fixed an eccentric crank pin 265 (Figs. 16 and 18) received in a transverse slot 266 (see also Fig. 19) in the end face of the upper shifter shoe 190. Successive movements of the pin 265 through arcs of 120 degrees position it as indicated at D, E and F (Fig. 19) so that the clutch sleeve 185 is shifted correspondingly to its three positions. Clearance recesses 266ª at the sides of the groove 191 prevent over-travel to the right and left.

The indicator 188 for showing the setting of the feed mechanism comprises a dial 267 fast on the end of the shaft 199 (Figs. 16 and 20). This shaft is driven from a pinion 268 fast on the shaft 194 and meshing with a gear 269 also journaled on the shaft 199 and pinned to the hub of the dial 267. The ratio of the pinion to the gear is one to three so that the dial 267 is advanced one-ninth of a revolution for each full revolution of the crank 186. On the face of the dial are provided nine pairs of indicia 270 showing the rate of spindle feed in inches per spindle revolution. The one or the other of the indicia in each pair to be read by the operator is indicated by a pointer 290 actuated from the two-feed mechanism as hereinafter described so that, in all, eighteen different feed speeds are shown by the dial 267. It will be noted that each of the indicia 270 includes two different numbers, those in the inner circle of figures being the feed per revolution for the auxiliary spindle 55 and those in the outer circle the feed per revolution for the main spindle 54. Incidentally, these feed speed indicia are correct only when the two feed-change unit 158 is in a predetermined one of its two settings and when a predetermined set of pick-off gears 164, 165 is in use. Otherwise a differently calibrated dial must be used or else the readings of the indicator ignored.

The hand crank 187 for shifting the two-feed mechanism has connected to its inner end an eccentric crank pin 187ª (Figs. 16 and 17) received in a slot 187ᵇ in a bell crank lever 187ᶜ. The other leg of this bell crank lever is provided with a pin 187ᵈ received in a transverse slot in the outer face of a slidably mounted shifter shoe 187ᵉ engaged with the axially shiftable clutch sleeve 206. By oscillating the hand lever 187 back and forth the clutch sleeve 206 is shifted axially to connect or disconnect it to the back gear 204.

In the dial mechanism 188 (Fig. 20) the pointer 290 is carried by a slider 290ª which is shiftable axially so that the pointer 286 registers with one or the other of the pairs of indicia 270 presented to it by the dial plate 267. To shift the slider 290ª in accordance with the setting of the two-feed hand crank 187, a pin 187ª is fixed on the hand crank and projects into engagement with a lug on the end of the slider 290ª. The slider is urged by a spring 290ᵇ to the left and when the hand crank 187 is moved to the right for its high speed setting the pin 187ª engages the slider and forces it correspondingly to the right against the compression of the spring 290$^b$. Movement of the crank 187 in the opposite direction for its low speed setting causes the pin 187$^a$ to release the slider so it is shifted to the left by the spring 290$^b$.

Instead of feeding the spindles 54, 55 by the power feed described above they may if desired, be fed by hand. For this purpose a hand wheel 291 is provided at the front of the headstock (Fig. 3). This hand wheel is splined on the end of a shaft 292 coaxial with the shaft of the worm 210 and fixed to it by a coupling 293. Thus rotation of the hand wheel 291 serves to rotate the worm 210 and feed the spindles through the same feed clutch as when power is used. A stationary dial plate 294 (Fig. 21) encircles the end of the shaft 292 and is fixed on the end of the headstock casing 70. Cooperating with this stationary dial plate is a rotatable dial ring 295 which encircles a sleeve 296 splined on the shaft 292. Lock nuts 291$^a$ hold the hand wheel 291 and sleeve 296 in assembled relation on the end of the shaft.

To clamp the dial ring 295 in any desired adjusted position, a transversely extending clamping pin 297 is located in registering transverse bores formed in the sleeve 296 and shaft 292. The inner end of the clamping pin 297 is located within an axial bore within the shaft 292 and in which is a plunger 298 held in position by a threaded plug 298$^a$. This plunger is notched to receive the wedge shaped end of the pin 297 and a compression spring at the inner end of the plunger normally urges it outward. After the dial ring 295 has been rotated to a desired position the plug 298$^a$ is threaded inward to force the plunger 298 in and, consequently, the latter cams the clamping pin 297 axially outward into frictional engagement with the dial ring 295. Conversely, upon threading the plug 298$^a$ outward the spring biased plunger 298 also moves outward freeing the pin 297 for readjustment of the dial ring.

*Headstock feed*

Provision is made for utilizing the motor 59 to traverse the headstock 53 vertically on the column 52 at either a rapid traverse rate or at a relatively slower, and selectively variable, feed rate. Starting, stopping, and direction of headstock movements are accomplished by corresponding starting, stopping and reversal of the motor 59. Variations in the feed rate speed are effected by a manually operable speed-change unit, while further changes in the feed rate may be made by varying the motor speed.

The change-over from feed to rapid traverse, and vice versa, is effected by a pair of alternatively engageable clutches 300 and 301 (Figs. 22 and 25). Both the rapid traverse clutch 300 and the feed clutch 301 are of the multi-disk friction type and have a hydraulic actuator hereinafter described. In general the rapid traverse clutch 300 connects the motor 59 substantially directly to the headstock feed screw 74 (see Fig. 1) while the feed clutch 301 effects the connection through a speed-change unit 302 (Fig. 25) which in the present instance affords four different speed settings.

The driving element 303 of the rapid traverse clutch 300 (Fig. 25) is connected to the motor shaft 304, through: a pinion 305, fast on the motor shaft, an intermediate gear 306 rigid with a second intermediate gear 306$^a$, and a gear 307 which meshes with a gear 308 fast on the clutch driver 303. Consequently when the rapid traverse clutch 300 is engaged the motor 59 is connected through the gearing noted, and the rapid traverse clutch, to a shaft 309 on which the clutch driven element 310 is splined for axial movement. This shaft 309 is connected (Fig. 22) through a pair of bevel gears 309$^a$ with a stub shaft 311, which is in turn connected through bevel gears 312 with the headstock lead screw 74. By this drive connection the motor 59 is connected to rotate the screw 74 for moving the headstock 53 at a rapid traverse rate.

Upon engagement of the feed clutch 301, and disengagement of the rapid traverse clutch 300, the motor 59 is again connected to the shaft 309 but in this instance through the speed-change unit 302 (Fig. 25) which is interposed between the gear 307 and the driving element 313 of the feed clutch. This latter driving element is loosely journaled on the shaft 309 and cooperates with a driven element 314 splined for axial sliding movement on this shaft. In the first or highest speed setting of the speed-change unit 302, a connection is completed from the motor-driven gear 307, through: a meshing gear 315 rigid with a pinion 316 which meshes with a gear 317 fast on a shaft 318, a cluster gear 319 splined on the shaft 318 and shiftable axially to mesh either with a pinion 320 or a gear 329, both fast on a shaft 321 (in the first speed setting in mesh with the pinion 320 as shown), a combined pinion and clutch sleeve 322 fixed on the shaft 321 and engaged for the highest speed setting with a clutch element 333$^a$ splined on an alined shaft 323 (and shifted axially from the position shown to engage the clutch sleeve 322 for highest speed setting), a pinion 324 fast on the shaft 323 and meshing with a gear 325 fixed on a shaft 326, and a pinion 327 fixed on the shaft 326 and meshing with a gear 328 fast on the clutch driver 313.

In the second or next lowest speed setting of the speed-change unit 302 the gear cluster 319 is shifted to the right (as viewed in Fig. 25) to engage the gear 329 fast on the shaft 321, thereby completing a second drive connection from the motor shaft 304 to the feed clutch driver 313 (through 304—305—306—306$^a$—307—315—316—317—318—319—329—321—322—333$^a$—323—324—325—326—327—328—313). In the third and fourth speed settings of the speed-change unit the clutch element 333$^a$ is disconnected from the element 322, being shifted to the right (to the position shown) to engage a back pinion 332 carried by a back shaft 331 with a gear 333 fast on the clutch element 333$^a$ and movable with it. Note that the back shaft 331 also has fixed on it a gear 330 meshing with the gear 322 fast on the shaft 321. To differentiate the third and fourth speed settings the cluster gear 319 is shifted respectively to the right and left hand positions. Thus in the third speed setting a connection is completed from the motor shaft 304 to the clutch driver 313 (through 304—305—306—306$^a$—307—315—316—317—318—319—320—321—322—330—331—332—333—323—324—325—326—327—328—313). And similarly in the fourth setting the connection is completed through 304—305—306—306$^a$—307—315—316—317—318—319—329—321—322—330—331—332—333—323—324—325—326—327—328—313. The hand crank mechanism for changing the setting of the speed-change unit 302 is described below in connection with the similar actuator for the corresponding speed-change unit in the column feed.

To feed the headstock 53 manually, rather than by the power drive described, a hand crank manipulable by an operator on the headstock platform 67 is utilized. This hand crank (not shown) is received on the end of a shaft 355 (Fig. 7) keyed within a sleeve 356, which is journaled for rotational and axial sliding movement in a bore 357 formed in the headstock casing cover 71. A compression spring 358 interposed between a shoulder on the interior of the sleeve and the end of the bore 357 urges the sleeve 356 and shaft 355 axially outward. Fixed on the shaft 355 is a pinion 359 adapted to be meshed with a gear 360 when the shaft 355 is pushed axially inward into operative position. This gear 360 is in turn fixed on a feed shaft 361 journaled within the headstock and extending to the rear thereof. On the inner end of the shaft 361 is a bevel gear 362 meshing with a bevel gear 363 journaled within the headstock casing and having an axial bore through which the lead screw 74 passes. Projecting inwardly within the bore in the bevel gear 363 and rigid with the latter are spline keys 364 received in complemental axial keyways 365 extending axially of the screw 74. Consequently, when the hand crank shaft 355 is pushed inwardly to engage the pinion 359 with the gear 360, rotation of the shaft 355 turns the feed shaft 361 which in turn rotates the screw 74 through the medium of the bevel gears 362, 363 and the keys 364.

Means is provided for indicating the distance through which the headstock 53 is fed by hand. To this end a micrometer scale is provided on a dial ring 366 (Fig. 7) cooperating with a fixed marker on the headstock casing cover 71. The dial ring 366 is loosely journaled on a sleeve 367 which is keyed to a shaft 368. This latter shaft is arranged to be driven from the feed shaft 361 by a gear 369 fast on the latter shaft and meshing with a gear 370 fast on the shaft 368. A nut 371 holds the sleeve and dial ring in assembled relation on the shaft 368. To clamp the dial ring 366 in adjusted position a clamping pin 372 is utilized of the same form as that heretofore described for the dial ring of the feed handwheel. This pin extends through registering transverse bores in the sleeve 367 and shaft 372, its inner end projecting into an axial bore in the shaft 368. A plunger 374 is slidable within this axial bore and has in its side a notch with a sloping face complemental to the angular face on the end of the clamping pin 372. A compression spring 374$^b$ normally urges the plunger 374 outwardly and a plug 374$^a$ threaded in the end of the bore serves to move the plunger axially inward. When the plunger is moved inward it cams the pin 372 outward into frictional engagement with the dial ring 366 to hold it in place. Similarly, when the plug 374$^a$ is threaded outward the spring urged plunger 374 releases the pin 372 so that the dial ring can be rotated at will to reset it.

As will hereinafter appear in greater detail the headstock 53 is automatically clamped in position whenever it is at rest. To cause the clamps to be released when the hand feed is used, a switch 647 (Fig. 7) is arranged to be actuated in response to movement of the hand crank shaft 355 into operative position. The switch 647 is normally closed, being of the conventional roller operated limit type. On it is a roller 647$^a$ positioned to be cammed upward by the tapered inner nose of the hand crank shaft 355 when the latter is thrust axially inward. Such displacement of the roller opens the switch to release the clamps through the medium of a control circuit hereinafter described.

Also as an incident to hand feed of the headstock 53, a pump is arranged to supply lubricating oil to the guideways 65 (Fig. 1) on the column. For this purpose a pump 375 (Fig. 6) is arranged to be driven by a centrally pivoted lever 375$^a$ having a roller on its lower end which is urged into engagement with an eccentric 375$^b$ on the shaft 361 (see also Fig. 7). Lubricant is supplied from this pump through a suitable conduit system to the headstock ways 65.

*Column and column base*

The column base 63 is a rectangular casting on the bottom face of which are fashioned the guideways 62 receiving the platform guides 61 (Figs. 1, 22, 23 and 24). Within this base 63 is mounted all of the necessary mechanism for providing a range of feeds and rapid traverse to the vertically movable headstock 53 as described above and for the horizontally traversable column 52. Attached to the right side of the column base (Fig. 2) and movable with it are the column and headstock feed motors 58 and 59.

The column proper is fashioned in the form of a hollow and elongated casting, generally rectangular in cross section, and fixed to the base 63. In the interior of the column 52 are located suitable counterweights (not shown) for the headstock 53 connected to it by roller chains 315 (Fig. 1).

Figure 2:
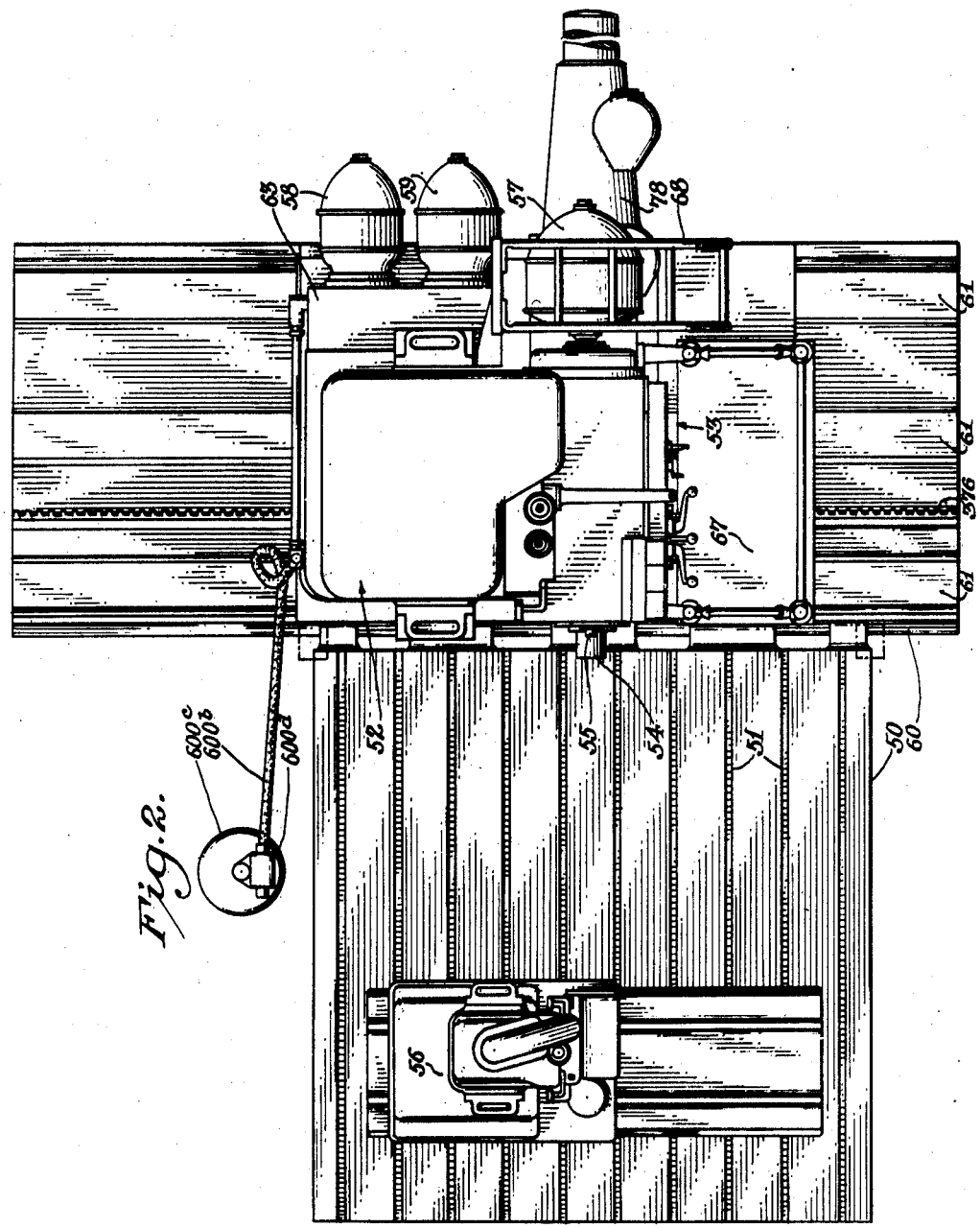
Fig. 2 is a plan view of the machine of Fig. 1.

A rack and pinion type of drive connection is utilized for traversing the column 52. To this end a rack 376 (Fig. 28) is fixed to the platform 60 and extends longitudinally of the latter (Fig. 2). Meshing with this rack is a pinion 377 carried by vertical stub shaft 378 (Fig. 28) journaled in the column base 63, and in turn driven by a worm wheel 379 fast on the stub shaft and meshing with a driving worm 380 (Fig. 22). This worm is carried by a shaft 381, which is driven by the column motor 58 as described below.

The power actuating mechanism for feeding the column 52 is substantially identical with that for the headstock 53, heretofore described, and consequently a brief identification of the principal elements of the column drive will suffice (see Fig. 22). In brief, the column motor 58 is connected in driving relation with the worm shaft 381 either substantially directly by a rapid traverse clutch 382 or through a speed-change unit 383 by an alternatively engageable feed clutch 384. The alternatively actuatable rapid traverse and feed clutches 382 and 384 are, like those in the headstock drive, of the multi-disk frictional type and are hydraulically actuated. The speed-change unit 383 may, like the unit 302 for the headstock drive, provide four speed settings and is identical in construction with it.

To change the settings of the speed-change units 302 and 383 in the headstock and column feed mechanisms two corresponding hand cranks 334 and 385 are provided on the column base 63 (Fig. 22). The hand crank 385 for the column unit is fixed on a revoluble shaft 335 (Fig. 26) connected through a pinion 336 and a gear 337 with a counter shaft 338 carrying a dial 339 for indicating the setting of the unit. The shaft 338 is connected through bevel gears 340, a shaft 341 and gears 342, 343 and 344 with a sleeve 345 loosely journaled on a shaft 345$^a$. This sleeve is in turn connected to a cam shaft 347 through gears 345$^b$, a shaft 345$^c$, gears 345$^d$, a shaft 345$^e$ and bevel gears 346. Similarly, the hand crank 334 for the headstock speed-change unit 302 is connected through an identical initial set of gearing (not shown) to a corresponding dial and to a gear 342ª (Fig. 26) on a rotatable shaft (not shown) paralleling the shaft 341 in the train previously described. This gear 342ª meshes with a gear 343ª mounted on pin similar to that which carries the gear 343 and the gear 343ª in turn meshes with a gear 344ª fast on the shaft 345ª. This latter shaft is connected through bevel gears 346ª with a second cam shaft 347ª (see also Fig. 27).

In the actuator system for the headstock speed-change unit (see Fig. 27) a barrel cam 348 is fixed on the cam shaft 347ª. Cam grooves 349 and 350 in the periphery of the cam 348 receive complemental pins 351 and 352 projecting from shifter shoes 351ª and 352ª respectively, which are slidable longitudinally of the supporting rods 353 (see also Fig. 26). The shoe 352ª is arranged to shift the cluster gear 319 (see Figs. 25 and 26) and the shoe 351ª shifts the clutch element gear 333. The cam grooves 349 and 350 are, of course, shaped to move the shifter shoes in timed relation so as to move the cluster gear and clutch element conjointly for the four successive speed settings heretofore described. In the case of the actuator mechanism for the column feed an identical barrel cam (not shown) is mounted on the cam shaft 347 (Fig. 26) and actuates a pair of shifter shoes 354ª and 354ᵇ for moving the corresponding cluster gear and clutch element in this speed-change unit.

Means is also provided for traversing the column 52 manually, rather than by power feed. To this end a mechanism is provided which is substantially identical with that for manual feeding of the headstock and, consequently, need not be described in detail. It also includes a rotatable and axially movable hand crank shaft 386 like the shaft 355 for the headstock hand feed (Fig. 3). Also associated with the hand feed for the column is a micrometer gauge designated generally as 387. The two mechanisms differ only in the connections from the bevel gears at the rear ends of the feed shafts. In the case of the column hand feed mechanism the bevel gear 363ª (Fig. 10) which corresponds to the bevel gear 363 in the headstock hand feed (see Fig. 7) is slidable on a spline shaft 388 rather than on the screw 74. This spline shaft 388 extends along the column (Fig. 1) and terminates at its lower end in a bevel gear 389 (Fig. 22) in the column base, the bevel gear 389 meshing with a second bevel gear 390 fast on a horizontal shaft 391 which is connected through bevel gears 392 with the shaft 381, which carries the driving worm 380. It will thus be seen that by attaching the crank to the shaft 386 and pushing it inward to engage the drive connection the column 52 may be fed along its runway by rotating the hand crank which serves to drive the worm 380 through the connections just described.

As in the case of the headstock heretofore described, the column 52 is automatically clamped in position when at rest by means which will hereinafter appear. To release the column clamps when the hand feed is used, a switch 648 (Fig. 47) is provided. This switch is identical with the corresponding switch 647 associated with the headstock hand feed heretofore described and is actuated in the same manner by inward movement of the column hand crank shaft 387 (Fig. 3) to automatically release the column clamps.

During either power or hand feed of the column 52 a pump 393 supplies lubricant to the platform ways 61. For this purpose the pump 393 (Fig. 24) is arranged to be driven by an eccentric 394 fixed on the shaft 391. This eccentric contacts an oscillatable lever 395 which is connected to the pump 393 by a reciprocable rod 396. Since the shaft 391 rotates during either power or hand feed, lubricant is always supplied from the pump 393 when the column is in motion.

*Spindle headstock and column clamps*

To insure extreme rigidity and accuracy of machining, provision is made for clamping in position the column 52, headstock 53 and both of the spindles 54, 55. As to the column and headstock, hydraulically actuated clamps are utilized which are controlled, by means later to be described, to clamp the respective machine element automatically whenever it is at rest and to release it whenever its drive mechanism is conditioned for traversing movement. These clamps are also automatically released whenever the hand feeds for the column or headstock are used. The main spindle 54 is also provided with a hydraulically actuated clamp to hold it against axial movement. This clamp is not, however, interlocked with the spindle feed since provision is made for feeding the spindles independently from a common power source and, accordingly, the spindle feed mechanism as a whole may be in operation when the main spindle is at rest and, therefore desirably clamped. In the case of the lighter auxiliary spindle 55, simply a manually operated clamp is utilized. It should be understood that the clamping mechanisms per se have been disclosed herein simply as illustrative of suitable forms for use in the clamping system as a whole and that these mechanisms per se are described and claimed in my copending application Serial No. 320,854, filed February 26, 1940.

For the column 52, two clamping mechanisms, designated generally as 400 and 401 (Figs. 22 and 29), are arranged to clamp the column base 63 to the platform 60. These clamping mechanisms are substantially identical and, accordingly, a detailed description of one will suffice for both. The clamping mechanism 400 is located at the left edge of the column base 63 and includes a vertically shiftable clamp shaft 409 (Figs. 30 and 31). On the lower end of this shaft is a generally rectangular clamp shoe or plate 411 keyed to the shaft and held in place by an adjustment nut 412. The shoe 411 underlies the lower side of the platform guide 61 and is forced into tight clamping engagement with it by upward movement of the clamp shaft 409. A wear plate 411ª is preferably provided on the active face of the clamp shoe 411. The shoe 411 is located between the opposed ends of gibs 63 (see Fig. 1 for the latter) so that the shoe and clamp shaft 409 are restrained against rotation.

To effect axial movement of the clamp shaft 409, for moving the shoe 411 into and out of clamping position, a pair of coacting cam collars 413 and 414 (Figs. 30 and 31) are provided with a series of balls 415 located between their opposed faces and held in position by a cage 415ª. The lower cam collar 413 is loose on the shaft 409 and is journaled in a combination radial and end thrust type anti-friction bearing 416 carried in the column base, while the opposed upper cam collar 414 is keyed to the shaft 409. The opposed faces of these cam collars are fashioned in the form of a series of shallow radial teeth 413ᵃ and 414ᵃ (Figs. 32 and 33) between which the balls 415 are received. It will thus be seen that upon oscillation of the lower cam collar 413 from the position of Fig. 32 to that of Fig. 33 the balls 415 will be jammed between the high points or teeth on the opposed cam surfaces, thereby forcing the shaft 409 axially upward and drawing the shoe 411 into tight clamping engagement with the underside of the guide 61 (Fig. 31). Oscillation of the cam collar 413 in the opposite direction from the position of Fig. 33 back to that of Fig. 32 permits the balls 415 to move back between the low points on the cam surfaces so that the shaft 409 may move axially downward due to gravity to release the clamp shoe.

In order to oscillate simultaneously the cam collars 413 for both of the clamping mechanisms 404 and 401 a single hydraulic actuator 402 is utilized. This actuator includes a cylinder 403 located in the forward left hand corner of the column base 63 (Fig. 29) and having a piston 404 slidable therein. The inner end of this piston is connected to a rod 405 journaled for axial sliding movement along the left side of the column base. This rod is notched as indicated at 406 and 407 and receives in these notches rocker arms 408 which extend laterally from and are integral with the oscillatable cam collars 413 (see also Fig. 31). Accordingly, inward and outward movements of the rod 405 by the piston 404 serve respectively to actuate the clamping mechanisms 400, 401 into their clamped and unclamped positions.

The hydraulically actuated clamps for the main spindle 54 and for the headstock 53 are of the same general type as that for the column described above in that in both cases clamping shoes are actuated to clamped and unclamped positions by means of opposed cams with a series of balls therebetween. The particular clamping devices used are, however, somewhat different in construction to meet the requirements of the particular parts which they are to clamp. In the case of the main spindle 54, the clamping mechanism is arranged to grip the main spindle ram 76 to hold it against axial movement (Figs. 34 and 35). For this purpose two cooperating pairs of clamping shoes 416, 417 and 418, 419 are arranged on the rear side of the ram with the respective pairs of clamping shoes substantially alined with the drive pinions 122 which mesh with the rack 127 on the opposite side of the ram. The clamp shoes are all fashioned in the form of cylindrical collars, the first pair being axially slidable on a vertical oscillatable clamp shaft 420 and the other pair on a similar clamp shaft 421. Flat inserts 422 are provided in the active faces of the clamp shoes to engage the periphery of the ram 76 (Fig. 35). The pairs of clamp shoes noted are splined against rotation in their respective housings and are yieldably urged away from each other by compression springs 423, 424 inserted between them. To clamp the ram 76, the clamp shoes in the respective pairs are shifted bodily toward each other by means described below.

To actuate the clamp shoes 416, 417 a cam collar 425 is keyed to the lower end of the clamp shaft 420 (Fig. 35). The opposed faces of the collar 425 and shoe 417 are provided with radially extending shallow cam teeth between which are received a series of balls 426, held in position by a cage 427. Similarly, at the upper end of the clamp shaft 420 a second cam collar 428 is keyed to the shaft and the opposed faces of this collar and the upper shoe 416 are fashioned in the form of shallow radially extending cam teeth. Between these cam surfaces is received a second series of balls 429 held in position by a cage 430. The clamp shaft 420 itself is suitably journaled for oscillation in the housing 78. It will be seen that with this arrangement oscillation of the lower cam collar 425 will cause the clamp shaft 420 to oscillate, thereby jamming the two sets of balls 425 and 429 between the high points on the cam faces opposed to them so that the clamp shoes 416, 417 are shifted axially toward each other into clamping position. Oscillation of the clamp shaft 420 in a reverse direction permits the balls to ride back into the low points in the opposed cam surfaces so that the compression spring 423 may force the clamp shoes away from each other into unclamped position. The operating mechanism for the other pair of clamp shoes 418, 419 is identical with that for the first set just described.

To actuate the sets of clamp shoes 416, 417 and 418, 419 in unison, a single hydraulic actuator is utilized, being shown herein (Fig. 34) as a cylinder 431 located between the two clamping devices. Slidable within this cylinder is a piston 432 connected at its opposite ends through rigid couplings 433, 434 with axially movable shafts 435 and 436. Notches in the outer ends of these shafts (see Fig. 35) receive rocker arms 437 and 438 projecting from the respective cam collars on the clamp shafts 420 and 421. When the piston 432 is positioned as shown in Fig. 34 the clamp shafts are positioned to release the respective pairs of clamp shoes. Upon the application of pressure fluid to the right face of the piston 432 it is moved to the left, thereby oscillating both of the clamp shafts 420, 421 to shift their respective clamp shoes into clamping position. Fluid is supplied to the cylinder 431 for actuating the piston through supply lines 439 and 440 controlled by a two-way valve 552, which is actuated through the medium of a suitable electric control hereinafter described.

Turning now to the clamping mechanism for the headstock 53, it will be seen upon reference to Fig. 36 that generally rectangular clamp shoes 441 and 442 are located between the adjacent ends of the respective pairs of gib plates 72 in position to overlie portions of the rear faces of the guides 65 in order to clamp the headstock 53 in position upon engagement of the shoes with the guides. The clamp shoes 441, 442 are keyed on respective clamp shafts 443, 444. The two clamping mechanisms are identical and, accordingly, a description of one will suffice for both. The clamp shaft 443 is mounted for axial sliding movement within the headstock casing 70 (Figs. 37 and 38). An adjusting nut 447 holds the clamp shoe against axial displacement and a compression spring 449 yieldably urges the clamp shoe outward into its unclamped position.

To move the clamp shaft 443 inward, and thereby draw the clamping shoe 441 into clamping position, a cam collar 451 is fixedly keyed in position on the inner end of the clamp shaft (Fig. 38). Opposed to this cam collar is a cooperating cam collar 453, which is loose on the clamp shaft and journaled in a combination radial and end thrust type anti-friction bearing 445. The opposed faces of the pair of cam collars 451, 453 are provided with shallow radially extending cam teeth between which is located a series of balls 455 held in position by a cage 457. As in the clamping devices previously described, oscillation of the cam collar 453 in one direction jams the balls between the high points of the opposed cam surfaces so as to shift the clamp shaft axially into clamping position while oscillation of the cam collar 453 in the opposite direction permits the balls to ride between the low points of the cam surfaces so that the clamping shoe may shift to its released position.

Actuation of the headstock clamp shafts 443, 444 is accomplished by means of separate hydraulic actuators, that for the shaft 443 being shown in Fig. 39. It includes a cylinder 460 within which is an axially slidable piston 462 having fixed to its outer end an axially slidable rod 464. This rod is notched as indicated at 466 to receive a laterally projecting rocker arm 468 integral with the cam collar 453. A similar actuating cylinder 461 is provided for the other clamping mechanism (Fig. 41). Pressure fluid is supplied to the cylinders 460, 461 through the medium of a single control valve, hereinafter described, so as to shift the actuator shafts axially in unison for setting and releasing the clamps. Ports 462$^a$ and 462$^b$ admit pressure fluid to the respective ends of the cylinder 460 to opposite faces of the piston 462.

The manually operated clamping mechanism for holding the auxiliary spindle ram 84 against axial movement includes (Fig. 9) a pair of clamp shoes 470, 471 engaged by right and left hand threads on the shaft 472 extending transversely of the headstock across the top of the ram 84. These shoes are axially slidable within the ram housing 85 and, in response to oscillation of the shaft 472 in opposite directions, are moved respectively into and out of clamping engagement with the ram 84. For this purpose the shaft 472 is operated by means of a hand lever 473 fixed to its outer end and located on the front of the headstock casing cover 71.

Hydraulic system

To facilitate control from a remote point of the clamping mechanisms described, as well as various ones of the clutches included in the drive mechanisms, hydraulic actuators are provided for the same, operable under the control of suitable valves actuated by electric solenoids designated $S_1$ to $S_{10}$, both inclusive (Figs. 40 and 41). In each instance the clutches are of the multidisk friction type so as to make possible the use of hydraulic actuators with their concomitant advantages of rapid and positive actuation. Included in this series of clutches are the following, the individual functions of which have been heretofore described: the headstock rapid traverse and feed clutches 300, 301; the column rapid traverse and feed clutches 382, 384; the spindle rapid traverse and feed clutches 128, 129; and the spindle direction control clutches 146, 147.

In the column base 63 (Figs. 22 and 40) are arranged the hydraulic actuator 402 for the column clamps 400 and 401 as well as actuators 500 and 501 for, respectively, the headstock and column sets of rapid traverse and feed clutches. All three of these actuators are supplied with pressure fluid from a single pump 502 driven by an electric motor 503 (see Fig. 40). Similarly, on the headstock 53 (Fig. 41), the headstock clamp actuator cylinders 460 and 461, actuators 504 and 505 for the spindle direction clutches and spindle feed and rapid traverse clutches (see also Fig. 9), respectively, and the main spindle clamp cylinder 431 are all connected in a unified hydraulic circuit supplied with pressure fluid from a pump 506, driven by an electric motor 507 (see also Fig. 11). In each case oil is used as the pressure fluid and the pumps 502 and 506 serve additionally to supply oil under pressure, through pressure reduction valves 508 and 509, to lubricate various moving parts of the machine.

Turning first to the system in the column base (Fig. 40), the headstock clutch actuator 500 comprises an axially shiftable rod 510 having a shifter shoe 511 at its outer end arranged to be moved from the central neutral position to either right or left to close respectively the rapid traverse and feed clutches 300 and 301 in the headstock drive (see also Fig. 22). Such motion of the rod 510 is accomplished by a coacting pair of pistons 512, 513, slidable in cylinders 514 and 515, respectively, and to which pressure fluid is supplied through a pair of two-way valves 516 and 517 operated by solenoids $S_1$ and $S_2$. These two-way valves, like the others included in the hydraulic systems of Figs. 40 and 41, are of conventional form, being yieldably biased to the positions shown and actuated to their second or opposite positions by energization of the associated solenoids. In the present instance, with the solenoids $S_1$ and $S_2$ deenergized, pressure fluid is supplied through the filter 518 and the pump 502, through a branched pressure line 519 to the valves 516, 517 by which it is directed through lines 520 and 521 to the left and right hand faces respectively of the pistons 512 and 513, thereby locking the same in the position shown. The fluid lines 522 and 523, connected with the opposite piston faces, exhaust fluid from them, through the valves 516, 517, back to a suitable sump in the column base 63. The actuator pistons 512, 513 are connected to the clutch actuator rod 510 through a link 524, pivoted intermediate its ends to the rod and pivotally connected at its outer ends to the pistons.

To engage the headstock feed clutch 301, the solenoid $S_1$ is energized, reversing the position of the two-way valve 516. Thereupon, pressure fluid is supplied to the right hand face of the piston 512 to shift it to the left (through a fluid circuit 502—519—516—522) while fluid is exhausted to the sump from the left face of the piston through the line 520. In this way the intermediate link 524 is fulcrumed about its lower pivot and swung in a counterclockwise direction so as to pull the clutch actuator rod 510 to the left to its "feed" position. Similarly, to engage the rapid traverse clutch, and disengage the feed clutch, the solenoid $S_2$ is energized and the solenoid $S_1$ deenergized. Thereupon pressure fluid is supplied to the left face of the piston 513 through line 523 and the valve 517 while the piston 512 is returned to the position illustrated by pressure fluid supplied through the line 520 and valve 516. In this way the intermediate link 524 is swung in a counterclockwise direction about its upper end pivot as a fulcrum and the rod 510 thrust to the right into its "rapid traverse" position. To return the clutch actuator to "neutral" at any time, the operator need only deenergize both the solenoids $S_1$ and $S_2$, whereupon the apparatus returns to and is locked by fluid pressure in the position shown. Notable here is the fact that in case of power failure on the solenoids, the system will "fail safe" by returning the actuator to neutral.

The actuating system (Fig. 40) for the column feed and rapid traverse clutches 384 and 382 is substantially identical with that described above for the headstock clutches. In brief, it includes a clutch actuator rod 525 carrying a shoe 525ª (see also Fig. 22) and shiftable from a central "neutral" position either to right or left (Fig. 40) into "rapid traverse" and "feed" positions by a pair of pistons 526 and 527, slidable in cylinders 528, 529, and connected to the rod 525 through an intermediate link 530 pivoted at its center on the rod 525 and at its ends to the pistons 526 and 527. As in the previous case, pressure fluid is supplied from the conduit 519 through two-way valves 531 and 532 actuated respectively by solenoids $S_3$ and $S_4$. The pistons 526 and 527 are held in their neutral position shown by pressure fluid supplied respectively to their left and right hand faces (through 519—531—533 and 519—532—534). To shift the actuator into "feed" position the solenoid $S_3$ is energized to supply pressure fluid to the right face of the piston 526 (through 519—531—535) while to shift the actuator into its "rapid traverse" position, the solenoid $S_4$ is energized to supply pressure fluid to the left face of the piston 527 (through 519—532—536), the solenoid $S_3$ being deenergized.

The column clamp actuating cylinder 403 is supplied with pressure fluid from the conduit 519 through a two-way valve 537 actuated by a solenoid $S_5$. When in the position shown, with the solenoid $S_5$ deenergized, pressure fluid is supplied to the left face of the piston 404 through the valve 537 and the supply conduit 538, in order to lock the piston in its "off" or unclamped position, fluid being exhausted from the right face of the piston to the sump through a line 539 and the valve 537. Upon energization of the solenoid $S_5$ the connections are reversed through the valve 537 and the piston 404 shifted to its left hand or clamping position by pressure fluid supplied through the line 539.

Means has been provided to insure automatic release of the column clamps prior to engagement of either the rapid traverse or feed clutches 382, 384 for the column drive mechanism. To this end so-called cycle valves 540 and 541 have been inserted in the piston actuator supply lines 535 and 536, respectively (Fig. 40), for the column clutch actuator 501. These cycle valves are of well known construction (see Fig. 42) and in general permit a free flow of fluid in one direction while limiting to a small value the rate of fluid flow in the opposite direction. They may, for example, include a casing 542 with a transverse partition having therein a large central port 543, closed by spring pressed valve element 545. Accordingly, a free flow of fluid in the direction of the arrow 546 is permitted, through both of the large port 543 and an auxiliary port 544, due to the opening of the valve element 545 under the pressure applied to its left face. In the opposite direction, however, the pressure of the fluid closes the valve element 545 so that only a limited flow through the small auxiliary port 544 is permitted. By interposing such cycle valves 540 and 541 in the conduits 535 and 536 (Fig. 40) it will be seen that the application of pressure fluid for shifting the clutch actuator rod 525 from neutral to either its feed or rapid traverse positions is delayed by the restriction of fluid flow although return to neutral is unimpeded. Consequently, ample time is provided for release of the column clamps despite the fact that both the clamp and clutch actuators are simultaneously supplied with pressure fluid from the same source with resultant sudden loadings of the same in use.

In the same way it is desirable to delay the engagement of the column clamps until after the column drive clutch actuator 501 has moved fully to its neutral position. For this purpose a cycle valve 547 (Fig. 40) is inserted in the clamp actuator supply conduit 539. This valve permits a free exhaust of fluid from the actuator when moving into its "off" position so that it may be released quickly but delays the supply of fluid to the actuator when moving to its "on" or clamping position so that this action is substantially delayed to permit the clutch actuator to move to neutral before the clamp is engaged. By interposing such cycle valves in the hydraulic system the proper sequence of operation is insured even though the clamp solenoid $S_5$ be energized simultaneously with either the rapid traverse or feed solenoids $S_3$, $S_4$, thereby obviating the necessity of providing any time delay devices in the electrical control circuit for these solenoids and materially simplifying the interlocking of such circuits.

The hydraulic system in the headstock 53 (Fig. 41) closely resembles that included in the column base described above. No cycle valves are included, however, since the particular devices actuated from this system are not operated simultaneously and, accordingly, the fluid supply from a single pump of reasonable size is ample to insure rapid actuation of the clamps and other parts at all times. In particular, the spindle direction clutches 146, 147, heretofore described, are operated by an axially shiftable actuator rod 548 having a shoe 458ª engaged with the shiftable elements of the reversing clutches (see also Fig. 9) and movable from a central neutral position to right or left for connecting the spindles to be fed respectively in and out. The fluid actuator 504 for this rod 548 (Fig. 41) is substantially identical with that heretofore described for the headstock feed and rapid traverse clutches. Consequently, its parts need not be described in detail. For the present it is sufficient to note that upon energization of a solenoid $S_6$ the associated two-way valve 549 connects the parts for moving the rod 548 to its "spindle out" position while, upon energization of the solenoid $S_7$ its associated valve 550 connects the system to move the rod 548 to its "spindle in" position. When both solenoids are deenergized the rod 548 is locked in its neutral position shown.

Similarly, the headstock clamp actuating pistons 460 and 461 (Fig. 41) are supplied with fluid through a two-way valve 551 actuated by its solenoid $S_8$ and in the same manner as the column clamp actuators heretofore described. The single actuating piston 432 of the main spindle clamp is in turn actuated by pressure fluid supplied to its two-way valve 552 which is operated by solenoid $S_9$ (see also Fig. 34).

The rapid traverse and feed clutches 128, 129 for the spindles 54, 55 are operated by merely a two-position actuator 505 (Fig. 41) having a shifter shoe 553 (see also Fig. 9) which has no neutral position and, hence, is controlled by a single two-way valve 554 operated by its solenoid $S_{10}$.

*Electric circuits*

Not only the hydraulic actuator solenoids $S_1$—$S_{10}$ for the various clutches etc. but also the electric driving motors 57, 58 and 59 are controlled from a unified set of manual switches mounted on a panel 600 fixed to the headstock 53

(Figs. 1 and 43). These switches are for obvious reasons grouped according to the machine element which they control. In the present instance three main groups are provided for, respectively, the "spindle," the "head" or headstock, and the "column." Additionally a two-position panel-selector switch 601 is provided and a normally closed "emergency-stop" push-button switch 602, the latter serving when opened to stop the entire machine.

The "spindle" group of switches includes: a three-position speed-adjustment switch 603, which when shifted from its central neutral position to right or left serves respectively to increase and decrease the speed of the spindle motor, a two-position spindle rotation direction-control switch 604 for the spindle drive, a normally open "run" push-button 605 for starting the spindle motor, a normally closed push-button "stop and inch" switch 606, which when fully depressed serves as a hold-down switch for inching or jogging of the spindle, a two-position feed and rapid traverse selector switch 607, a three-position direction-selector switch 608 for the spindle feed, and a two-position "on-off" switch 609 for the main spindle clamps.

Similarly the "head" group of switches includes: a three-position speed-control switch 610 shiftable to right or left of its neutral position for increasing and decreasing the headstock feed speed, a two-position direction-selector switch 611, a normally open "run" push button switch 612, a normally closed "stop and inch" switch 613, and a three-position selector switch 614 for feed and rapid traverse.

The "column" group of switches, which are substantially duplicates of those of the "head" group includes: a speed-control switch 615, a direction-selector switch 616, a "run" push button 617, a "stop and inch" push button 618, and a feed and rapid traverse selector 619.

Because of the large size of the machine shown, occasion may arise for the operator to dismount from the platform 67 to have a closer view of the work (Fig. 1). To facilitate his control of the machine in such case a portable panel 600ᵃ has been provided (Figs. 1 and 2) connected to the machine by a flexible cable 600ᵇ. The portable panel may be rested on a stand 600ᶜ or hooked into the back of the column 52 with the cable coiled up when not in use. This panel 600ᵃ is a duplicate of the panel 600 except that the panel selector switch is omitted. It is provided with switches 602ᵃ to 619ᵃ corresponding in each case to the switches 602 to 619. Upon shifting the selector switch 601 from its "main" panel position to its "portable" panel position (Fig. 43) a transfer relay TR (Fig. 47) is energized, thereby actuating the various normally open and normally closed contacts of this relay throughout the control circuits so as to shift the effective controls from the "main" panel 600 to the "portable" panel 600ᵃ. The contacts of this transfer relay are designated $TRC_1$, $TRC_2$, etc. To facilitate an understanding of the circuits illustrated, the main control circuits have been shown in heavy black lines and the shunt-connected circuits for the "portable" control panel 600ᵃ have been shown in lighter lines (Figs. 46 and 47). Since this duplicate system of controls is simply paralleled with the main system and operates in the identical manner, it is believed to be unnecessary to describe it in detail.

A number of electromagnetically controlled relays and contacts are included in the control circuits (Figs. 44 to 47) and are designated as $R_1$, $R_2$, $R_3$, etc. In each case the respective contacts of these devices are designated with the additional letter C and a subscript to indicate the particular set of contacts. Thus the contacts of contactor $R_1$ are $R_1C_1$, $R_1C_2$, etc. In particular, these devices include: a pair of alternatively operable reversing contactors for each of the motors 57, 58 and 59 designated respectively as $R_1$—$R_2$, $R_3$—$R_4$ and $R_5$—$R_6$ (Fig. 46), sealing relays $R_7$, $R_8$, and $R_9$, and overload relays $R_{10}$, $R_{11}$, $R_{12}$ associated with the respective motors, and interlock relays $R_{13}$ to $R_{15}$ (see also Fig. 47). In addition an accelerating relay and starting resistance controlling relay are provided for each of the motors but for the sake of simplicity only those designated respectively $R_{18}$ and $R_{19}$, for the spindle motor 57, have been shown (Fig. 44) all such additional relays being omitted in the composite motor control diagram of Fig. 46. Current is furnished for the motors from suitable supply lines $L_1$—$L_2$ and current is supplied at the same voltage to the control relays, solenoids, etc., from corresponding supply lines $L_3$—$L_4$ which are suitably connected to the main supply lines through fuses 620 and 621 (Fig. 46).

The motors 57, 58 and 59 have, in the exemplary machine, been shown (Fig. 46) as being variable speed direct current motors of the compound type. For example, the spindle motor 57 includes an armature 622, a series field 623, and a shunt field 624, the other motors 58 and 59 being provided with similar parts designated respectively as 625—626—627 and 628—629—630. Speed variations are accomplished by means of rheostats 631, 632, 633 connected in the respective shunt field circuits and operated by means of corresponding reversible rheostat adjusting motors 634, 635 and 636. The armature of the motor 634 is designated as 634ᵃ and this motor has alternatively energizable field windings which correspond to opposite directions of rotation and are designated as 634ᵇ and 634ᶜ, the corresponding parts of the other two rheostat motors being designated similarly.

Various protective switches are also included in the circuits. Overtravel of the rheostat adjusting motors 634—636 is prevented in the usual manner by limit switches 637—642 connected in their respective field circuits (Fig. 46). Limit switches 643, 644 protect the headstock against overtravel, and limit switches 645 and 646 similarly protect the column. These switches are mounted in the usual manner adjacent the ends of the path of travel of the movable element being protected and are actuated by suitable dogs (not shown) on such element. Additionally, normally closed limit switches 647 and 648 (Fig. 47) open circuit the associated clamp solenoids for the headstock and column, respectively, whenever the manual operating shafts for feeding the same are utilized, as previously described.

In the operation of the spindle motor 57 (Fig. 44) voltage is applied to the supply lines by the closure of a suitable power supply switch (not shown) thereby energizing the relay $R_{13}$ (see Fig. 46) so that its contacts $R_{13}C_1$ in the spindle motor control circuits (Fig. 44) are closed. Then to start the spindle motor the operator momentarily closes the "run" push button 605 and (assuming the direction selector 604 is set for right hand rotation) the "main" contactor $R_1$ is energized (through a circuit $L_3$—$TRC_{16}$—605—604—$R_{13}C_1$—$L_4$). The main contactor $R_1$ is locked in by the relay $R_7$ which is initially energized upon the closure of the main contacts $R_1C_3$ (through a circuit $L_3$—$TRC_{16}$—605—604—$R_1C_3$—606—$TRC_{17}$—$R_7$—$R_{13}C_1$—$L_4$) and thereafter retained energized by closure of its sealing contacts $R_7C_1$ (through a circuit $L_3$—$R_7C_1$—606—$TRC_{17}$—$R_7$—$R_{13}C_1$—$L_4$) the main contactor $R_1$ being sealed in by the relay contacts $R_7C_1$ independently of the push button 605 (through a circuit $L_3$—$R_7C_1$—$R_1C_3$—$R_1$—$R_{13}C_1$—$L_4$). The resultant closure of the contacts $R_1C_1$ and $R_1C_2$ of the main contactor connects the armature 622 and series field 623 across the supply lines $L_1$—$L_2$ to start the motor. Initially a starting resistance 651 is connected in series with the motor armature since the relay contacts $R_{19}C_1$ are open. As the motor comes up to speed the armature voltage increases until the relay $R_{19}$, which is connected across it, picks up, thereby closing its contacts $R_{19}C_1$ to shunt out the starting resistance.

Having been started as described above, the spindle motor 57 continues to operate at a speed determined by the setting of the shunt field rheostat 631. To change the setting of this rheostat the operator shifts the selector switch 603 (Fig. 46) to energize a corresponding one of the rheostat motor fields $634^b$ or $634^c$, the rheostat motor being retained energized until the desired change in rheostat setting is accomplished. In the event of excessive acceleration of the spindle motor 57 the conventional acceleration relay $R_{18}$, which has the usual voltage and actuating windings, closes its contacts $R_{18}C_1$, thereby shunting out the rheostat 631 and applying full shunt field to the motor to decrease its acceleration. As soon as the acceleration drops back to a safe value the contacts $R_{18}C_1$ reopen to restore the rheostat to the motor field circuit.

To stop the spindle motor 57 the operator opens the normally closed stop switch 606 (Fig. 44) thereby dropping the relay $R_7$ which in turn drops out whichever one of the main contactors $R_1$ or $R_2$ that has been closed. This deenergization of the main contactors causes their supplemental contacts $R_1C_4$ and $R_2C_4$ to be closed, thereby connecting a dynamic breaking resistance 652 across the motor armature 622 so that the motor is quickly braked to standstill. The motor is similarly stopped by opening of the "emergency stop" switch 602 (Fig. 46) which thereby drops out the relay $R_{13}$ causing it to open its contacts $R_{13}C_1$ (Fig. 44) which are in series with both of the main contactors $R_1$ and $R_2$.

In order to inch or jog the spindle motor along at a slow speed, the combined "stop and inch" switch 606 is fully depressed so as to close its lower set of contacts (Fig. 44.) In this way one or the other of the main contactors $R_1$ or $R_2$ (the one energized depending upon the setting of the direction selector 604) is picked up and remains energized so long as the lower contacts of the switch 606 are manually retained closed. The sealing relay $R_7$ is not picked up, however, since the upper set of contacts on the switch 606, which are in its energizing circuit, are open. Accordingly the spindle motor 57 continues to run only so long as the switch 606 is held fully depressed and stops immediately upon the release of this hold-down switch.

Starting, stopping, reversal and speed adjustment for the column and headstock motors 58 and 59 are accomplished through the medium of control circuits (Fig. 46) substantially identical with those for the spindle motor 57 and consequently it is believed that the foregoing description of the spindle motor operation will serve for these as well. With regard to the headstock motor circuit, it will be noted that contacts $R_7C_3$ of the spindle motor sealing relay $R_7$ are connected in series with the headstock motor sealing relay $R_9$ so that the latter cannot be closed to maintain the headstock motor 59 in operation except when the spindle motor is also running. A similar interlock, by means of contacts $R_7C_2$, is provided in the column motor circuit. Also to be noted in connection with these circuits is the fact that headstock limit switches 643 and 644 are connected in series with the respective main contactors $R_5$ and $R_6$ while in the column motor circuits the limit switches 645 and 646 are connected in series with the main contactors $R_3$ and $R_4$. In this way the respective headstock and column motors 59 and 58 are automatically stopped at their respective limits of travel, although reenergization of the motors for movement in the opposite direction is permitted.

To increase automatically the speeds of the column and headstock driving motors 58 and 59 when the latter are connected for rapid traverse, interlock relays $R_{14}$ and $R_{15}$ (Fig. 47) are provided. The relay $R_{14}$ is energized whenever the headstock rapid traverse relay $R_{27}$ is energized and, similarly, the relay $R_{15}$ is picked up whenever the column rapid traverse relay $R_{25}$ is energized. Energization of the relay $R_{14}$ causes it to open its normally closed contacts $R_{14}C_1$ (Fig. 46) in the control circuit of the headstock motor 59 so as to cut the full value of rheostat 633 into series with the motor shunt field 630, thereby providing minimum shunt field on the motor for high speed. Similarly, energization of the interlock relay $R_{15}$ causes it to open its normally closed contacts $R_{15}C_1$ in the control circuit for the column motor 58, thereby cutting the full value of rheostat 632 into the circuit in the same manner.

Correlated with the motor control circuits described above are those for the various valve actuating solenoids $S_1$ to $S_{10}$. The operation of the circuits for these solenoids will be apparent from the wiring diagram (Fig. 47). In brief, the spindle feed and rapid traverse selector solenoid $S_{10}$ and the spindle clamp solenoid $S_9$ are energized upon closure of their respective two-position selector switches 607 and 609, through the medium of their associated control relays $R_{20}$ and $R_{21}$. On the other hand, the alternatively energizable pairs of solenoids $S_6$ and $S_7$ for spindle feed direction, $S_3$ and $S_4$ for column feed and rapid traverse, and $S_1$ and $S_2$ for headstock feed and rapid traverse are operated by their respective three-position selector switches 608, 614 and 619 through the medium of their associated pairs of control relays $R_{22}$, $R_{23}$ and $R_{24}$, $R_{25}$ and $R_{26}$, $R_{27}$. In the circuits of these latter pairs of relays it should be noted that the normally closed interlock contacts $R_{21}C_2$ on the spindle clamp relay $R_{21}$ are interposed in the circuits of the spindle feed relays $R_{22}$ and $R_{23}$ so as to prevent energization of the latter when the clamp is on. Similarly, interlock contacts $R_{22}C_2$ and $R_{23}C_2$ on the spindle direction relays are interposed in the circuit of the spindle clamp relay $R_{21}$ so as to prevent its simultaneous actuation with the spindle feed relays.

Unlike the other solenoids, the headstock and column clamp solenoids $S_8$ and $S_5$, respectively, are actuated automatically instead of through the medium of manually operable selector switches. In particular, the headstock clamp solenoid $S_8$ is energized through series connected and normally closed auxiliary contacts $R_{26}C_2$ and $R_{27}C_2$ on the headstock feed and rapid traverse relays while the column clamp solenoid $S_5$ is similarly energized through normally closed and series connected contacts $R_{24}C_2$ and $R_{25}C_2$ on the column feed and rapid traverse relays. Consequently, whenever the headstock selector switch 619 is in its neutral position, and hence neither the rapid traverse nor feed clutch is engaged, the headstock clamp solenoid $S_8$ is energized to effect clamping of the headstock; and the column clamp solenoid $S_5$ is similarly energized whenever the column selector switch 614 is in its neutral position. To deenergize the solenoids $S_5$ and $S_8$, and thereby unclamp respectively the column and headstock, when the latter are being fed by hand, the normally closed switches 648 and 647 are interposed in the circuits of these solenoids. As was heretofore described, these switches are arranged to be opened automatically (see Fig. 7) when the respective hand cranks for the column and headstock hand feeds are engaged and in this way the respective solenoid circuits are interrupted to unclamp the machine element which is to be moved.

In contrast with the controls for the headstock and column clamps just described, the main spindle clamp actuating solenoid $S_9$ has a circuit which is uninterlocked with the associated feed mechanism, in this case, that for the spindle. This is for the reason that the main and auxiliary spindles 54 and 55 are fed alternatively, as was heretofore described and it may, therefore, be desirable to apply the main spindle clamp even when the spindle feed mechanism is operating to feed the other or auxiliary spindle 55. Consequently, the main spindle clamp solenoid $S_9$ is actuated simply by its "on-off" selector switch 609 through the medium of the relay $R_{21}$.

A unified control circuit is provided for the two pump motors 503 and 507 (Fig. 45). These motors have been shown as being of the compound direct current type, the motor 503 having an armature $503^a$, a series field $503^b$ and a shunt field $503^c$ while the motor 507 has an armature $507^a$, a series field $507^b$ and a shunt field $507^c$. The motors are operated in parallel from supply lines $L_1$—$L_2$. To start them, a normally open "start" push button 647 is closed momentarily, thereby connecting an associated sealing relay $R_{28}$ across supply lines $L_3$—$L_4$ through a normally closed "stop" switch 648. The relay $R_{28}$ closes its contacts $R_{28}C_1$ in shunt with the starting switch 647, thereby sealing itself in, and also closes its contacts $R_{28}C_2$ to connect the motors 503 and 507 to the line. Initially, the motor armatures are connected across the line in series with a starting resistance 649 and as they come up to speed the voltage across the armatures causes the starting relay $R_{29}$ to pick up, thereby closing its contacts $R_{29}C_1$ to shunt out the starting resistance. To stop the pump motors at any time the operator merely opens the "stop" switch 648, thereby dropping out the relay $R_{28}$.

To interlock the pump and driving motor circuits, two pressure operated switches 650 and 651 are included in the main motor control circuits (Fig. 46). These switches are held in closed position by the fluid pressure developed by the hydraulic pumps 502 and 506, respectively, for the column and headstock hydraulic circuits heretofore described. In the event of a failure of pressure in either hydraulic circuit the corresponding switch will open, thereby dropping out the main interlock relay $R_{13}$ and causing it to stop the motors 57, 58 and 59, as heretofore described in connection with the operation of this relay to stop these motors upon opening of the "emergency stop" switch 602.

A continuous visual indication of, respectively, the spindle rotational speed, column and headstock traversing speeds is afforded by tachometers 113, 653 and 654 (Fig. 1). These tachometers are provided with indicator dials calibrated respectively in terms of R. P. M. and inches per minute and conveniently located on the headstock 53. A double scale may be provided on the tachometer 113 for the two spindles. The tachometers are energized from corresponding tachometer generators. As was previously noted, the spindle tachometer generator 107 is driven from the gear 86 (see Figs. 6 and 13) in the spindle drive mechanism. Similarly, a generator 656 for the headstock feed tachometer 654 is driven from the shaft 321 in the headstock drive mechanism (Figs. 22 and 25) and a generator 655 for the column feed tachometer 653 is driven from a corresponding point in the column drive mechanism (Fig. 22).

The tachometer generators are provided with respective shunt fields, the shunt field $107^b$ for the spindle tachometer being shown in Fig. 44. It is connected across the spindle motor armature 622 through resistors 657 and inside the contacts of the main reversing contactors $R_1$ and $R_2$. The shunt fields (not shown) for the other two tachometer generators may be similarly connected with the armatures of the respective motors 58 and 59. By so connecting the generator fields they are energized only when the associated main drive motors are in operation and in addition their polarity is reversed simultaneously with that of the associated motors so that the tachometers will always read up-scale.

*Brief résumé of operation*

In the operation of the machine herein disclosed, there are in general four motions of movable machine elements available, viz: (1) rotation of the tool spindle 54, 55; (2) axial feed of the spindles; (3) vertical feed of the headstock 53; and (4) horizontal feed of the column 52. The operation of the machine for these various motions is summarized seriatim below.

The auxiliary spindle 55 may be rotated at any one of four speeds determined by the setting of the speed-change control handles 286 and 287 (Fig. 3). To start and stop this spindle, its drive motor 57 is started by momentarily depressing the "run" button 605 and stopped by partially depressing the "stop-and-inch" button 606 on the control panel 600 (Fig. 43). Reversal of the direction of spindle rotation is effected by reversing the motor 57 by the spindle-drive direction-selector switch 604. Supplemental to the stepped variations in spindle speed accomplished by the speed-change gearing, the speed of the motor 57 may be varied by the "faster" and "slower" selector 603 to obtain practically stepless variations throughout the speed range of the motor. To inch or jog the spindle in a rotary direction as, for example, in setting a cutting tool in a particular angular position, the switch 606 is fully depressed and serves in such case to retain the spindle drive motor 57 energized only so long as it is held down, stoppage being immediate upon its release.

The main spindle 54 is rotatably driven from the auxiliary spindle 55 and may be connected to it at will by a clutch operated by the handle 90a (Fig. 3). Since the spindles are driven in unison, when the main spindle 54 is in use, the latter is subject to all of the speed controls, etc., noted above for the auxiliary spindle drive. Whenever the clutch 90 is disengaged to interrupt the main spindle drive a brake is automatically applied to stop the spindle rotation, the brake being actuated by the same lever 90a by which the clutch 90 is manipulated. The speed of both spindles is indicated on the corresponding scales on the tachometer 113.

Axial feed of one or the other of spindles 54, 55 is accomplished, with the spindle drive motor 57 as a source of power, by shifting the selector clutch handle 173 (Fig. 3) to connect either the main or auxiliary spindle for feeding. When the clutch actuator 173 is in neutral the feed for both spindles is discontinued and, of course, stopping of the motor 57 also stops the feed. Rapid traverse and feed clutches 128 and 139 are alternatively engaged by manipulation of their selector switch 607 (Fig. 43) to condition the spindle feed mechanism correspondingly for traversing of the selected spindle at a rapid traverse rate or at a relatively slower feed rate. Eighteen stepped variations in this slower feed rate can be made by changing the settings of the series connected nine-feed unit 176 and two-feed unit 200 by their respective actuator handles 186 and 187, the selected feed in the series of eighteen being shown by the indicator 188 (Fig. 3). In addition, changes in both the rapid traverse and feed rates may be made by the "high" and "low" feed or two-feed unit 158 which embodies a speed-change gearing operated by the handle 158a, and still further changes may be made by changing the pick-off gears 164 and 165 (Fig. 13).

Since both the drives and feeds for the spindles 54, 55 are derived from a single prime mover, namely the motor 57, a preselected ratio between the two is maintained at all times despite variations in motor speed, whether the latter be inadvertent or deliberate. Furthermore, the same hold-down switch 606 which is used in inching the spindles in a rotary direction may also be used for inching them axially, and, of course, the drive and feed can both be started and stopped by the same "run" and "stop" buttons 605 and 606, thereby minimizing the number of control devices required.

As a further aid in feeding the spindles 54, 55 the quadrant handle 217 can be depressed to engage the clutch 212 and the knock-out cam 228 set, as heretofore described, to disconnect the clutch automatically after a predetermined increment of feed.

To feed a selected one of the spindles by hand, rather than by power, the handwheel 291 (Fig. 3) may be used or quadrant handles 217, 218, 219 and 220. This handwheel 291 is connected to one or the other of the spindles by the selector clutch sleeve 167, and rotation of the handwheel feeds the selected spindle.

The main spindle 54 is releasably clamped against axial movement by its hydraulically actuated clamping mechanism controlled by the "on-off" selector switch 609 (Fig. 43). Similarly, the auxiliary spindle 55 is clamped at will by its clamping mechanism, which is actuated mechanically by the hand lever 473 (Fig. 3).

Feeding movement of the headstock 53 in a vertical direction along the column 52 is started, stopped and reversed by correspondingly starting, stopping and reversing the headstock drive motor 59. These three control operations for the feed motor are accomplished respectively by the "run" switch 612, the "stop-and-inch" switch 613, and the direction-selector switch 611 (Fig. 43). The headstock may also be stopped by putting in neutral the selector 614 for the alternatively engageable feed and rapid traverse clutches. When this selector 614 is turned to its "rapid traverse" position the rapid traverse clutch is engaged for movement of the headstock at a comparatively fast rapid traverse rate and, similarly, when the selector is turned to its "feed" position the feed clutch is engaged to connect the motor 59 for traversing the headstock at a relatively slower feed rate. This feed rate may be at any one of four selected values determined by the speed-change gearing controlled through the medium of the hand lever 334 on the base of the column. For further variations in the feed rate, the motor speed may be varied at will by means of the speed-change switch 610 (Fig. 43). In order to jog or inch the headstock at a low speed as, for example, in setting it precisely in some desired position with respect to a work piece, the "stop-and-inch" switch 613 is fully depressed and in such case serves as a hold-down switch for maintaining the motor 59 energized. As soon as the switch 613 is released by the operator the motor energizing circuit is broken and the headstock stops immediately.

Whenever the headstock 53 is at rest it is automatically clamped in position by clamp shoes 441, 442 (Fig. 36) which engage the rear sides of the column ways 65. When the selector 614 is turned to either its "feed" or "rapid traverse" position the solenoid S8 is energized to release the clamps automatically (Fig. 43).

If it is desired to feed the headstock 53 by hand rather than by power, as outlined above, a handcrank (not shown) is engaged with the shaft 355 on the headstock (Fig. 3) and this hand crank shaft is pushed inwardly to render it operative. This initial inward thrust of the hand crank shaft also opens the switch 647 to release the clamp shoes 441, 442. Upon rotation of the hand crank, the lead screw 74 is rotated to move the headstock.

The column 52 is traversed horizontally along the platform 60 (Figs. 1 and 2) by its drive motor 58 which is arranged to drive the pinion 377 on the column meshing with the stationary rack 376 extending along the platform. To start the motor 58 the "run" button 617 is momentarily depressed (Fig. 43), the direction of movement being determined by the setting of the direction-selector switch 616; and to stop the motor the "stop-and-inch" switch 618 is momentarily depressed. The drive connection between the motor 58 and pinion 377 is disconnected whenever the selector 619 is in its neutral position. Upon shifting this latter selector to either its "rapid traverse" or "feed" positions the motor is connected through corresponding gearings for moving the column at a rapid traverse rate or relatively slow feed rate. This feed rate may be varied in incremental steps through the manipulation of a hand lever 385 on the base of the column (Fig. 22) which governs the speed-change mechanism for the column feed. For further variations in the feed rate the speed of the motor 58 may be varied by the speed control switch 615. The column may also be inched along at a slow rate by fully depressing the "stop-and-inch" switch 618. Such full depression of this switch energizes the motor 58 but does not lock in its energizing circuit so that as soon as the operator releases the switch 618 the motor stops. The feed speeds of the column and headstock are shown respectively by the tachometers 653 and 654 (Fig. 1).

Whenever the column 52 is at rest it is clamped in position by the clamping mechanism 400, 401 (Fig. 22). These clamps are automatically released whenever the selector 619 is turned to either its "rapid traverse" or "feed" positions, by the energization of the solenoid S5. Cycle valves 540, 541 and 547 (Fig. 40) are, however, provided in the hydraulic circuits for the clamp and clutch actuators for the column so as to insure release of the column clamps prior to engagement of either the rapid traverse or feed clutches and, similarly, to insure disengagement of these clutches prior to setting of the clamps.

To move the column 52 manually, a hand crank is engaged with the hand crank shaft 386 on the headstock (Fig. 3) and pushed inward to operative position. In such case the switch 648 (Fig. 47) is opened to deenergize the solenoid S5 and release the clamps 400, 401. Rotation of the hand crank shaft rotates the spline shaft 388 which is connected to the column drive pinion 377 in the base of the column.

All of the control devices referred to in the foregoing outline of operation are, with the exception of the column and headstock feed speed selector handles 385 and 386, mounted on the headstock 53 and are manipulable by an operator riding the platform 57. Because of the great variety of changes in feed speeds, etc., which are available the machine can be operated with extreme flexibility and is very versatile as regards the number of machining operations which can be performed effectually. On the other hand, the centralization of the controls on the headstock makes it possible for the operator to ride this element while retaining full control of the machine.

If a particular machining operation requires the presence of the operator at some point on, say, the bed 50 instead of on the headstock, he can still retain effectual control of the machine through the medium of the portable control panel 600a (Fig. 1). Since this panel provides duplicates of all of the switches 602 to 619 the operator can carry out all of the controlling operations outlined above, except the manual feeds of the elements and the changes in the settings of the speed-change gearings for different feed or drive speeds. The omission of these latter is no handicap, however, since the manual feeds are ordinarily used only when the operator is closely watching the movement of some particular part, and the incremental changes in feed or drive speeds are usually made preliminarily in setting up the machine for some particular machining operation.

I claim as my invention:

1. A machine tool comprising, in combination, a horizontal work support, a horizontal runway beside said work support, a vertical column slidable in a horizontal direction along said runway, a headstock arranged for vertical sliding movement on said column and having a tool spindle journaled therein, means for moving said headstock vertically on said column, a stationary rack extending along said runway, a pinion journaled in said column and meshing with said rack, a self contained power unit including an electric motor carried by said column and movable therewith for driving said pinion to traverse the column along said runway, means manipulable from said headstock for controlling said motor, and means supplemental to said power unit and manipulable from said headstock for rotating said pinion by hand to traverse the column.

2. A machine tool comprising, in combination, a horizontal work support, a horizontal runway beside said work support, a vertical column slidable in a horizontal direction along said runway, a headstock having a tool spindle therein and arranged for vertical sliding movement on said column, a first power actuated means for traversing said headstock vertically along said column, control means for said first power actuated means manipulable from said headstock, a second power actuated means for traversing said column along said runway, a second control means for said second power actuated means also manipulable from said headstock, and further means manipulable from said headstock and operable alternatively to said power actuated means for traversing either said headstock or said column by hand.

3. In a boring and milling machine of the type described, the combination of a horizontal work support, a vertical column at one side of said support, power actuated means for effecting relative movement in a horizontal direction between said support and column, a headstock disposed for vertical movement on said column and having a horizontal tool spindle journaled therein, a second power actuated means for traversing said headstock vertically of said column, a third power actuated means for driving said spindle, an operator-supporting platform on said headstock, and control means for governing the operation of all three of said power actuated means arranged for manipulation from said headstock platform.

4. A machine tool comprising, in combination, a horizontal work support, a vertical column arranged for traversing movement along one side of said work support, a headstock traversable vertically on said column and having a tool spindle journaled therein, self-contained power actuated means including a prime mover located in the base of said column and carried thereby for traversing both said column and said headstock, a second self-contained power actuated means including a second prime mover carried by said headstock and movable therewith for driving said spindle, and control means for both of said power actuated means mounted on said headstock.

5. A machine tool comprising, in combination, a horizontal work support, a vertical column arranged for traversing movement along one side of said work support, a headstock traversable vertically on said column and having a tool spindle journaled therein, a plurality of self-contained power actuating units carried by said column and movable therewith for traversing respectively said column and headstock, each of said units including an electric motor and a speed change gearing, and means including alternatively engageable rapid traverse and feed clutches operable respectively to connect said motors substantially directly to their associated driven elements for traversing them at a rapid traverse rate and to connect said motors drivingly to their associated elements, through their corresponding speed-change gearings to move the same at a selected slow feed rate.

6. A machine tool comprising, in combination, a horizontal work support, a vertical column arranged for traversing movement along one side of said work support, a headstock traversable vertically on said column and having a tool spindle journaled therein, self-contained power actuating units carried by said column and movable therewith for traversing respectively said column and headstock, each of said units including an electric motor and a speed change gearing, and means including alternatively engageable rapid traverse and feed clutches operable respectively to connect said motors substantially directly to their associated driven elements for traversing them at a rapid traverse rate, and to connect said motors drivingly to their associated elements to their corresponding speed-change gearings to move the same at a selected slow feed rate, and means for actuating said clutches and controlling said motors including a unified set of electric control devices mounted on said headstock and manipulable therefrom.

7. A machine tool comprising, in combination, a plurality of relatively movable machine tool elements, a plurality of self-contained power actuating units for traversing corresponding ones of said elements and mounted on various ones of said elements, each of said units including an electric motor and a speed-change gearing, means including pairs of alternatively engageable rapid traverse and feed clutches associated with each of said units and operable respectively to connect said motors substantially directly to their associated driven elements for traversing them at a rapid traverse rate and to connect said motors drivingly to their associated elements through said speed-change gears to move the same at a selected slow feed rate, and a unified set of electric control devices for controlling all of said motors and clutches from one of said movable machine tool elements.

8. A machine tool comprising, in combination, a plurality of relatively movable machine tool elements, a plurality of separate electric driving motors associated with corresponding ones of said elements, a plurality of speed-change gearings, means operable alternatively to connect said motors in driving relation with corresponding elements either through a corresponding one of said speed-change gearings or independently of the latter, and an electrical control means operable from a point remote from at least some of said elements for controlling the operation of all of said motors and said connecting means.

9. A machine tool comprising, in combination, a plurality of relatively movable machine tool elements, a plurality of self-contained power actuating units for traversing corresponding ones of said elements and mounted on various ones of said elements each of said units including an electric motor and a speed-change gearing, means including pairs of alternatively engageable rapid traverse and feed clutches associated with each of said units and operable respectively to connect said motors substantially directly to their associated driven elements for traversing them at a rapid traverse rate and to connect said motors drivingly to their associated elements through said speed-change gears to move the same at a selected slow feed rate, said clutches being of the friction type and having a hydraulic actuator associated with each pair, electric solenoid operated valves arranged to control said hydraulic actuators, and a unified set of electric control devices for controlling from a remote point the operation of said motors and of said solenoid operated valves.

10. A machine tool comprising, in combination, a plurality of relatively movable machine tool elements, a plurality of individual power actuated devices for moving respective ones of said elements, means including a plurality of friction clutches for operatively connecting said power actuated means with their associated machine tool elements, a hydraulic actuator associated with each of said clutches and having a control valve therefor, a solenoid actuator for each of said control valves, an associated set of controls for all of said solenoids mounted on one of said movable machine tool elements and movable therewith, and means for supporting an operator on said element.

11. In a machine of the type described, the combination of a horizontal runway supporting a vertical column for movement along it, a headstock vertically traversable on the column, a pair of self-contained power actuating units for supplying power for traversing the column and headstock, said units being fixed to the lower portion of the column and movable with it, means including clutches associated with said motors for connecting them respectively in driving relation with the column and headstock, a clamping mechanism on the column for releasably clamping it to the runway at any selected point along the latter, hydraulic actuators for said clutches as well as for said clamping mechanism, and a motor driven pump on the column for supplying pressure fluid to all of said actuators through a single unified hydraulic system.

12. In a machine of the type described, the combination of a horizontal runway supporting a vertical column for movement along it, a headstock vertically traversable on the column and having a tool spindle journaled therein for rotative and axial feeding movement, a pair of self-contained power actuating units for supplying power for traversing the column and headstock, said units being fixed to the lower portion of the column and movable with it, means including clutches associated with said motors for connecting them respectively in driving relation with the column and headstock, a clamping mechanism on the column for releasably clamping it to the runway at any selected point along the latter, hydraulic actuators for said clutches as well as for said clamping mechanism, a first motor driven pump on the column for supplying pressure fluid to all of said actuators through a first unified hydraulic system, power actuated means for feeding said spindle, means including a hydraulically actuated clutch on the headstock for connecting said power actuated means in operative relation with the spindle, a hydraulically actuated clamping mechanism on the headstock for releasably clamping it to the column, and a second motor driven pump on the headstock for supplying pressure fluid to the actuator for said spindle feed clutch and to that for said headstock clamping mechanism through a second unified hydraulic system.

13. In a machine tool the combination of a headstock having a tool spindle journaled therein for rotative and axial feeding movement, a guideway supporting said headstock for traversing movement along it, power actuated means for feeding said spindle axially, a clutch interposed between said last named means and the spindle, means for releasably clamping said headstock to said guideway, individually operable hydraulic actuators for said clutch and clamping means, and means including a motor driven pump on said headstock for supplying pressure fluid to all of said actuators through a unified hydraulic system.

14. In a machine tool the combination of a headstock having a tool spindle journaled therein for rotative and axial feeding movement, a guideway supporting said headstock for traversing movement along it, power actuated means for feeding said spindle axially, a clutch interposed between said last named means and the spindle, means for releasably clamping said headstock to said guideway, means for releasably clamping the spindle against axial movement, individually operable hydraulic actuators for said clutch and both of said clamping means, and means including a motor driven pump on said headstock for supplying pressure fluid to all of said actuators through a unified hydraulic system.

15. In a machine tool of the type described the combination of a vertical column traversable along a horizontal runway, a headstock mounted for vertical movement on said column, a first clamping mechanism on the column for releasably clamping it to the runway, a second clamping mechanism on the headstock for releasably clamping it to the column, power actuated means on the column, means including first and second clutches operable respectively to connect said column and headstock in driven relation with said power actuated means, individually operable hydraulic actuators for each of said clutches and clamping mechanisms, a first source of pressure fluid in said column for supplying pressure fluid to both of the clutch actuators and to said first clamping mechanism, a first control means for automatically causing said first clamping mechanism to release upon actuation of said first clutch to engage and vice versa, means for restricting the supply of pressure fluid for the engagement of said first clutch and for the actuation of said first clamping mechanism to insure sequential clamp release and clutch engagement and vice versa even though the actuator for both are supplied from a single source of pressure fluid, a second control means for automatically causing said second clamping mechanism to release upon actuation of said second clutch to engage and vice versa, and a second source of pressure fluid on the headstock and independent of the first for supplying pressure fluid to the actuator for said second clamping mechanism, whereby rapid and full operation of the actuators for both the second clutch and clamp is insured by virtue of the pressure fluid capacity furnished by the two sources.

16. In a machine tool the combination of a movable machine tool element, power actuated means, a clutch operable to connect said element in driven relation with said power actuated means, a mechanism for releasably clamping said element against movement, individual hydraulic actuators for said clutch and clamping mechanism each including a cylinder with a piston reciprocable therein, a hydraulic system including a single source of pressure fluid for supplying fluid to one face of each piston while exhausting it from the other and vice versa to actuate the pistons in corresponding directions, control means operable to supply fluid through said system to said pistons simultaneously to move the same in a direction to release the clamp and engage the clutch and alternatively operable to supply fluid to said pistons simultaneously to move them in the opposite direction to disengage the clutch and set the clamp, and check valve means for restricting the exhaust of fluid from the clamp actuator during setting of the clamp and for restricting the exhaust of fluid from the clutch actuator during engagement of the clutch to insure respectively a sequential clutch disengagement and setting of the clamp and sequential clamp release and engagement of the clutch.

17. In a machine tool the combination of a movable machine tool element, power actuated means, a clutch operable to connect said element in driven relation with said power actuated means, a mechanism for releasably clamping said element against movement, individual hydraulic actuators for said clutch and clamping mechanism, a common source of pressure fluid for said actuators, control means operable to connect said actuators simultaneously to the source of pressure fluid to release said clamping mechanism and engage said clutch, and means restricting the flow of fluid to cause a sequential release of the clamp and engagement of the clutch.

18. In a machine tool, the combination of a movable machine tool element, power actuated means for moving said element, an engageable clutch mechanism for connecting said means in driving relation with said element, a first electric control circuit for said clutch mechanism, a releasable clamping mechanism for holding said element against movement, a second electric control circuit for said clamping mechanism, and means including an electric interlock between said first and second control circuits to release said clamp automatically whenever said clutch mechanism is engaged and to set said clamp mechanism when said clutch mechanism is disengaged.

19. In a machine tool, the combination of a movable machine tool element, an electric motor for driving said element, a speed-change gearing, means including a clutch mechanism shiftable from a disengaged neutral position alternatively to either a rapid traverse position in which said motor is connected substantially directly to drive said element or to a second engaged feed position in which said motor is connected through said speed-change gearing to drive said element at a relatively slow feed speed, means including a pair of electric control circuits alternatively energizable to shift said clutch mechanism from neutral respectively to its rapid traverse and feed positions, a pair of associated relays for closing respective ones of alternatively energizable circuits, means for releasably clamping said element against movement and including an electric control circuit energizable to cause said clamping means to move to clamped position, and means including auxiliary contacts on said relays interposed in said last named circuit to interrupt the same and thereby release said clamping means whenever one of said relays is closed to complete one of said alternatively energizable clutch control circuits.

20. In a machine tool, the combination of a plurality of relatively movable machine tool elements, means for releasably clamping said elements against movement, power actuating means for effecting relative movement between said elements, means operable automatically to set said clamping means whenever said elements are at rest and to release the same whenever said power actuating means is conditioned to effect said relative movement, manual operating means available alternatively to said power actuating means to effect relative movement between said elements by hand, and means responsive to actuation of said manual means for releasing said clamping means.

21. In a machine tool the combination of a movable machine tool element, normally engaged means for releasably clamping said element at any point in its path of movement, power actuated means for moving said element, means operable automatically in response to conditioning of said power actuated means to move said element for releasing said clamping means, a rotatable and axially shiftable manual operating shaft, normally biased to one extremity of its axial movement, means engageable upon axial shifting of said shaft to the other extremity of its axial movement for connecting the same in operative relation with said element to move the same by manual rotation of the shaft, and means including a switch positioned for actuation in response to axial movement of said shaft from the latter's normal position for releasing said clamping means.

22. In a machine tool the combination of a horizontal work support, a vertical column adjacent the work support, a headstock slidable vertically on the column, power actuated means for traversing the headstock vertically on the column and for effecting relative movement between the column and work support in a horizontal direction, means manipulable from said headstock for controlling the operation of said power actuated means, normally engaged means for clamping said headstock in position on the column and for clamping the column and work support against relative movement, means responsive to conditioning of said power actuated means to move said headstock or to effect said relative movement to release the corresponding clamping means, a pair of manual actuators on said headstock operable respectively to move said headstock and to effect said relative movement by hand, each of said actuators being movable into and out of operative position, and means responsive to movement of one or the other of said actuators into operative position for releasing the corresponding clamping means.

23. In a machine tool of the type described the combination of a horizontal work support and an adjacent vertical column arranged for relative movement in a horizontal direction, a headstock vertically movable on said column and having a tool spindle journaled therein for rotative and axial feeding movement, three individual electric driving motors connected respectively to traverse said headstock and effect said relative movement and feed said spindle, three clutches arranged respectively to connect the motors in operative relation with their respective driven elements of the machine, hydraulic actuators for said clutches, means for supplying fluid under pressure to said actuators, and interlock means for preventing energization of said motors except when the fluid pressure supplied by said last named means exceeds a predetermined minimum.

24. In a machine tool of the type described the combination of a horizontal work support and an adjacent vertical column arranged for relative movement in a horizontal direction, a headstock vertically movable on said column, two electric motors arranged respectively to traverse said headstock and to effect said relative movement, individually operable clamping means for respectively clamping said headstock to the column and the relatively movable column and work support, hydraulic actuators for said clamping mechanisms, means for supplying pressure fluid to said actuators, and interlock means for preventing energization of said motors except when the fluid pressure supplied by said last named means exceeds a predetermined minimum.

25. In a machine tool the combination of a movable machine tool element, means including an electric motor for moving said element, a clutch arranged to connect said motor in driving relation with said element, means for releasably clamping said element against movement, individually operable hydraulic actuators for said clutch and clamping means, means for supplying fluid under pressure to said actuators, and interlock means for preventing energization of said motor except when the fluid pressure supplied by said last named means exceeds a predetermined minimum.

26. In a machine tool the combination of a movable machine tool element, means including an electric motor for moving said element, a clutch arranged to connect said motor in driving relation with said element, a hydraulic actuator for said clutch, means for supplying fluid under pressure to said actuator, and interlock means for preventing energization of said motor except when the fluid pressure supplied by said last named means exceeds a predetermined minimum.

27. In a machine tool the combination of a movable machine tool element, means including an electric motor for moving said element, means for releasably clamping said element against movement, a hydraulic actuator for said clamping means, means for supplying fluid under pressure to said actuator, and interlock means for preventing energization of said motor except when the fluid pressure supplied by said last named means exceeds a predetermined minimum.

28. In a machine tool the combination of relatively movable work and tool supports, a tool spindle rotatably journaled in the tool support, first power actuated means for effecting relative feeding movement between said supports, second power actuated means for driving said spindle, hydraulically actuated means for releasably clamping said supports against relative movement, means for supplying pressure fluid to said clamping means, a first interlock means for preventing conditioning of said power actuated means to effect said feeding movement except when said spindle is rotating, a second interlock means for automatically releasing said clamping means in response to conditioning of said first power actuated means to effect said feeding movement, and a third interlock means for preventing operation of either of said power actuated means except when the pressure furnished by said supply means exceeds a predetermined minimum.

29. In a machine tool the combination of relatively movable work and tool supports, a tool spindle rotatably journaled in the tool support, first power actuated means for effecting relative feeding movement between said supports, second power actuated means for driving said spindle, means for releasably clamping said supports against relative movement, a first interlock means for preventing conditioning of said first power actuated means to effect said feeding movement except when said spindle is rotating, and second interlock means for automatically releasing said clamping means in response to conditioning of said first power actuated means to effect said feeding movement.

30. In a machine tool, in combination, a movable machine tool element, means including a clutch mechanism having an intermediate neutral position for connecting said element to a source of power when said clutch is shifted to either of its engaged positions on opposite sides of neutral, a shifter for the clutch mechanism, means including two coordinately movable fluid actuated pistons for moving said shifter to neutral and to either of its clutch-engaging positions, solenoid operated valve means for selectively directing pressure fluid to said pistons, and electric control means for said solenoid operated valve means located at a remote point.

31. In a machine tool, in combination, a movable machine tool element, means including a clutch having an intermediate neutral position for connecting said element to a source of power when said clutch is shifted to either of its engaged positions on opposite sides of neutral, hydraulic actuating means for moving said shifter to neutral and to either of its clutch engaging positions, means including a control valve movable to direct pressure fluid to said actuating means to shift it selectively to one of the three positions set forth, electrical control means for said valve means, and means for yieldably urging said valve means to a position in which pressure fluid is supplied to move the clutch to neutral, whereby the system will fail safe in the event of power failure for the electric electrical control.

32. In a machine tool, in combination, a movable machine tool element, means including a clutch mechanism having an intermediate neutral position for connecting said element to a source of power when said clutch is shifted to either of its engaged positions on opposite sides of neutral, an axially movable shifter rod for said clutch, a lever extending generally transversely of the shifter and pivoted thereon intermediate the ends of the lever, hydraulically actuated pistons connected to opposite ends of said lever and movable generally longitudinally of said shifter rod, said pistons being arranged to locate said shifter with the clutch in neutral when one piston is projected and the other retracted, retraction of said one piston serving to move the shifter to one clutch-engaged position and projection of both pistons serving to move the shifter to its other clutch-engaged position, solenoid operated valve means for directing pressure fluid to selective faces of said pistons to project and retract the same, and control means for the solenoid valve operator located at a point remote therefrom.

33. In a machine tool, in combination, a movable machine tool element, means including a clutch mechanism having an intermediate neutral position for connecting said element to a source of power when said clutch is shifted to either of its engaged positions on opposite sides of neutral, an axially movable shifter rod for said clutch mechanism, a lever extending generally transversely of the rod and pivotally connected thereto intermediate the ends of the lever, and fluid actuated pistons connected to opposite ends of the lever and arranged for projection and retraction in paths generally paralleling the shifter, said pistons being arranged to locate said shifter with the clutch mechanism in neutral when one piston is projected and the other retracted.

34. In a machine tool, the combination with a movably mounted tool head casing having a spindle journaled therein for axial and rotatable movement, of a self-contained power actuating mechanism fixed to said casing as a unitary structure therewith for rotating and feeding said spindle, comprising, an electric motor mounted on said casing, a speed-change gearing including a plurality of intermediate gears constantly in mesh with a gear device on said spindle and rotatable in unison therewith at all times, means for connecting a selected one of said gears in driven relation with said motor to rotate said spindle at a corresponding speed, means actuatable to feed said spindle axially, and gear means for connecting one of said intermediate gears in driving relation with said last named means.

35. In a machine tool, the combination with a movably mounted tool head casing having a spindle journaled therein for axial and rotatable movement, of a self-contained power actuating mechanism fixed to said casing as a unitary structure therewith for rotating and feeding said spindle, comprising, an electric motor mounted on said casing, a speed-change gearing including a plurality of intermediate gears constantly in mesh with a gear device on said spindle and rotatable in unison therewith at all times, means for connecting a selected one of said gears in driven relation with said motor to rotate said spindle at a corresponding speed, means actuatable to feed said spindle axially, means including a reversing device for connecting said one of said intermediate gears in driving relation with said last named means to feed the spindle in a direction determined by the reversing device and independent of the direction of motor rotation, and means for reversing the direction of motor rotation to reverse correspondingly the direction of spindle rotation.

36. In a machine tool, the combination with a movably mounted tool head casing having a spindle journaled therein for axial and rotatable movement, of a self-contained power actuating mechanism fixed to said casing as a unitary structure therewith for rotating and feeding said spindle, comprising, an electric motor mounted on said casing, a speed-change gearing including a plurality of intermediate gears constantly in mesh with a gear device on said spindle and rotatable in unison therewith at all times, means for connecting a selected one of said gears in driven relation with said motor to rotate said spindle at a corresponding speed, means actuatable to feed said spindle axially, and means including a pair of alternatively engageable clutches operable respectively to connect said motor substantially directly to said last named means to feed said spindle at a rapid traverse rate and to connect one of said intermediate gears in driving relation with said last named means to feed the spindle at a relatively slower feed rate.

37. In a machine tool the combination with a tool head casing having a spindle journaled therein for axial and rotatable movement, of a self-contained power actuating mechanism fixed to said casing as a unitary structure therewith for rotating and feeding said spindle, comprising, an electric motor mounted on said casing, a speed-change gearing including a plurality of intermediate gears constantly in mesh with a gear device on said spindle and rotatable in unison therewith at all times, means for connecting a selected one of said gears in driven relation with said motor to rotate said spindle at a corresponding speed, means actuatable to feed said spindle axially, a speed-change gearing, and means including a pair of alternatively engageable clutches operable respectively to connect said motor substantially directly to said actuatable feed means to feed the spindle at a rapid traverse rate and to connect one of said intermediate gears in driving relation with said actuatable feed means through said speed-change gearing to feed the spindle at a selected relatively slower feed rate.

38. In a machine tool the combination of a spindle journaled for rotative and axial feeding movement, means actuatable to rotate the spindle, means actuatable to feed the spindle, a reversible electric driving motor connected in driving relation with the first named actuatable means, control means for starting and stopping and reversing said motor correspondingly to start and stop and reverse spindle rotation, and connecting means operable to connect the same motor in driving relation with the second named actuatable means to feed the spindle axially, said connecting means including means for reversing the direction of feed independently of the direction of motor rotation.

39. In a machine tool the combination of supporting ways, a machine tool element traversable along said ways, power actuated means for traversing said element, alternatively available manually operable means for traversing said element, means including a pump for supplying lubricant to said ways, and means responsive to movement of said element for maintaining said pump in operation during any traversing of said element whether by said power actuated means or said manually operable means.

40. In a machine tool, the combination of a movable machine tool element, actuating means for moving such element and including an electric motor, a speed-change gearing, means including a pair of alternatively engageable rapid traverse and feed clutches for respectively connecting said motor substantially directly to said element for traversing it at a rapid traverse rate and for connecting the motor drivingly to the element through said speed-change gearing to traverse the element at a relatively low feed rate, said clutches being of the friction type and having a hydraulic actuator therefor, electric solenoid operated valves arranged to control said hydraulic actuator, and a unified set of controls for controlling from a remote point the operation of said motor and of said solenoid operated valves.

41. In a machine tool, the combination of a movable machine tool element, power actuating means for moving said element, means actuatable to releasably hold said element against movement, and interlock means automatically operable in response to conditioning of said actuating means to move the element, to release said holding means and alternatively operable to engage said holding means, in response to stoppage in the movement of the element by its actuating means.

42. In a machine tool, the combination of a movable machine tool element, power actuating means for moving said element, an electric control circuit for said actuating means including start and stop switches operable respectively to initiate and interrupt the movement of the element by its actuating means, means for releasably holding said element against movement, and actuating means for said holding means operable automatically in response to operation of said start switch to release said holding means and in response to operation of said stop switch to engage said holding means.

43. In a machine tool, the combination with a movably mounted tool head having first and second spindles journaled therein for individual axial and rotatable movement, of a self contained power actuating mechanism fixed to said head as a unitary structure therewith for rotating and feeding said spindles, comprising, an electric motor mounted on said head, a speed-change gearing including a plurality of intermediate gears constantly in mesh with a gear device on said first spindle and rotatable in unison therewith at all times, means for connecting a selected one of said gears in driven relation with said motor to rotate said first spindle at a corresponding speed, means for connecting said second spindle in driven relation with said first spindle for rotation of the second spindle, first and second feed means actuatable respectively to feed said first and second spindles axially, and means for connecting one of said intermediate gears in driving relation with at least one of said feed means.

44. In a machine tool, the combination with a movably mounted tool head having first and second spindles journaled therein for individual axial and rotatable movement, of a self contained power actuating mechanism fixed to said head as a unitary structure therewith for rotating and feeding said spindles, comprising, an electric motor mounted on said head, a speed-change gearing including a plurality of intermediate gears constantly in mesh with a gear device on said first spindle and rotatable in unison therewith at all times, means for connecting a selected one of said gears in driven relation with said motor to rotate said first spindle at a corresponding speed, means for connecting said second spindle in driven relation with said first spindle for rotation of the second spindle, first and second feed means actuatable respectively to feed said first and second spindles axially, and selector means for connecting one of said intermediate gears in driving relation with a selected one of said feed means.

45. In a machine tool, the combination with a movably mounted tool head having first and second spindles journaled therein for individual axial and rotatable movement, of a self contained power actuating mechanism fixed to said head as a unitary structure therewith for rotating and feeding said spindles, comprising, an electric motor mounted on said head, a speed-change gearing including a plurality of intermediate gears constantly in mesh with a gear device on said first spindle and rotatable in unison therewith at all times, means for connecting a selected one of said gears in driven relation with said motor to rotate said first spindle at a corresponding speed, means for connecting said second spindle in driven relation with said first spindle for rotation of the second spindle, first and second feed means actuatable respectively to feed said first and second spindles axially, and selector means including a clutch for alternatively connecting one of said intermediate gears in driving relation with a selected one of said feed means, said clutch having a neutral position in which both of said feed means are disconnected from said intermediate gear.

46. In a machine tool, the combination with a tool head having first and second spindles journaled therein for individual axial and rotatable movement, of a self contained power actuating mechanism for rotating and feeding said spindles, comprising, an electric motor, a speed-change gearing including a plurality of intermediate gears constantly in mesh with a gear device on said first spindle and rotatable in unison therewith at all times, means for connecting a selected one of said gears in driven relation with said motor to rotate said first spindle at a corresponding speed, means for connecting said second spindle in driven relation with said first spindle to revolve the second spindle, first and second feed means for feeding corresponding ones of said spindles axially, and means including a pair of alternatively engageable clutches operable respectively to connect said motor substantially directly to at least one of said feed means to feed the corresponding spindle axially at a rapid traverse rate and to connect one of said intermediate gears in driving relation with the last mentioned feed means to feed such spindle at a relatively lower feed rate.

47. In a machine tool, the combination with a tool head having first and second spindles journaled therein for individual axial and rotatable movement, of a self-contained power actuating mechanism for rotating and feeding said spindles, comprising, an electric motor, a speed-change gearing including a plurality of intermediate gears constantly in mesh with a gear device on said first spindle and rotatable in unison therewith at all times, means for connecting a selected one of said gears in driven relation with said motor to rotate said first spindle at a corresponding speed, means for connecting said second spindle in driven relation with said first spindle to revolve the second spindle, first and second feed means for feeding corresponding ones of said spindles axially, means including a pair of alternatively engageable rapid traverse and feed clutches operable respectively to establish corresponding feed connections from said motor in which the rapid traverse connection is substantially direct from the motor and the other or slow feed connection through one of said intermediate gears, and means including a selector clutch for completing either of said feed connections from said motor to a selected one of said spindles.

48. In a machine tool, the combination of a tool head having a spindle journaled therein for both rotative and axial movement, means including an electric drive motor for rotating said spindle, a speed-change gearing, means including alternatively engageable rapid traverse and feed clutches for establishing feed connections from said drive motor to said spindle for feeding the same axially, the connection established by said rapid traverse clutch being substantially direct from the motor and that established by said feed clutch being through said speed-change gearing and a multi-speed-range gearing interposed in both of said connections.

49. In a machine tool, the combination of a tool head having a spindle journaled therein for both rotative and axial movement, means including an electric drive motor for rotating said spindle, a speed-change gearing, means including alternatively engageable rapid traverse and feed clutches for establishing feed connections from said drive motor to said spindle for feeding the same axially, the connection established by said rapid traverse clutch being substantially direct from the motor and that established by said feed clutch being through said speed-change gearing, and a single reversing mechanism common to both said connections.

KEITH F. GALLIMORE.

CERTIFICATE OF CORRECTION.

Patent No. 2,251,015.                                              July 29, 1941.

KEITH F. GALLIMORE.

It is hereby certified that error appears in the printed specification of the above numbered patent requiring correction as follows: Page 7, first column, line 9, for "Fig." read --Figs.--; lines 27 and 43, for "two-faced" read --two-feed--; page 13, second column, line 34, for "458a" read --548a--; page 15, first column, line 42, after "dropping" insert --out--; page 16, second column, line 48, for the word "spindle" read --spindles--; page 18, first column, line 22, for "colume" read --column--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.